US008456721B2

(12) United States Patent
Arimura et al.

(10) Patent No.: US 8,456,721 B2
(45) Date of Patent: Jun. 4, 2013

(54) MOSAIC IMAGE GENERATING APPARATUS AND METHOD

(75) Inventors: Hiroshi Arimura, Tokyo (JP); Junko Fujimaru, Tokyo (JP); Junichi Yokooji, Tokyo (JP)

(73) Assignee: Pitmedia Marketing Incorporated, Tokyo (JP)

( * ) Notice: Subject to any disclaimer, the term of this patent is extended or adjusted under 35 U.S.C. 154(b) by 466 days.

(21) Appl. No.: 12/837,016

(22) Filed: Jul. 15, 2010

(65) Prior Publication Data

US 2010/0277754 A1 Nov. 4, 2010

Related U.S. Application Data

(63) Continuation of application No. PCT/JP2009/050063, filed on Jan. 7, 2009.

(30) Foreign Application Priority Data

| | | |
|---|---|---|
| Jan. 15, 2008 | (JP) | 2008-006245 |
| Jun. 18, 2008 | (JP) | 2008-159612 |
| Jun. 18, 2008 | (JP) | 2008-159613 |
| Jun. 18, 2008 | (JP) | 2008-159614 |
| Jun. 18, 2008 | (JP) | 2008-159615 |

(51) Int. Cl.
*G03F 3/08* (2006.01)

(52) U.S. Cl.
USPC ............. 358/518; 358/1.9; 358/2.1; 358/501; 382/166; 382/167; 715/200; 715/202; 715/204; 715/209; 715/243

(58) Field of Classification Search
USPC ............. 358/1.9, 2.1, 3.1, 501, 518; 382/166, 382/167, 173, 284; 715/200, 201, 202, 204, 715/209, 243, 246
See application file for complete search history.

(56) References Cited

U.S. PATENT DOCUMENTS 6,556,210 B1 * 4/2003 Yamamoto et al. ........... 345/582
6,720,971 B1 4/2004 Yamamoto et al.

(Continued)

FOREIGN PATENT DOCUMENTS

JP 11-341264 A 12/1999
JP 11-345309 A 12/1999

(Continued)

OTHER PUBLICATIONS

International Search Report of PCT/JP2009/050063, Mailing Date of Feb. 3, 2009.

*Primary Examiner* — King Poon
*Assistant Examiner* — Jamares Q Washington
(74) *Attorney, Agent, or Firm* — Westerman, Hattori, Daniels & Adrian, LLP

(57) ABSTRACT

A mosaic image generating apparatus comprises: a segmenting unit which segments a target image into a plurality of blocks; a target image processing unit which calculates, as a target density value, an average density value of each basic color in each of the blocks; a determining unit which determines from the plurality of blocks a placement block on which the material image is to be placed, without being restricted by the image of the placement block; a calculating unit which calculates an average density value of each basic color in the material image; and a color correcting unit which performs a color correction on the material image such that the average density value of each basic color in the material image becomes the target density value of each basic color in the placement block while maintaining the density value distribution ratio of each basic color in the material image.

6 Claims, 43 Drawing Sheets

U.S. PATENT DOCUMENTS

| | | | | |
|---|---|---|---|---|
| 6,724,946 | B1 * | 4/2004 | Kusama et al. | 382/284 |
| 6,927,874 | B1 | 8/2005 | Enokida et al. | |
| 2004/0217980 | A1 * | 11/2004 | Radburn et al. | 345/672 |

FOREIGN PATENT DOCUMENTS

| | | | |
|---|---|---|---|
| JP | 2000-306083 | A | 11/2000 |
| JP | 2000-307848 | A | 11/2000 |
| JP | 2001-251496 | A | 9/2001 |
| JP | 2004-030076 | A | 1/2004 |
| JP | 2004-334467 | A | 11/2004 |
| JP | 2005-100120 | A | 4/2005 |
| JP | 2007-304820 | A | 11/2007 |

* cited by examiner

*FIG. 26*

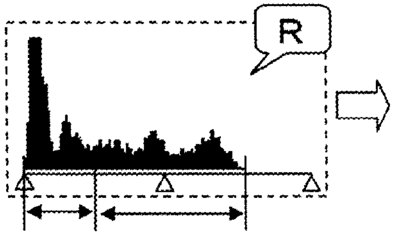

(ENTIRE DENSITY VALUES OF R)
85 192 16 43 181 87 214 22 210 137 159 82 170 55 148 57 231 35 28 40
(SUBTRACT MINIMUM DENSITY VALUE FROM ENTIRE DENSITY VALUES OF R, AND ARRANGE THE OBTAINED ENTIRE DENSITY VALUES IN ASCENDING SEQUENCE)
0 6 12 19 24 27 39 41 66 69 71 121 132 143 154 165 176 194 198 215

MINIMUM DENSITY VALUE (0), MAXIMUM DENSITY VALUE (215),
AVERAGE DENSITY VALUE (93.60)
(RATIO X = 0.44(93.60), RATIO Y = 0.56(121.40))

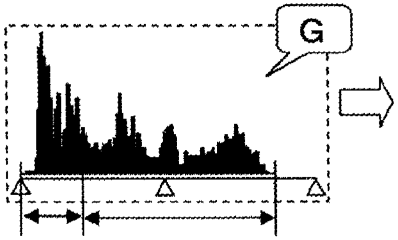

(ENTIRE DENSITY VALUES OF G)
14 50 235 100 240 30 80 90 68 12 40 66 85 67 75 35 13 55 45 95
(SUBTRACT MINIMUM DENSITY VALUE FROM ENTIRE DENSITY VALUES OF G, AND ARRANGE THE OBTAINED ENTIRE DENSITY VALUES IN ASCENDING SEQUENCE)
0 1 2 18 23 28 33 38 43 54 55 56 63 68 73 78 83 88 223 228

MINIMUM DENSITY VALUE (0), MAXIMUM DENSITY VALUE (228),
AVERAGE DENSITY VALUE (62.75)
(RATIO X = 0.28(62.75), RATIO Y = 0.72(165.25))

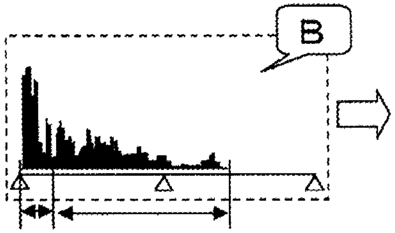

(ENTIRE DENSITY VALUES OF B)
46 58 113 97 115 49 79 82 70 40 52 64 80 67 76 50 43 61 55 94
(SUBTRACT MINIMUM DENSITY VALUE FROM ENTIRE DENSITY VALUES OF B, AND ARRANGE THE OBTAINED ENTIRE DENSITY VALUES IN ASCENDING SEQUENCE)
0 3 6 9 10 12 15 18 21 24 27 30 36 39 40 42 54 57 73 75

MINIMUM DENSITY VALUE (0), MAXIMUM DENSITY VALUE (75),
AVERAGE DENSITY VALUE (29.55)
(RATIO X = 0.39(29.55), RATIO Y = 0.61(45.45))

| IMAGE ID | USER ID | BLOCK ID | STORAGE LOCATION OF NORMAL MATERIAL IMAGE FILE | CONTRIBUTION DATE/TIME |
|---|---|---|---|---|
| 101 | USER A | 325 | D:¥file_area¥user_a¥ | 200805221029 |
| 102 | USER B | 654 | D:¥file_area¥user_b¥ | 200806041712 |
| ・・・ | ・・・ | ・・・ | ・・・ | ・・・ |

310

| IMAGE ID | COMMENT ENTRY USER ID | COMMENT | OPEN RANGE | CONTRIBUTION DATE/TIME |
|---|---|---|---|---|
| 101 | USER A | I BOUGHT THAT. | IDENTICAL PERSON | 200805302210 |
| 101 | USER B | TRY IT VERY SOON!! | ALL USERS | 200806061015 |
| 102 | USER X | TODAY'S CURRY WAS GREAT! | NEIGHBOR | 200804261127 |
| ・・・ | ・・・ | ・・・ | ・・・ | |

MOSAIC IMAGE GENERATING APPARATUS AND METHOD

CROSS-REFERENCE TO RELATED APPLICATIONS

This is a continuation of Application PCT/JP2009/050063, filed on Jan. 7, 2009, now pending, the contents of which are herein wholly incorporated by reference.

FIELD

The present invention relates to a mosaic image generating technology of generating a mosaic image by use of a plurality of material images.

BACKGROUND

There is a photo mosaic given as a technique of generating a single large image by arranging a plurality of small images (such as photos). FIG. 43 is a diagram representing an example of the photo mosaic. The photo mosaic gets a person 501 who views from a remote place to visually recognize a sheet of large image 505 and enables a person 502 who views at close range to visually recognize a plurality of images 511, 512, 513 and 514 which form the sheet of large image 505. This type of photo mosaic technology will hereinafter be simply referred to as the mosaic technology, and the image 505 generated by the photo mosaic technology is simply termed a mosaic image. Further, the images (e.g., the image 511 etc) forming this mosaic image are expressed as material images, and the image serving as a basis of the mosaic image is referred to as a target image.

A variety of tools for generating the mosaic image such as this are provided on the Internet etc at the present. This type of conventional mosaic image creating tool generates the mosaic image by using roughly two techniques given as below in a way that makes a user register one single target image and a plurality of material images.

The first technique is that the target image is segmented into a predetermined number of blocks, some material image close to tones and shapes of the respective blocks are extracted from within the plurality of material image, and the extracted material images are placed on the individual blocks.

The second technique is that the target image is converted into a semi-transparent image, the plurality of material images is placed in a mosaic-like configuration, and the semi-transparent target image is superposed on the plurality of material images.

These conventional techniques are disclosed in the following documents of the conventional arts. Further, a system is proposed (refer to Patent document 4), which generates the mosaic image through operations on a multiplicity of user terminals such as mobile terminals by use of these conventional techniques.

[Patent document 1] Japanese Patent Laid-Open Publication No. 2005-100120

[Patent document 2] Japanese Patent Laid-Open Publication No. H11-341264

[Patent document 3] Japanese Patent Laid-Open Publication No. 2000-306083

[Patent document 4] Japanese Patent Laid-Open Publication No. 2004-30076

SUMMARY

The conventional mosaic image generating techniques described above have the following problems.

The first technique described above requires the optimal material image matching with the tone and the shape of the block on a per-block basis. Hence, the first technique eventually needs the material images that are by far more than the number of segmented blocks in order to enhance visual recognizability of the mosaic image. In other words, the first technique comes to a state of being hard to determine an arrangement of the respective material images unless a large number of material images are collected. Moreover, in the first technique described above, a block position in which each material image is to be placed is determined corresponding to the tone and the shape of each block, and hence the arrangement of the material images is limited.

On the other hand, in the second technique described above, such a case exists that brightness of the material images declines due to a color mixture between the material image and the target image, which is caused when the semi-transparent target image is superposed on the material image, resulting in the decline of the visual recognizability of the material image.

It is an object of the present invention, which is devised in view of those problems, to provide a mosaic image generating technology that eliminates restrictions to material images corresponding to a target image and improves visual recognizability of a mosaic image and the material image as well.

Respective modes of the present invention adopt the following configurations in order to solve the problems given above. Namely, a first mode of the present invention is related to a mosaic image generating apparatus which generates a mosaic image by use of material images, the mosaic image generating apparatus including: a segmenting unit which segments a target image becoming a basis of the mosaic image into a plurality of blocks; a target image processing unit which calculates an average density value, as a target density value, of each of basic colors within each of the blocks into which the target image is segmented by the segmenting unit; a determining unit which determines a placement block in which the material image is to be placed from within the plurality of blocks without being restricted by an image of the block; a calculating unit which calculates the average density value of each of the basic colors within the material image; and a color correcting unit which makes a color-correction of the material image so that the average density value of each of the basic colors within the material image becomes the target density value of each of the basic colors within the placement block while keeping a density value distribution ratio of each of the basic colors of the material image.

Herein, the basic colors, which connote colors for assuming colors of respective pixels contained in the image area, are exemplified by red, green and blue in a RGB color model and exemplified by cyan, magenta, yellow and black in a CMYK color model. The density value connotes a ratio or variable-density information of the respective basic colors for assuming the pixel colors. Further, the density value distribution ratio connotes a usage ratio of the density values of the basic colors in the whole pixels within the image.

According to the mode of the present invention, as for the material images forming the mosaic image, the block position in which the material image is to be placed within the target image, is determined in a way that does not depend on the image of the placement block. The material image is color-corrected while keeping the density value distribution ratio of each of the basic colors so that the average density value of each basic color, which is calculated with respect to this material image, becomes the target density value of each basic color, which is determined with respect to the block in which the material image is placed.

With this contrivance, according to the mode of the present invention, the material image is color-corrected corresponding to the tone of the disposing-destination block so as to enable the disposition of the material image to be determined arbitrarily without being restricted, however, this material image undergoes the color-correction in the state of keeping the density value distribution ratio of each of the basic colors of the original image, and hence the visual recognizability of the material image can be enhanced in a complete version of mosaic image. Moreover, the tone of the material image placed in each block can be matched with the tone of each of the blocks of the target image serving as the basis, and it is therefore feasible to improve the visual recognizability of the complete version of mosaic image.

Further, in the mode described above, preferably the mosaic image generating apparatus further includes a target image correcting unit which compresses, in a sate of uniforming a color of each block with a color set to the target density value of each of the basic colors that is calculated by the target image processing unit, the density value distribution ratio of each of the basic colors within the target image so as not to use a predetermined range extending from an allowable minimum density value and a predetermined range extending from an allowable maximum density value, and newly calculates, as the target density value, the average density value of each of the basic colors corresponding to the compressed density value distribution ratio, wherein the color correcting means color-corrects the material image by using the target density value that is newly calculated by the target image correcting means.

Herein, the predetermined range extending from the allowable minimum density value and the predetermined range extending from the allowable maximum density value imply a color close to white and black in, e.g., the RGB color model. In this mode, the target density value of each block is calculated based on the target image in a state of being converted so as not to use the predetermined tone range while keeping the density value distribution ratio of each of the basic colors of the whole target image. With this process, the material image is color-corrected corresponding to the target density value of the thus-converted block image and therefore undergoes the color-correction so as not to use the predetermined range from the allowable minimum density value and the predetermined range from the allowable maximum density value.

Therefore, according to this mode, even when the material image is color-corrected corresponding to the tone of the disposing-destination block, it is possible to prevent the decline of the visual recognizability of the material image. Speaking of, e.g., the RGB color model, the material image can be prevented from being hard to see because the color gets close to white and black when color-corrected.

Moreover, in the mode described above, the visual recognizability of the material image may be further improved by taking the following configuration.

The calculating means further calculates a maximum density value of each of the basic colors within the material image, and the color correcting means includes a first density converting means which compresses, if the material image is color-corrected so that the average density value of each of the basic colors within the material image becomes the target density value of each of the basic colors within the placement block and when determining that the post-correcting maximum density value of at least one basic color exceeds the allowable maximum density value, the density value distribution ratio of the at least one basic color so that the post-correcting maximum density value becomes the allowable maximum density value and the average density value becomes the target density value.

Further, the calculating means further calculates the maximum density value and a minimum density value of each of the basic colors within the material image, and the color correcting means includes a second density converting means which expands or compresses, if the material image is color-corrected so that the average density value of each of the basic colors within the material image becomes the target density value of each of the basic colors within the placement block and when determining that the post-correcting maximum density value of at least one basic color does not exceed the allowable maximum density value, the density value distribution ratio of at least one basic color so that the post-correcting minimum density value becomes the allowable minimum density value and the average density value becomes the target density value.

According to this mode, even when color-corrected so that the average density value of each of the basic colors within the material image matches with each of the target density values of the placement block, the density value distribution ratio of each of the basic colors of the material image is held, and hence the visual recognizability of the material image can be improved.

Moreover, in the mode described above, preferably the mosaic image generating apparatus further includes a material image converting means which converts the material image into a grayscale image, wherein the calculating means calculates the average density value of any one of the basic colors from the grayscale image converted by the material image converting means, and the color correcting means color-corrects the material image by use of the density value distribution ratio of the grayscale image and the average density value of any one of the basic colors that is calculated by the calculating means.

Herein, the grayscale image is an image expressed by only brightness information, in which the density values of the basic colors of the respective pixels are equalized to each other. Therefore, the material image converted into the grayscale image has the same density value distribution of each of the basic colors and has the same average density value of each of the basic colors.

Hence, according to this mode, it is sufficient that the average density value and the density value distribution ratio of only any one of the basic colors are processed, and therefore a calculation quantity for generating the mosaic image can be reduced. In addition, a dispersion in the respective basic colors of the material image can be restrained by converting the material image into the grayscale image, and hence, even when the material image is color-corrected so as to get approximate to the block image, occurrence of a color that does not exist so far in the original material image can be prevented. It is therefore possible to improve the visual recognizability and viewability of the complete version of mosaic image.

Furthermore, in the mode described above, preferably the mosaic image generating apparatus further includes: a generating unit which generates the mosaic image by placing the material image that is color-corrected by the color correcting unit in the placement block; a display image generating unit which generates, based on the mosaic image generated by the generating unit, a plurality of display images corresponding to respective zoom stages of stepwise zoom display between zoom-out display in which the whole mosaic image is visually recognized on a screen of a mobile terminal and zoom-in display in which a plurality of blocks within a partial area of the mosaic image is visually recognized on the screen of the mobile terminal; and a display control unit which displays, on the screen of the mobile terminal, each of the plurality of display images generated by the display image generating unit in a state where each display image is segmented into a plurality of cells selectable by an operation on the mobile terminal so that each cell is arranged corresponding to each block visually recognized in the zoom-in display.

In this mode, the mosaic image in which the color-corrected material images are placed as described above is displayed on the screen of the mobile terminal, and consequently the plurality of display images is generated from the mosaic image. The plurality of display images respectively corresponds to the zoom stages of the stepwise zoom display of the mobile terminal. The stepwise zoom display connotes zoom-in display or zoom-out display at a predetermined stage level between a display status (in which the mosaic image is displayed in a zoom-out mode at the maximum) where the whole mosaic image is visually recognized on the screen of the mobile terminal and a display status (in which the mosaic image is displayed in a zoom-in mode at the maximum) where the plurality blocks in a partial area of the mosaic image is visually recognized.

The plurality of thus-generated display images is displayed on the screen of the mobile terminal in the state of each being segmented into the plurality of cells. Each cell can be selected by an operation on the mobile terminal and is placed corresponding to each block that is visually recognized in the zoom-in display (the display status where the mosaic image is zoomed-in at the maximum). The display control unit according to the mode of the present invention may include such a scheme that a predetermined program (e.g., a WEB file in a working example) is downloaded into the mobile terminal and executed by the mobile terminal.

With this configuration, according to this mode, the mosaic image can be provided with the high visual recognizability in a way that performs the stepwise switchover by manipulating the cells between the state (the state of being displayed in the zoom-out mode) where the mosaic image is visually recognized by the person who views originally from the remote place and the state (the state of being displayed in the zoom-in mode) where the image is visually recognized by the person who views originally at close range). The cells can be manipulated easily on the mobile terminal.

Therefore, according to this mode, it is feasible to realize the device which provides the mosaic image with high usability. Further, according this mode, the mosaic image is displayed at the predetermined stage level, and hence a function corresponding to a display magnification can be added at every stage.

Moreover, in the mode described above, preferably the display control unit downloads, into the mobile terminal, when displaying in the zoom-in mode on the mobile terminal, respective pieces of identifying information specifying intra-mosaic-image positions related to the individual blocks displayed in the plurality of cells together with the display image corresponding to the zoom-in display, and the generating unit, when receiving from the mobile terminal a new material image together with the identifying information of the block selected by use of any one of the plurality of cells in the case of being displayed in the zoom-in mode, gets the new material image processed by the determining unit, the calculating unit and the color-correcting unit, and generates the mosaic image in which the newly-processed material image is placed in the block specified by the identifying information.

In this mode, the identifying information indicating the position where the block specified by the cell displayed on the mobile terminal in the whole mosaic image exists, is downloaded into the mobile terminal, and the position is designated by using the downloaded identifying information, whereby the new material image is contributed from the mobile terminal. Through this operation, the new material image is processed, and there is generated the mosaic image in which the thus-processed material image is placed in the designated block position.

The user, who uses the mobile terminal, selects the cell indicating the position where the user's own material image is desired to be placed from within the plurality of cells displayed on the screen and contributes this material image, thereby enabling the user to view the mosaic image in which the desired material image is placed in the desired position.

Hence, according to the mode of the present invention, the position in which the material image is desired to be placed can be designated on the mobile terminal as well as being capable of realizing the contribution of the material image on the mobile terminal. This positional designation can be arbitrarily made based on the configuration of the mosaic image generating means described above without being restricted by the image of the placement block, and can be carried out by only the cell selecting operation on the screen of the mobile terminal, and therefore the high usability can be realized.

Further, in the mode described above, preferably the mosaic image generating apparatus further includes a comment information table stored with comment information contributed to each of the material images, wherein the display control unit displays each of the plurality of display images generated by the display image generating unit on the screen of the mobile terminal in a state of expressing a relation between the comment extracted from the comment information table and the comment contribution target material image.

This mode enables not only the mobile terminal to be provided with the zoom-display of the mosaic image with the high visual recognizability but also the user to browse the comments contributed to the respective material images within the display image.

Moreover, in this mode, the comment is displayed in a way that makes recognizable a relation with the contribution target material image, thereby enabling the user to recognize the existence of the material image to which the comment having a very interesting content is contributed and to recognize the existence of a popular material image to which multiple comments are contributed. Hence, it is possible not only to get the mosaic image simply browsed but also to make the user enjoy browsing the mosaic image corresponding to the content of the comment.

Still further, in the mode described above, preferably the mosaic image generating apparatus further includes: a receiving unit which receives the material image read by an image reading device and gets the received material image processed by the determining unit, the calculating unit and the color correcting unit; and a print instructing unit which instructs a printing device to print the material image that is color-corrected by the color correcting unit and the positional information of the placement block.

In this mode, the material image, which is color-corrected as described above, is printed together with the positional information of this placement block on a predetermine medium by the printing device. This printing device is, e.g., a printer and may also be other devices if capable of transferring the image.

With this configuration, if the post-printing medium is stuck to the position, specified by the positional information printed on the medium, on a member for forming the mosaic image, the mosaic image can be eventually formed together with other printing mediums on this member. Hence, this mode enables the user to easily participate in forming the mosaic image on the basis of the predetermined medium.

It should be noted that other modes of the present invention may be a mosaic image generating method having the same characteristics as those of the mosaic image generating apparatus described above, a program making an information processing device (computer) function as the mosaic image generating apparatus and a readable-by-computer storage medium recorded with the program.

According to the present invention, it is feasible to actualize the technology of providing the mosaic image having the high visual recognizability with the excellent usability.

BRIEF DESCRIPTION OF THE DRAWINGS

FIG. 26 is a diagram representing an example of calculating the statistic values of RGB of the material image in the second working example;

FIG. 31 is a diagram representing a comment information DB in the third working example;

DESCRIPTION OF EMBODIMENTS

A mosaic image providing system according to an embodiment of the present invention will hereinafter be described by taking specific examples. Respective working examples, which will be given as below, are exemplifications, and the present invention is not limited to configurations in the working examples.

First Working Example

A first working example of the mosaic image (herein, the image is defined as what includes, a photo, a picture, etc) providing system will be discussed by way of an embodiment of the present invention.

[System Architecture]

Figure 1:
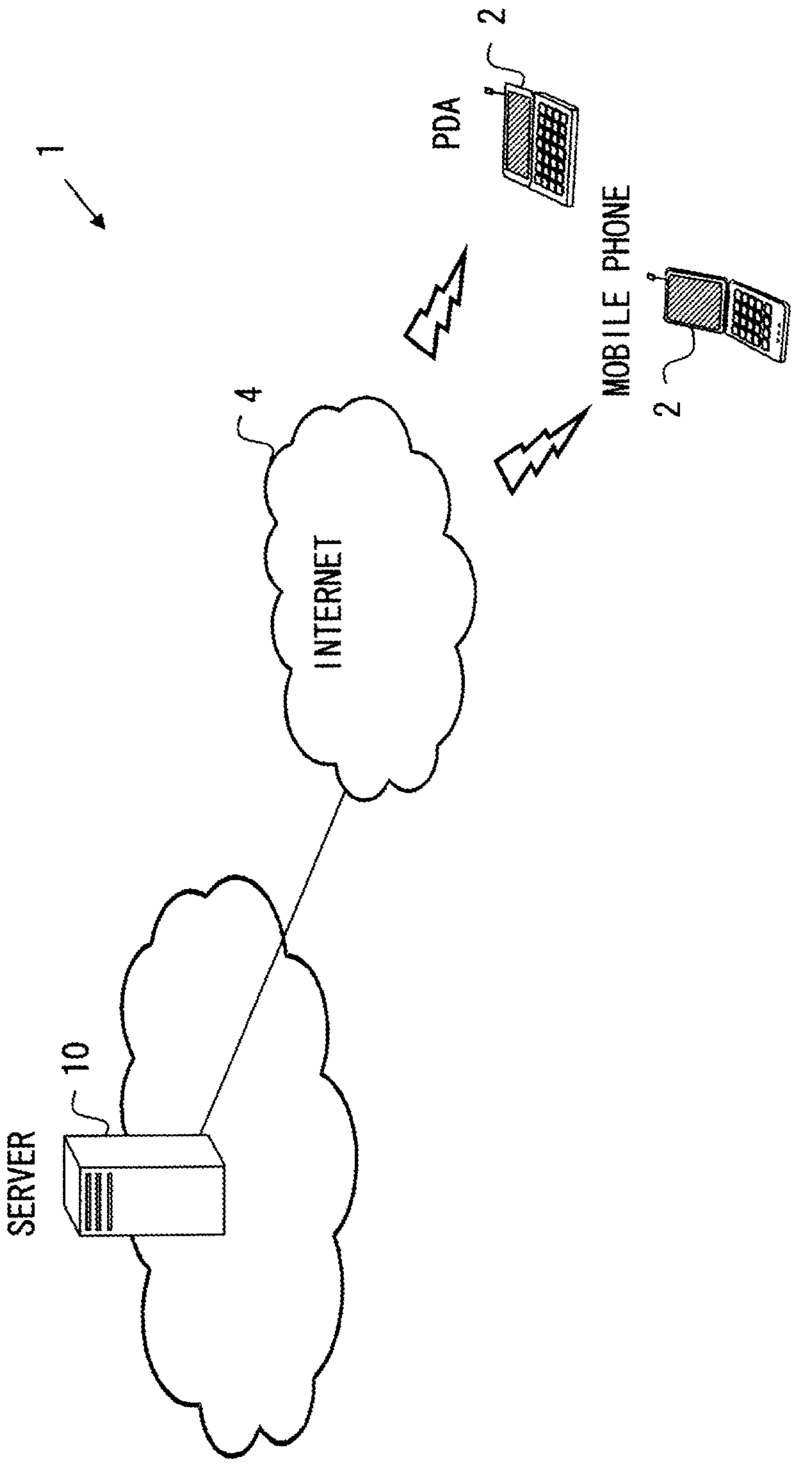
FIG. 1 is a diagram representing an outline of an architecture of a mosaic image providing system in a first working example.

A system architecture of the mosaic image providing system in the first working example will hereinafter be described with reference to FIG. 1. FIG. 1 illustrates an outline of the architecture of the mosaic image providing system in the first working example. A mosaic image providing system 1 in the first working example includes a server 10, mobile terminals 2, etc. The mosaic image providing system 1 realizes a mosaic image providing service by connecting the mobile terminal 2 to the server 10 via a predetermined network (e.g., the Internet 4). Note that the predetermined network is not limited to the Internet 4 but may also be an Intranet and an office Local Area Network (private LAN).

An outline of contents of the mosaic image providing service will hereinafter be discussed.

In this mosaic image providing service, all of user interfaces (UIs) are realized by the mobile terminals 2. Namely, all of operations such as contributing and changing material images prepared by the user and browsing the mosaic images are realized by the operation of the mobile terminal 2. When contributing the material image and on such an occasion that the already-contributed material image is replaced, the material image is attached to a mail and thus delivered from the mobile terminal 2 to the server 10.

This mosaic image providing service actualizes, with respect to browsing the mosaic image, zoom-out display and zoom-in display between the mosaic image and the material image on a screen of the mobile terminal 2. The zoom-out display and the zoom-in display are actualized by operation keys on the mobile terminal 2. Predetermined stages (four stages in the first working example) are provided for the zoom-out display and the zoom-in display. Further, facilitation of specifying a position of a desire-for-zoom-in-display area of the mosaic image involves segmenting the image displayed on the mobile terminal 2 into a predetermined number of cells and forming the segmented-cells in a state of being selectable by the operation keys of the mobile terminal 2. It should be noted that in the following discussion, there is a case in which the representation of the mosaic image is applied to both of the mosaic-like image displayed in a state that is visually recognized originally by a person who looks at the image from a remote place (in a zoom-out-displayed state) and the image (the image in a state where the material image is visually recognized) displayed in a state that is visually recognized originally by a person who looks at the image at close range (in a zoom-in-displayed state).

[Device Configuration]

Next, device configurations of the server 10 and the mobile terminals 2, which configure the mosaic image providing system 1 in the first working example, will respectively be described. The mobile terminal 2 is exemplified by a mobile phone, a mobile information terminal (which is also called a PDA (Personal Digital Assistant)), etc. The server 10 may be built up by a general-purpose computer such as a general type of personal computer and may also be built up by a dedicated computer.

Figure 2:
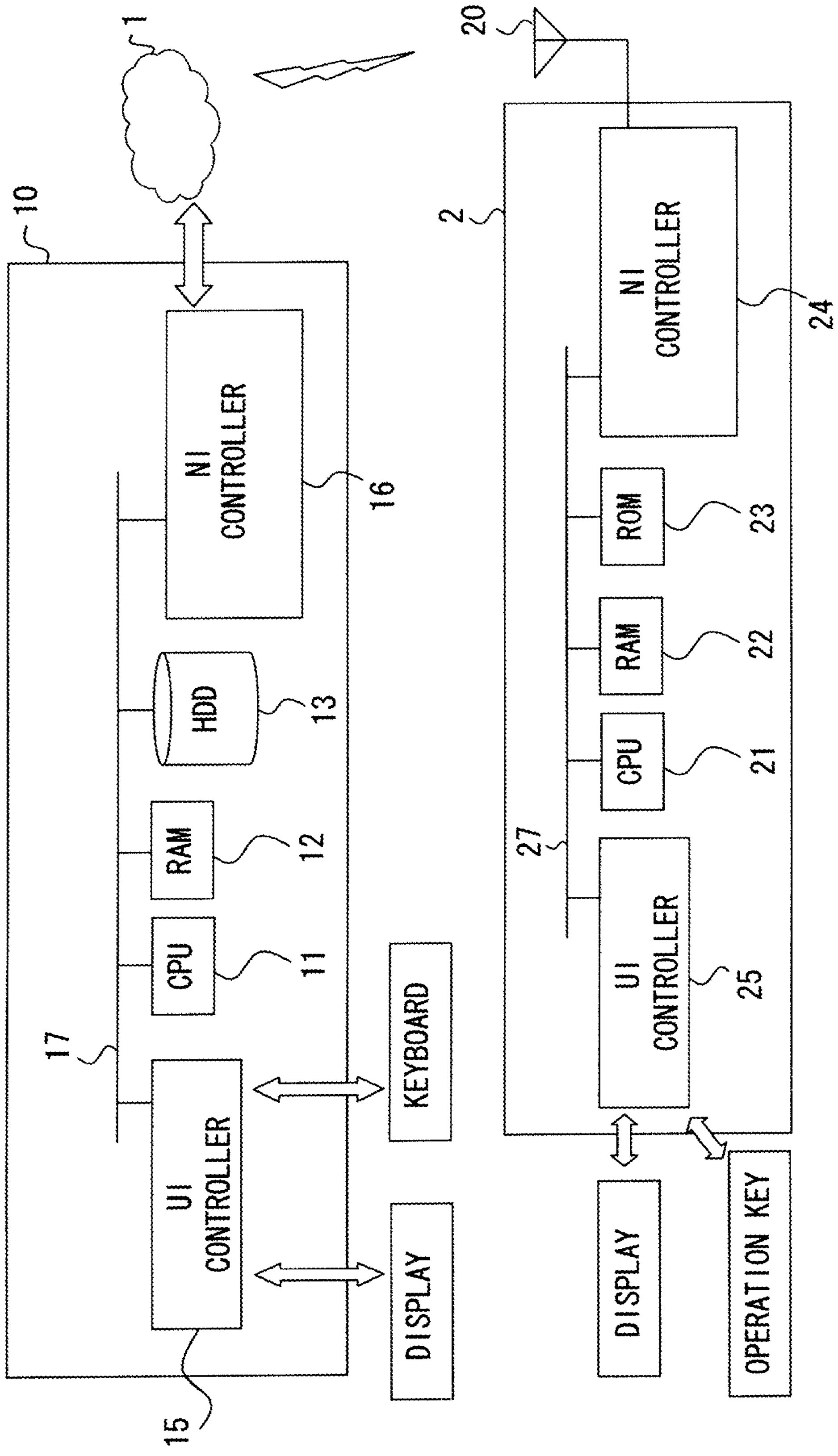
FIG. 2 is a diagram representing an example of hardware configurations of a server and a mobile terminal in the first working example.

FIG. 2 is a diagram representing examples of hardware configurations of the server 10 and the mobile terminal 2 in the first working example.

The server 10 includes, as hardware components, a CPU (Central Processing Unit) 11, a memory (RAM (Random Access Memory) 12, a hard disk 13, a variety of input/output interfaces, etc. The respective units are connected to each other via, e.g., a bus 17. The input/output interfaces include, e.g., a user interface (UI) controller 15, a network interface (NI) controller 16, etc. A display device such as a display and an input device such as a mouse and a keyboard are connected to the UI controller 15. A communication card such as a NI card and a USB (Universal Serial Bus) are connected to the NI controller 16.

The mobile terminal 2 similarly includes a CPU 21, a RAM 22, a ROM (Read Only Memory) 23 and a variety of input/output interfaces (e.g., a UI controller 25, a NI controller 24, etc). The UI controller 25 controls displaying on the display and controls inputting of the operation keys. The NI controller 24 includes radio processing units for transmitting and receiving radio signals.

The server 10 and the mobile terminal 2 in the first working example realize respective function units (modules), which will be explained later on, in such a way that the CPUs 11 and 21 load and execute programs stored in the hard disk 13 and the memories such as the ROM 23. As a matter of course, the programs may be installed from a recording medium like a CD (Compact Disc) and may also be installed from other devices via the network. The present invention does not restrict the hardware configurations of the server 10 and the mobile terminal 2.

[Server 10]

Figure 3:
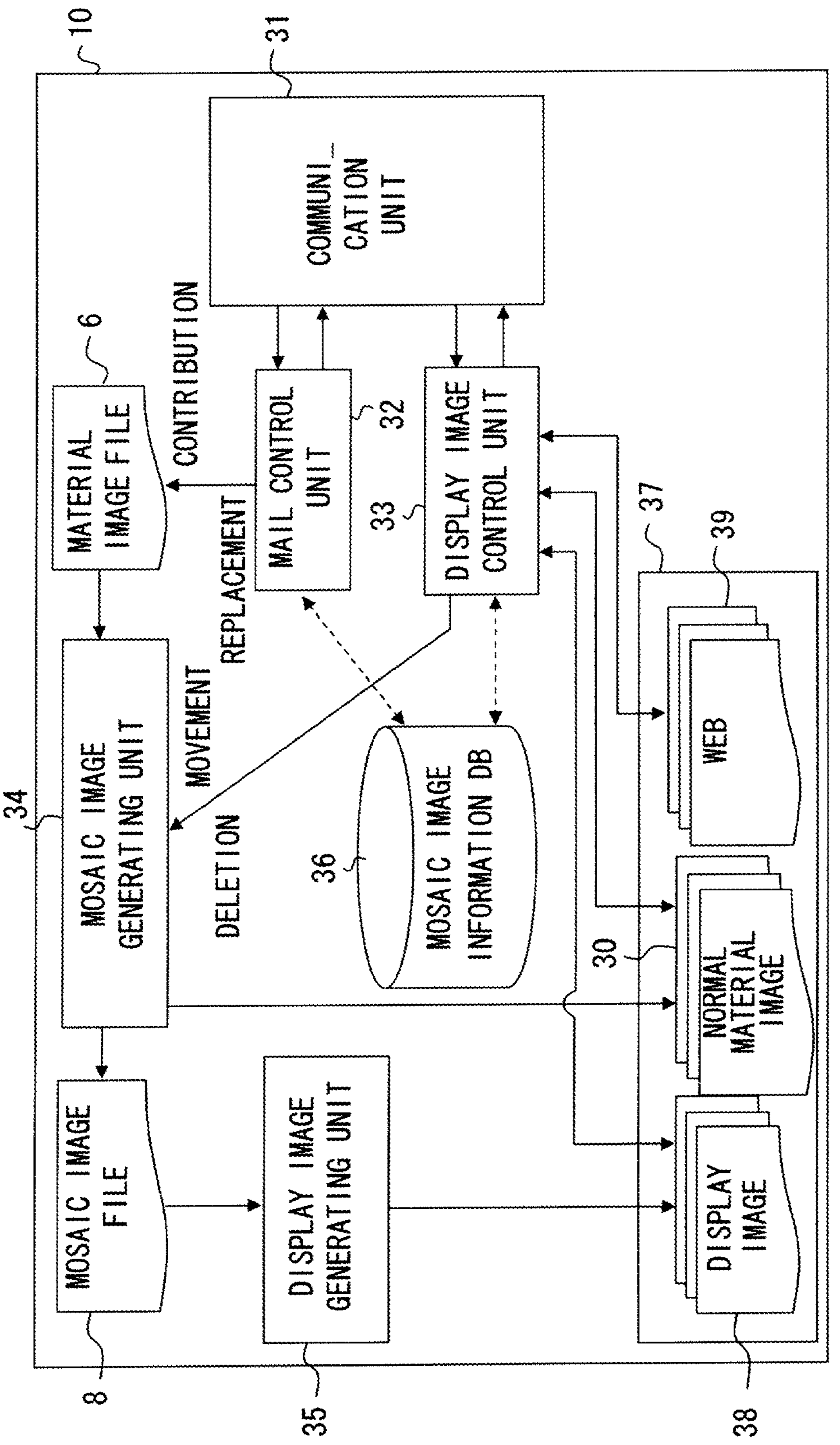
FIG. 3 is a block diagram representing a conceptual configuration of a function of a server 10 in the first working example.

FIG. 3 is a block diagram representing a conceptual configuration of the functions of the server 10 in the first working example. The server 10 includes, as shown in FIG. 3, a communication unit 31, a mail control unit 32, a display image control unit 33, a mosaic image generating unit 34, a display image generating unit 35, a mosaic image information database (DB) 36, a display information storage unit 37 and so on. These function units are executed, whereby the server 10 realizes the mosaic image providing service described above.

The communication unit 31 controls the NI controller 16 and processes the data transmitted and received to and from the mobile terminal 2 according to protocols such as HTTP (Hypertext Transfer Protocol), SMTP (Simple Mail Transfer Protocol) and POP (Post Office Protocol). The communication unit 31 transmits, to the mobile terminal 2, a WEB file 39, a display image data group 38, etc, which are sent from the display image control unit 33. Further, the communication unit 31, upon receiving the data transmitted from the mobile terminal 2 with an operation of a screen displayed by the WEB file 39 on the mobile terminal 2, transmits this data to the display image control unit 33.

Moreover, the communication unit 31, in the case of receiving the mail transmitted from the mobile terminal 2, delivers this mail to the mail control unit 32. The server 10 in the first working example may have a mail server function and may also, without having this mail server function, transmit and receive the mail to and from the mobile terminal 2 via another mail server (unillustrated).

The mosaic image information DB 36 is stored with a user ID for identifying the user, an image ID for identifying the material image contributed by the user, coordinate information indicating where this material image is placed in the mosaic image, information specifying a storage location of a normalized material image file (which will hereinafter be referred to a normal material image file) and information representing contribution date/time when this material image is contributed in the way of being associated with each other. Each material image is, as will be described later on, placed in at least one of areas (blocks) into which the target image is segmented by a predetermined number. Hereafter, information for identifying a position of each area (block) is termed a block ID, and the coordinate information indicating where the material image is placed in the mosaic image is expressed by use of the block ID.

The mail control unit 32, when receiving the mail delivered from the mobile terminal 2 via the communication unit 31, extracts a predetermined item of data and an attached file from the mail. The material image is attached to the mail and is thus transmitted to the server 10 from the mobile terminal 2. Hence, the mail control unit 32 extracts the material image file from the mail. For example, subject (SUBJECT) data is extracted as the predetermined item of data. The subject data contains the block ID specifying the position where the attached material image is placed and the user ID.

The mail control unit 32 requests the mosaic image information DB 36 to issue the image ID and gets the mosaic image information DB 36 stored with the image ID in the way of being associated with the block ID and the user ID each extracted from the mail. The mail control unit 32 sends the image ID and the block ID together with the material image file 6 to the mosaic image generating unit 34.

The display image control unit 33 processes, with respect to the mosaic image providing service, the data transferred and received between the mobile terminal 2 and the server 10. To be specific, the display image control unit 33 receives a user's request given by an operation on the screen of the mobile terminal 2, then acquires items of screen data (WEB file 39, the display image data group 38, etc) corresponding to this user's request from the display information storage unit 37, and transmits the screen data to the mobile terminal 2 via the communication unit 31. Further, the display image control unit 33 issues the user ID through the communications with the mobile terminal 2. The user ID is issued when a new user requests registration in the mosaic image providing system 1.

The display information storage unit 37 is stored with a normal material image file 30, the WEB file 39, the display image file group 38, etc. The normal material image file 30 is stored with the normal material image into which the material image in the material image file 6 contributed from the user is normalized in terms of a predetermined image size and a predetermined image form by the mosaic image generating unit 34.

The WEB files 39 are defined as various types of files for organizing the screens displayed on the mobile terminal 2. The WEB file 39 includes, e.g., an HTML (HyperText Markup Language) file and a data file, invoked from this HTML file, for executing a predetermined process on the mobile terminal 2. The data file is exemplified such as an SWF (Shockwave Flash) file and a JAVA (registered trademark) file. It should be noted that the present invention does not, if capable of organizing the screens displayed on the mobile terminal 2 which will be described alter on, restrict these WEB files 39. In the first working example, the HTML file is utilized for organizing a simple screen, while the SWF file is utilized for organizing a rich screen.

The display image file group 38 is generated by the display image generating unit 35 and is stored as a picture file invoked from the WEB file 39. The display image file group 38 is exemplified such as a PNG (Portable Network Graphics) file, a GIF (Graphic Interchange Format) file and a JPEG (Joint Photographic Experts Group) file. The first working example utilizes the JPEG file.

The mosaic image generating unit 34 receives, from the mail control unit 32, a plurality of material image files 6 contributed from the user, further acquires a target image file 5 as an original image of the mosaic image, and generates the normal material image file 30 and the mosaic image file 8 on the basis of those files. The display image generating unit 35 generates the display image file group 38 used for the display on the mobile terminal 2 by processing the mosaic image file 8 generated by the mosaic image generating unit 34. The thus-generated files, i.e., the display image file group 38 and the normal material image file 30, are stored in the display information storage unit 37. Detailed functions of the mosaic image generating unit 34 and the display image generating unit 35 will hereinafter be described.

<Mosaic Image Generating Unit>

Figure 4:
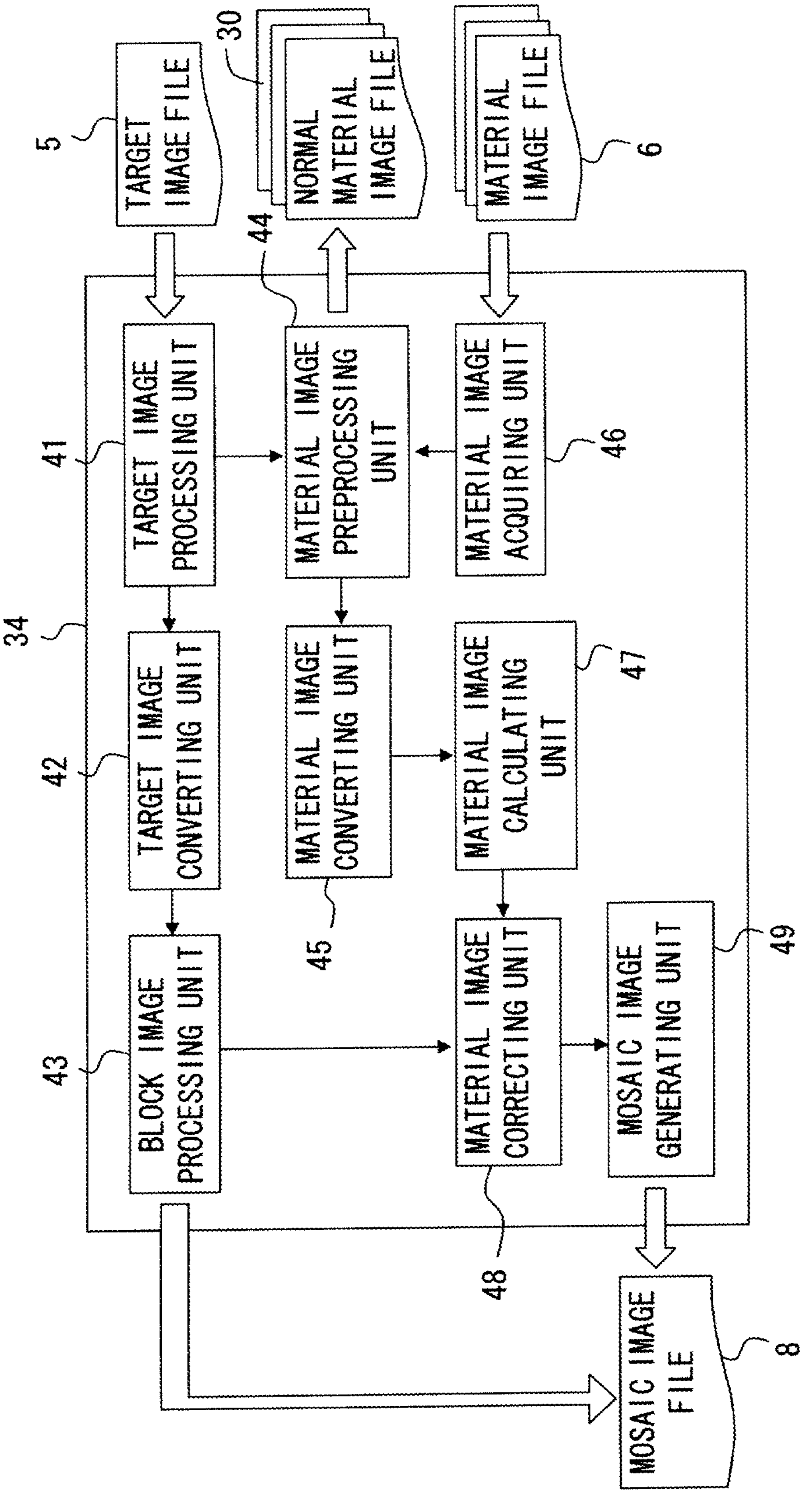
FIG. 4 is a block diagram representing a conceptual configuration of a function of a mosaic image generating unit in the first working example.

FIG. 4 is a block diagram representing a conceptual configuration of functions of the mosaic image generating unit 34 in the first working example. The mosaic image generating unit 34 in the first working example includes, as illustrated in FIG. 4, a target image processing unit 41, a target image converting unit 42, a block image processing unit 43, a material image acquiring unit 46, a material image preprocessing unit 44, a material image converting unit 45, a material image calculating unit 47, a material image correcting unit 48, a mosaic image generating unit 49, etc. These respective function units are executed, whereby the mosaic image generating unit 34 generates the mosaic image file 8 by using the target image file 5 and the plurality material image files 6.

The material image files 6 are, as described above, transmitted from the mail control unit 32. The target image file 5 is previously stored in the hard disk etc. The following discussion will be made by using an example in which color images are stored in the target image file 5 and the material image files 6. Further, in the following discussion, a case of using R (Red), G (Green) and B (Blue) is exemplified by way of color information (color spaces) held by the respective image files 5 and 6. As a matter of course, the present invention does not restrict these color component models, and hence color models such as C (Cyan), M (Magenta), Y (Yellow) and K (Key tone) may also be available.

The present invention neither limits modes of the target image itself and the material image itself such as a photographic image and a color image nor restricts generating techniques (file formats etc) of the target image file 5 and the material image files 6. If the target image and the material image are the color image and if the mosaic image to be created is the color image, however, the mosaic image providing system 1 in the first working example exhibits much higher effects. An in-depth description of each of the function units will hereinafter be given.

<<Target Image Processing Unit 41>>

Figure 5:
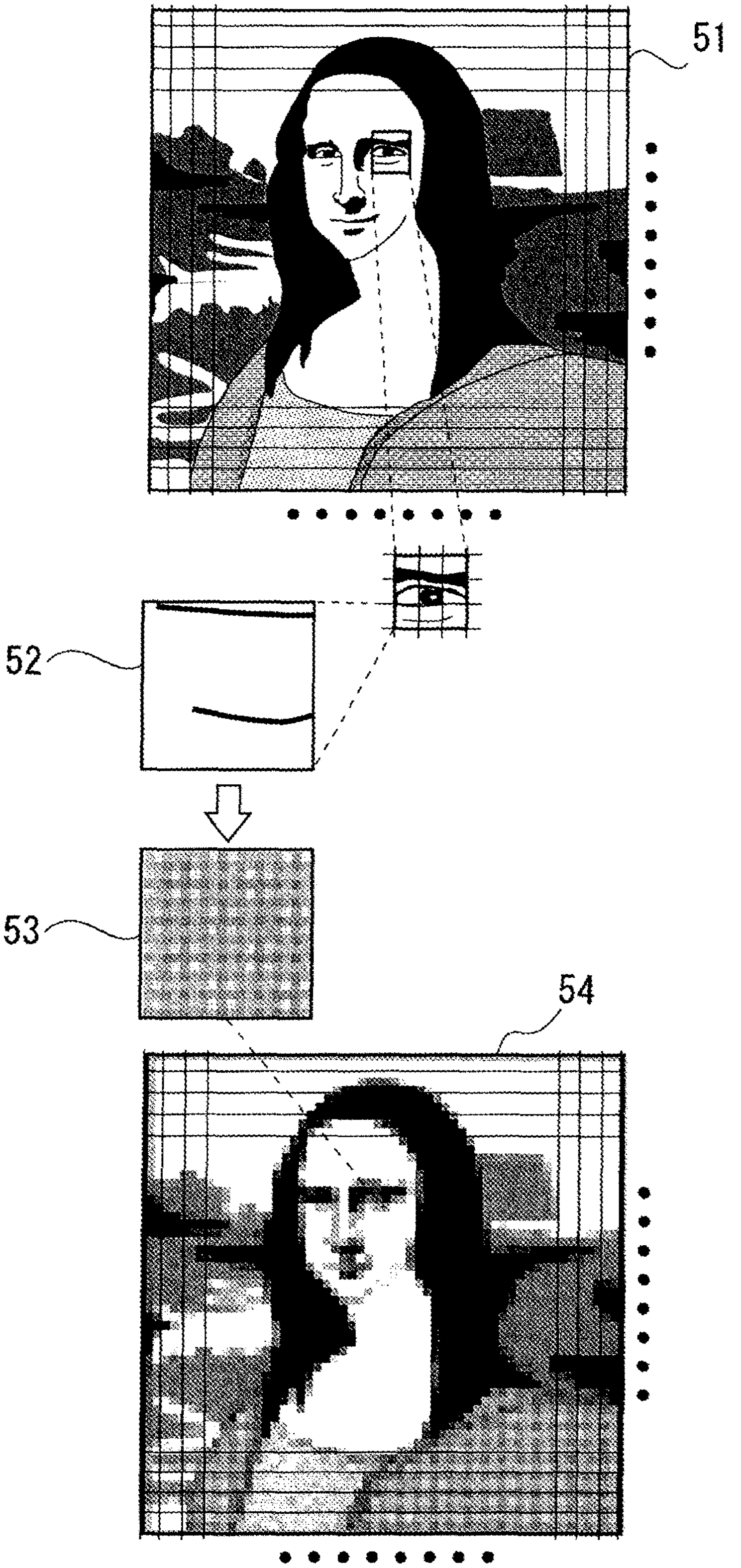
FIG. 5 is a conceptual diagram representing a target image process.

The target image processing unit 41 acquires the file (the target image file 5) of the target image as an original image of the mosaic image to be created. The target image processing unit 41 segments, as shown in FIG. 5, this target image file 5 into the predetermined number of areas (blocks), and executes a filtering process of the target image file 5 on a segmented block-by-block basis. FIG. 5 is a conceptual diagram illustrating a target image process.

An image size (pixel count) and a segment count (block count) of the target image within the target image file 5 are predetermined by a service provider etc and stored as setting information in the memory etc. In the first working example, the block count is set to totally 6561 blocks of 81 blocks by 81 blocks, and the image size of one block is set to 100 pixels by 100 pixels. Hence, the target image in the target image file 5 is set to the image size of totally 65.61 mega pixels of 8100 pixels by 8100 pixels. Note that the target image processing unit 41 may execute resizing and trimming the target image, and another function unit may also execute the same processes separately.

The target image processing unit 41 segments the target image within the thus-set target image file 5 into, as indicated by a numeric code 51 in FIG. 5, a plurality of blocks (6561 blocks). A numeric code 52 in FIG. 5 represents an image of the segmented block (which will hereinafter be referred to as a block image). The example of FIG. 5 illustrates that the sizes of all of the block images are the same, however, the present invention does not restrict the sizes of these block images, and therefore the target image may also be segmented so as to differentiate the sizes of the respective block images.

The target image processing unit 41 executes, with respect to the respective segmented block images, the filtering process that will be explained as below. In this filtering process, to begin with, the target image processing unit 41 calculates an average value of respective density values (gradation values) with respect to each of RGB in the block image. Hereafter, the density values representing variations in density of RGB are referred to as an R-value, a G-value and a B-value respectively or generically termed an RGB value. To be specific, the target image processing unit 41 calculates an average value (which will hereinafter be referred to as an average R-value) obtained by dividing a total of the R-values of the whole pixels contained in one block image by the pixel count thereof, an average value (which will hereinafter be referred to as an average G-value) obtained by dividing a total of the G-values of the whole pixels by the pixel count thereof and an average value (which will hereinafter be referred to as an average B-value) obtained by dividing a total of the B-values of the whole pixels by the pixel count thereof, respectively.

The target image processing unit 41 sets the RGB values of the whole pixels of the block image to the calculated average RGB value of the block image (refer to a numeric code 53 in FIG. 5). Specifically, with respect to each block image, the entire R-values are set to the average R-value, the entire G-values are set to the average G-value, and the entire B-values are set to the average B-value. With this setting, the colors of each block image are uniformed with the average RGB value of each block image. A numeric code 54 represents the target image thus undergoing the filtering process.

<<Target Image Converting Unit 42>>

Figure 6:
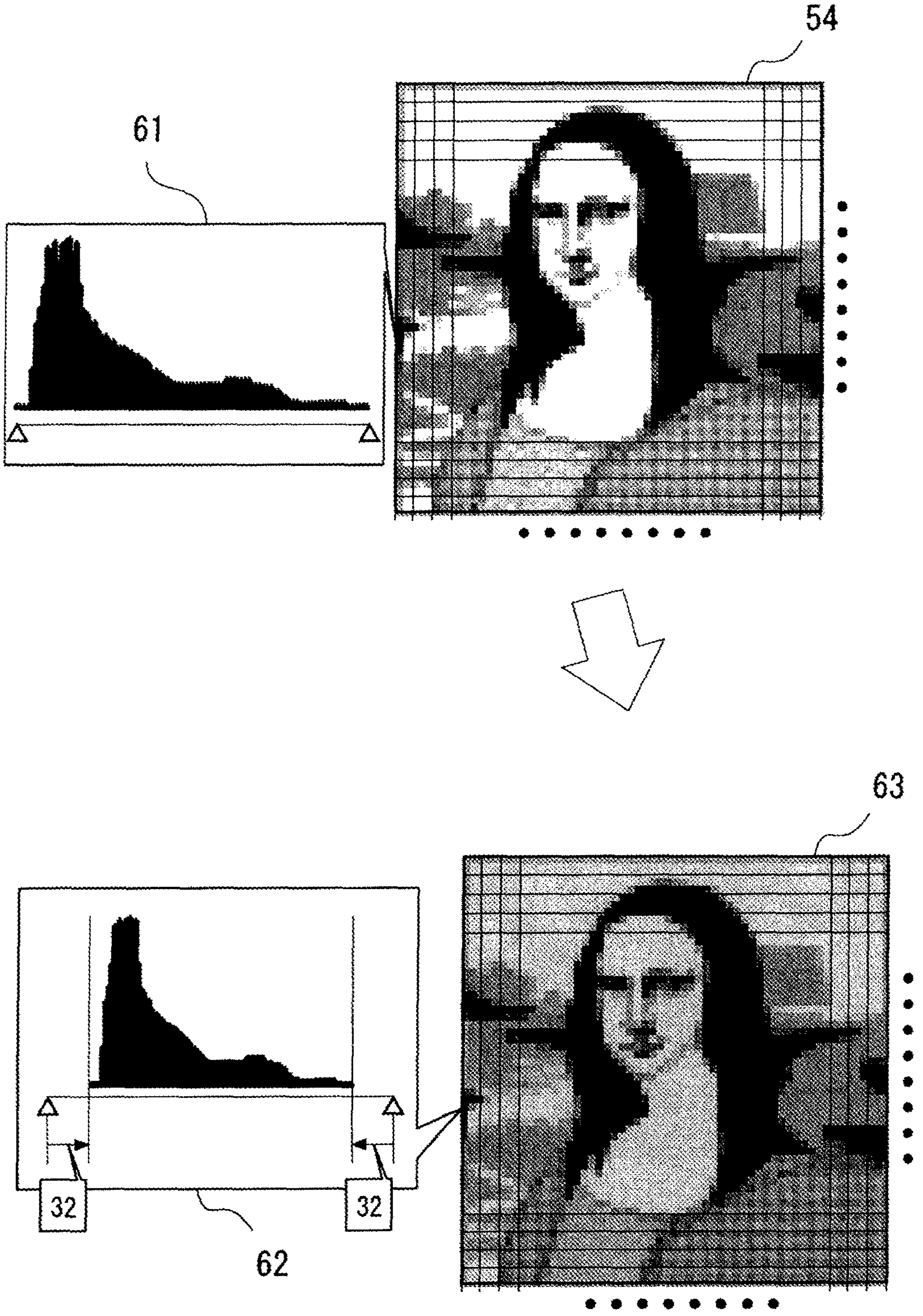
FIG. 6 is a conceptual diagram representing a target image converting process.

The target image converting unit 42 further executes a converting process shown in FIG. 6 with respect to the target image processed by the target image processing unit 41. FIG. 6 is a conceptual diagram representing the target image converting process. A numeric code 54 in FIG. 6 represents the target image that has undergone the filtering process of the target image processing unit 41. The target image 54, of which the respective block colors are uniformed into the average RGB value, has a density value distribution as indicated by a RGB histogram 61 in regard to each of the RGB values. In this RGB histogram 61, the density value is given along the axis of abscissa, and the pixel count having this density value is given along the axis of ordinate. In the case of taking an 8-bit notation of each of the RGB density values, a minimum density value to be allowed (a darkest density value) (which will hereinafter be termed an allowable minimum density value) is "0" given at the left edge of the RGB histogram 61, while a maximum density value to be allowed (a brightest density value) (which will hereinafter be termed an allowable maximum density value) is "255" given at the right edge of the RGB histogram 61.

The target image converting unit 42, with respect to the RGB values of the target image 54, compresses a unit width of RGB so as not to use a range of the allowable minimum density value through a predetermined density value and a range of the allowable maximum density value through the predetermined density value. It is preferable to use 32 (gradations) as the predetermined density value. In this case, the target image converting unit 42 compresses the unit width of the RGB so as not to use, for the target image 54, the density values equal to or smaller than the density value "31" but equal to or larger than the density value "224". An RGB histogram 62 in FIG. 6 represents an example of the histogram of the target image after being compression-processed.

The "compression" given herein connotes narrowing the width of the density value that can be taken while keeping the form (a density value distribution ratio) shown by the RGB histogram 61. Specifically, when the RGB value is expressed by 8 bits, the "compression" connotes narrowing the unit width of the density value so that the density values indicated from "0" through "255" are expressed from "32" through "223", while the central density value "127.5" remains unchanged. It is, however, general that the unit width of this density value can not be changed with "1" by the device, and therefore a new density value may be obtained by, e.g., rounding off decimal places after the compression process.

A numeric code 63 in FIG. 6 conceptually represents the target image that is compression-processed by the target image converting unit 42. FIG. 6 illustrates, though hard to comprehend due to its being a black & white (monochrome) drawing and a conceptual illustration as well, the target image 63 that lacks sharpness as compared with the target image 54 before the compression process because of not using ambient densities (color (gray) close to white or black) to the brightest density (the density value "255") and the darkest density (the density value "0") while maintaining a fixed tone. The execution of the compression process on the density value basis of the target image, makes it possible to prevent a decline of visual recognizability of the material image.

<<Block Image Processing Unit 43>>

The block image processing unit 43 acquires, as respective target density values, the respective RGB density values (gradation values) of each block image on the basis of the target image processed by the target image converting unit 42. This process, with respect to each block image, leads to acquisitions of an R target density value (which will hereinafter be referred to as an R target value), a G target density value (which will hereinafter be referred to as a G target value) and a B target density value (which will hereinafter be referred to as a B target value).

<<Material Image Acquiring Unit 46>>

The material image acquiring unit 46 acquires, from the mail control unit 32, the material image file 6, the image ID of this material image and the block ID defined as the positional information. Each of the function units, which will be described as below, sets one material image file 6 acquired by the material image acquiring unit 46 to a processing target. The function units, which process the material image files 6, may process the plurality of material image files 6 in parallel.

The material image acquiring unit 46 may temporarily store the material image files 6 transmitted from the mail control unit 32 in a buffer.

<<Material Image Preprocessing Unit 44>>

The material image preprocessing unit 44 acquires items of information on the block count and the block size from the setting information stored in the memory etc as described above. The material image preprocessing unit 44 acquires, based on the positional information (block ID) of the material image file 6 acquired by the material image acquiring unit 46, the information on the block image where the material image is to be placed from the target image processing unit 41. The information on the block image contains pieces of identifying information for specifying the block image, a shape and an image size of the block image, and so on.

The material image preprocessing unit 44 determines, corresponding to these acquired pieces of information, the shape and the image size of the material image within the material image file 6. The material image preprocessing unit 44 executes the image processing so that the material image within the material image file 6 takes the thus-determined shape and image size. In the first working example, the material image within the material image file 6 is resized and trimmed to a square image having 100 pixels by 100 pixels. The material image preprocessing unit 44 stores the thus-normalized normal material image file 30 in the display information storage unit 37.

<<Material Image Converting Unit 45>>

Figure 7:
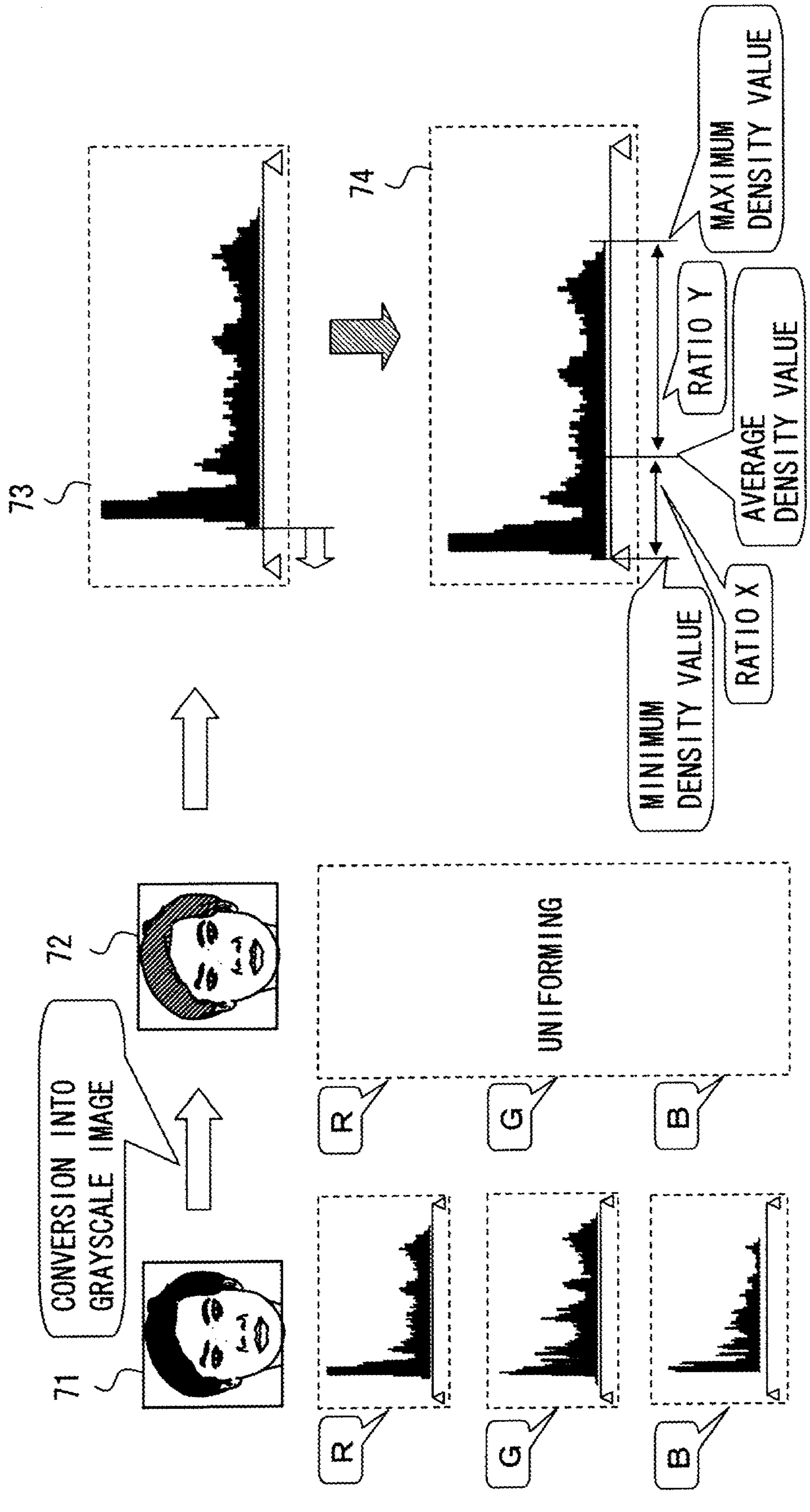
FIG. 7 is a diagram representing processing concepts of a material image converting unit and a material image calculating unit in the first working example.

The material image converting unit 45, as illustrated in FIG. 7, converts a material image file 71 processed by the material image preprocessing unit 44 into a grayscale image. The converted material image will hereinafter be referred to as a grayscale material image. The grayscale material image is an image expressed by only brightness information, in which the respective RGB values of the pixels are the same. FIG. 7 is a diagram representing a concept of processes of the material image converting unit 45 and the material image calculating unit 47 in the first working example.

The material image is converted into the grayscale material image, whereby dispersions of the RGB values of the material image can be eliminated. Hence, when the material image correcting unit 48 makes color-correction for the material image file, it is feasible to prevent a color, which does not exist in the material image, from being generated due to the dispersions of the RGB values and, by extension, to improve the visual recognizability of the material image.

Further, as shown in FIG. 7, a histogram of the grayscale material image 72 has the same information on each RGB. Hence, a calculation quantity in the calculation process of the material image calculating unit 47, which will be explained next, can be reduced by converting the material image into the grayscale image because it is sufficient that the calculation process is carried out with respect to only any one of RGB. Note that a variety of techniques such as a technique of taking a simple average or a weighted average of the RGB values are already known as a technique of the conversion into the grayscale image, and hence in-depth descriptions thereof are herein omitted.

<<Material Image Calculating Unit 47>>

The material image calculating unit 47 calculates, with respect to the grayscale material image 72 converted by the material image converting unit 45, a predetermined statistic value based on any one of RGB basic colors contained in the material image. A case of utilizing the R-value as the basic color will hereinafter be described by way of an example.

The material image calculating unit 47 extracts the minimum R-value in the R-values of the whole pixels contained in the grayscale material image 72. The material image calculating unit 47 subtracts this minimum R-value from the entire R-values of the material image. In other words, the material image calculating unit 47 shifts the R-value distribution in such a direction as to decrease the density value so that the extracted minimum R-value becomes the allowable minimum density value (0 (zero)). In the example of FIG. 7, a histogram 73 is converted into a histogram 74.

The material image calculating unit 47, with respect to the thus-converted R-histogram 74, calculates the minimum density value (which is the same as the allowable minimum density value), the maximum density value, the average density value and a ratio of the density values ranging from the minimum density value up to the average density value and the density values ranging from the average density value up to the maximum density value, respectively. The average density value is a value obtained by dividing a total of the R-values of the entire pixels in the converted histogram 74 by the pixel count. Hereafter, a ratio value in a smaller direction than the average density value is termed a dark density value, while a ratio in a larger direction than the average density value is termed a bright density value.

Figure 8:
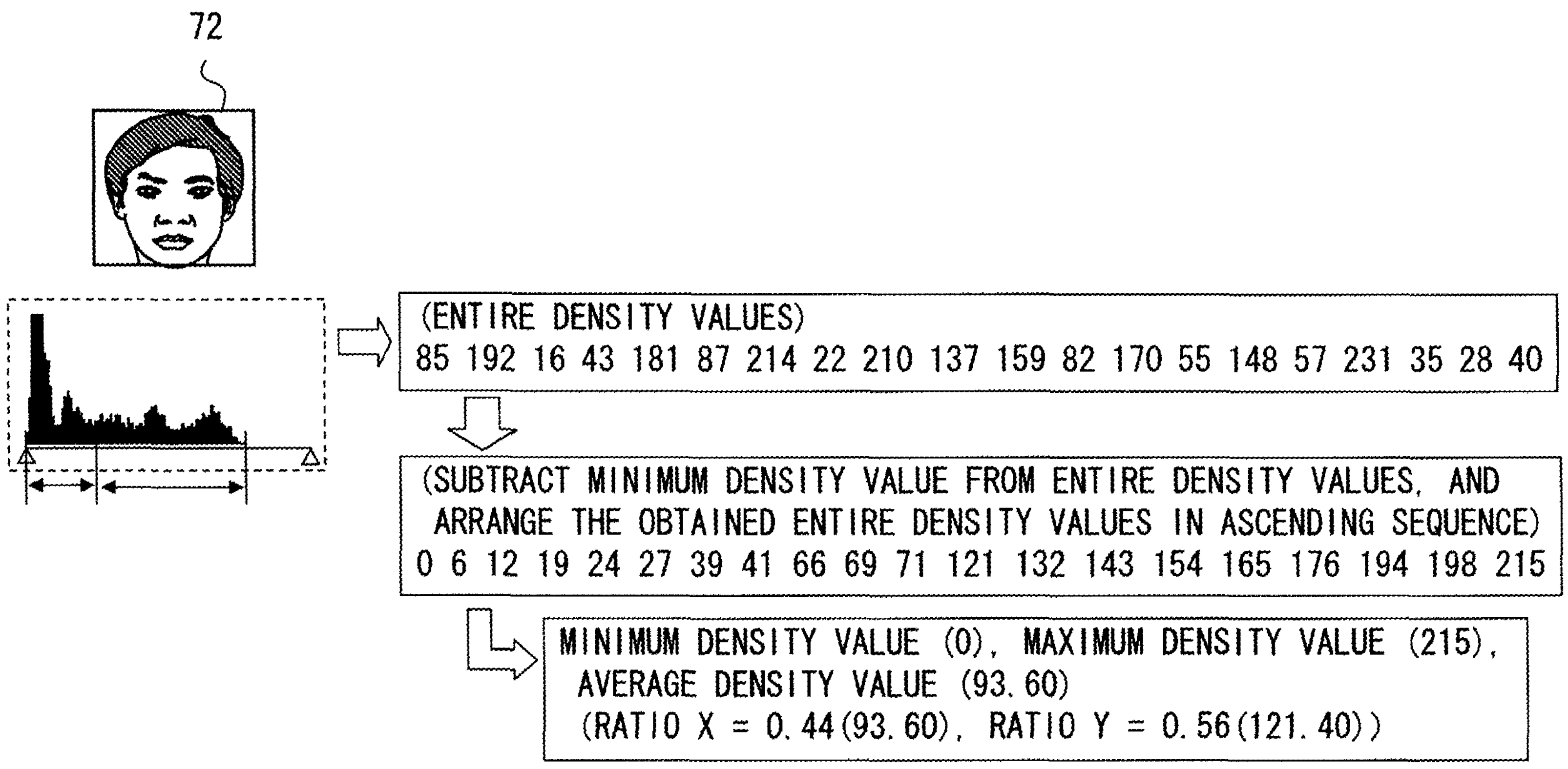
FIG. 8 is a diagram representing an example of how statistic values of the material image are calculated in the first working example.

FIG. 8 is a diagram representing an example of calculating the statistic values of the material image in the first working example. In this case, the material image calculating unit 47 extracts "16" as the minimum R-value from the R-values (the entire density values) of the whole pixels in the example of FIG. 8. The material image calculating unit 47 subtracts "16" from each of the R-values of the whole pixels. The material image calculating unit 47 calculates, based on the thus-converted R-value distribution, the respective statistic values such as the minimum density value (0), the maximum density value (215), the average density value (93.60), the dark density value (0.44, 93.60) and the bright density value (0.56, 121.40). These calculated statistic values are processed respectively as the statistic values of RGB.

<<Material Image Correcting Unit 48>>

The material image correcting unit 48 acquires the respective statistic values related to the grayscale material image 72 processed by the material image calculating unit 47, and further acquires the identifying information which specifies the image of the block in which the material image 72 is placed. Moreover, the material image correcting unit 48 acquires, from the block image processing unit 43, the R target value, the G target value and the B target value of the image of the block in which the material image 72 is placed. The material image correcting unit 48 makes the color-correction of the material image 72 so that the material image average density value calculated by the material image calculating unit 47 becomes the R target value, the G target value and the B target value of the target block image.

Figure 9:
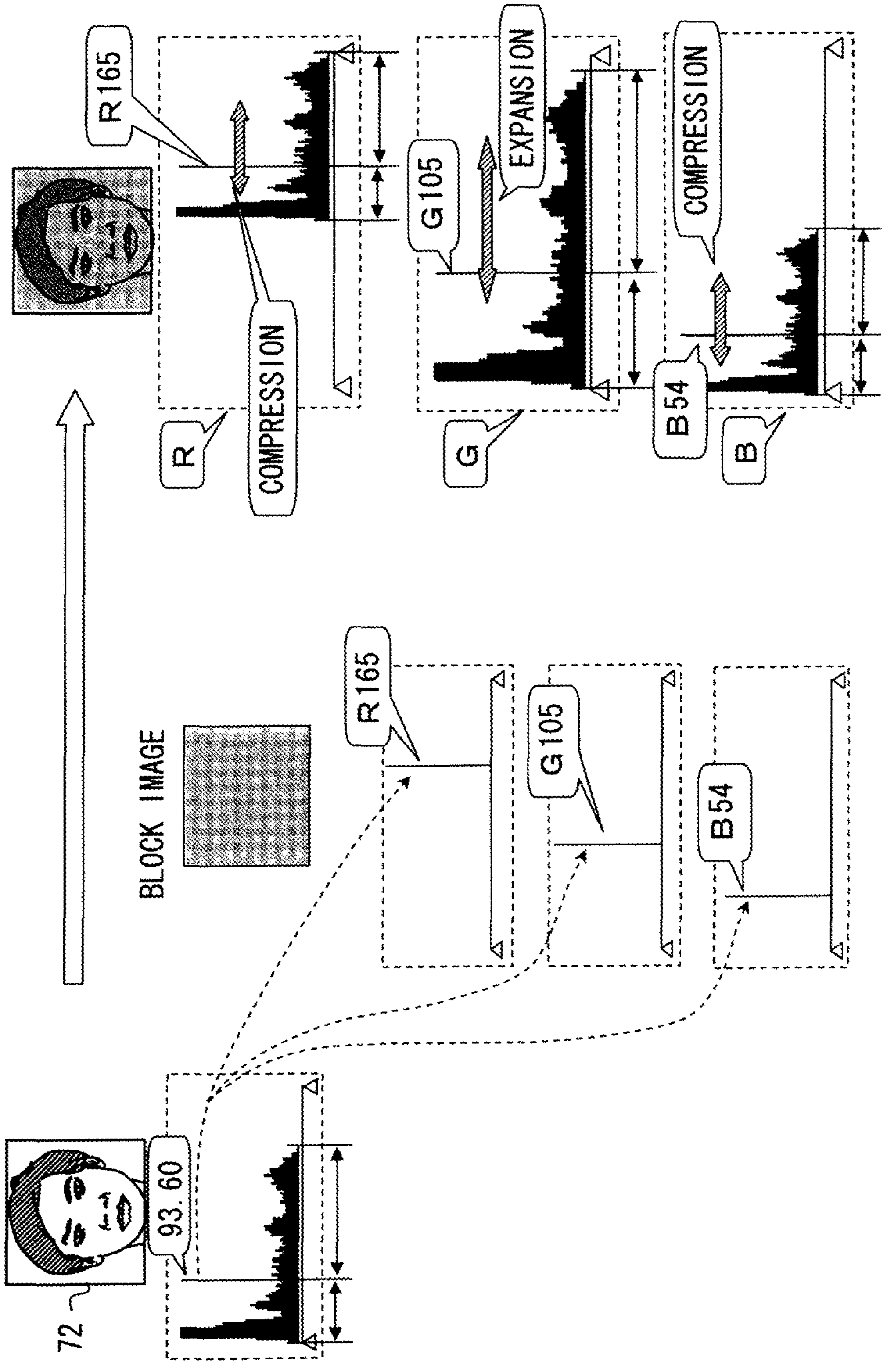
FIG. 9 is a diagram representing an example of a color-correcting process of the material image in the first working example.

FIG. 9 is a diagram illustrating an example of a color correction process of the material image in the first working example. The average density value of the material image 72 is calculated at 93.60 by the material image calculating unit 47 as described above. The RGB target values of the block image of the block in which the material image 72 should be placed are determined by the block image processing unit 43 so that the R target value is 165, the G target value is 105 and the B target value is 54.

The material image correcting unit 48 corrects the entire R-values of the material image 72 so that the average density value (93.60) becomes the R target value (165) of the block image. Similarly, the material image correcting unit 48 corrects the entire G-values of the material image 72 so that the average density value (93.60) becomes the G target value (105) of the block image, and corrects the entire B-values thereof so that the average density value (93.60) becomes the B target value (54) of the block image.

Herein, when the average density value of the original material image is shifted to the target density value, there are a case in which the maximum density value of the original material image exceeds the allowable maximum density value and a not-exceeding case. The material image correcting unit 48, when determining that the maximum density value exceeds the allowable maximum density value, reduces (compresses) the distribution width of the original material image so that the maximum density value becomes the allowable maximum density value in a status of fixing the average density value to the target density value. In the example of FIG. 9, the R-value of the material image is thus corrected.

While on the other hand, the material image correcting unit 48, when determining that the maximum density value does not exceed the allowable maximum density value, compresses or expands the distribution width of the original material image so that the average density value becomes the target density value in a status of fixing the minimum density value to the allowable minimum density value. If the original average density value is larger than the target density value, the distribution width is reduced, and, whereas if the original average density value is smaller than the target density value, the distribution width is expanded. In the example of FIG. 9, the distribution width of the G-value of the material image is expanded, while the distribution width of the B-value is reduced.

Figure 10:
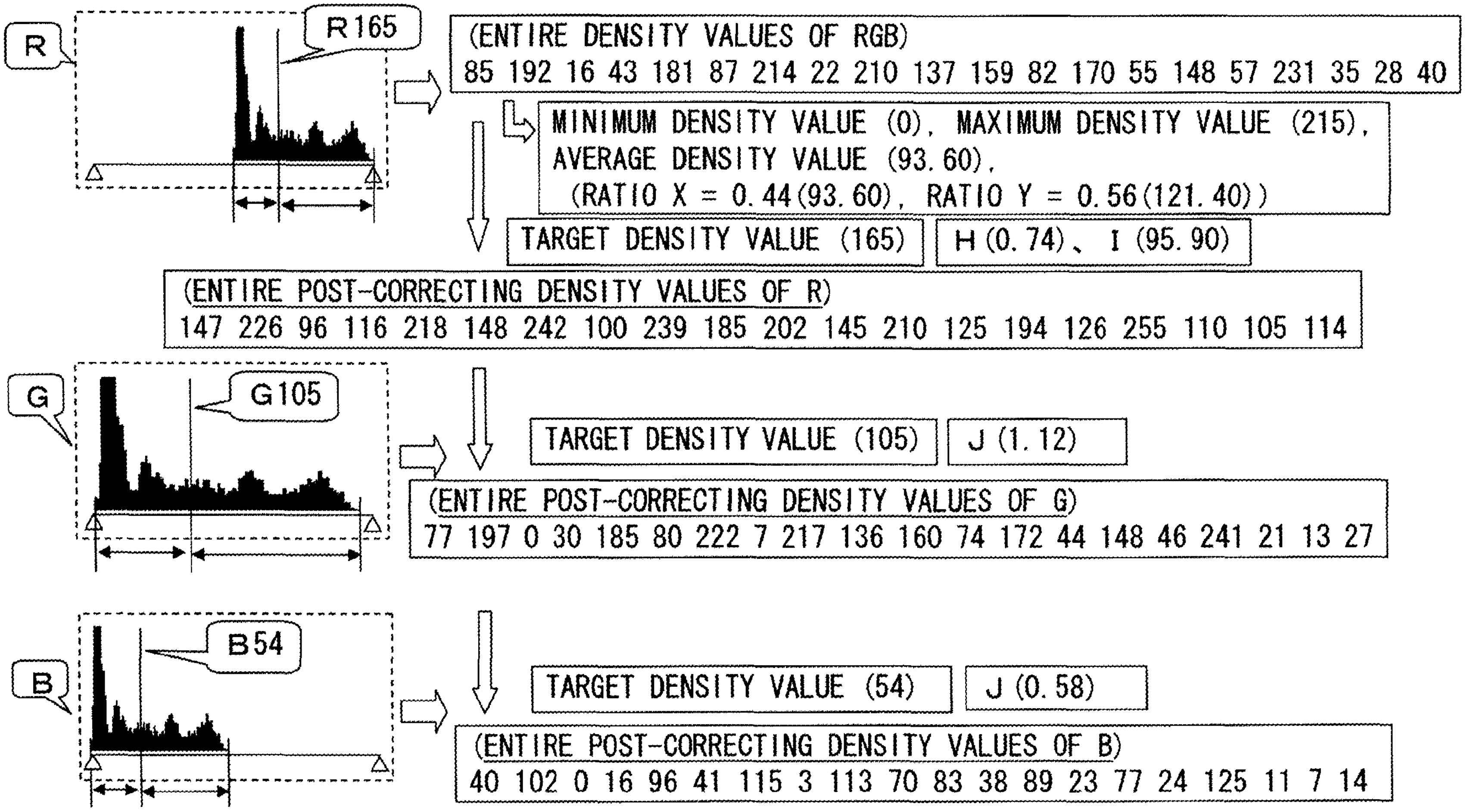
FIG. 10 is a diagram representing a specific example of a correcting process of the material image in the first working example.

Thus, the material image correcting unit 48 executes the process so as to retain the tone of the material image to the greatest possible degree in order to enhance the visual recognizability of the material image while making the material image close to the tone of the block image for enhancing the visual recognizability of the entire mosaic image. A specific processing example of the material image correcting unit 48 will hereinafter be described with reference to FIG. 10. FIG. 10 is a diagram representing the specific example of the process of correcting the material image in the first working example, and illustrates an example in which the material image has the RGB values shown in FIG. 8.

The material image correcting unit 48, at first, as shown in below, determines whether or not a value obtained by dividing the target value by the dark density value (0.44) exceeds the allowable maximum density value (255) with respect to each of RGB.

$$R\ \text{Target Value}(165)/\text{Dark Density Value}\ (0.44)=375 \quad \text{(R-Value)}$$

$$G\ \text{Target Value}(105)/\text{Dark Density Value}(0.44)=238.64 \quad \text{(G-Value)}$$

$$B\ \text{Target Value}(54)/\text{Dark Density Value}(0.44)=122.73 \quad \text{(B-Value)}$$

The material image correcting unit 48, when determining that the calculated value exceeds the allowable maximum density value, corrects each density value of each pixel of the original material image by use of the following (Formula A). Note that “255” represents the allowable maximum density value.

$$(\text{Original Density Value}-\text{Minimum Density Value})\times H+I \quad \text{(Formula A)}$$

$$H=(255-\text{Target Value})/\text{Bright Density Value}$$

$$I=255-(\text{Maximum Density Value}\times H)$$

On the other hand, the material image correcting unit 48, when determining that the calculated value does not exceed the allowable maximum density value, corrects each density value of each pixel of the original material image by use of the following (Formula B).

$$(\text{Original Density Value}-\text{Minimum Density Value})\times J \quad \text{(Formula B)}$$

$$J=\text{Target Value}/\text{Dark Density Value}$$

According to the example of FIG. 10, the material image correcting unit 48 corrects the whole R-values of the material image with the (Formula A) and corrects the whole G-values and the whole B-values with the (Formula B). To be specific, with respect to the R-value, H is 0.74 (=(255−165)/121.40), and I is 95.90 (=255−(215*0.74)). As for the G-value, J is 1.12 (=105/93.60), and, with respect to the B-value, J is 0.58 (=54/93.60). Thus, the material image correcting unit 48 corrects each color of RGB of the material image.

<<Mosaic Image Generating Unit 49>>

The mosaic image generating unit 49 replaces the block image in which this material image in the target image file should be placed with the material image that is color-corrected by the material image correcting unit 48. The mosaic image generating unit 49 replaces the block image with each of the plurality of material image files, thereby generating the mosaic image file 8. Herein, the discussion is made, which purports that the mosaic image is generated by replacing the target block image in the target image file with the material image, however, the mosaic image may also be generated from a new image file simply even if the material image can be placed in the should-be-placed block position.

As for a position in which any material image does not exist, the block image in this position may be placed therein, and an image assuming a predetermined color may also be disposed so as to facilitate recognition that the block is an empty block in which the material image is not yet arranged. Hereafter, the image placed in the empty block is termed an empty block image. The mosaic image generated by the mosaic image generating unit 49 has the image size (pixel count) specified by the setting information used by the target image processing unit 41, and includes the material images or the empty block images of which the number corresponds to the number of segments. Accordingly, the mosaic image generated in the first working example is formed by the material images or the empty block images arranged in totally 6561 blocks of 81 blocks by 81 blocks, and has the image size equivalent to totally 65.61 mega pixels of 8100 pixels by 8100 pixels.

<<Display Image Generating Unit 35>>

The display image generating unit 35 receives the mosaic image file 8 generated by the mosaic image generating unit 49 described above, and resizes or segments this mosaic image. With this operation, the display image generating unit 35 generates the display image file group 38 used for displaying on the mobile terminal 2, and stores the generated display image file group 38 in the display information storage unit 37.

Figure 11:
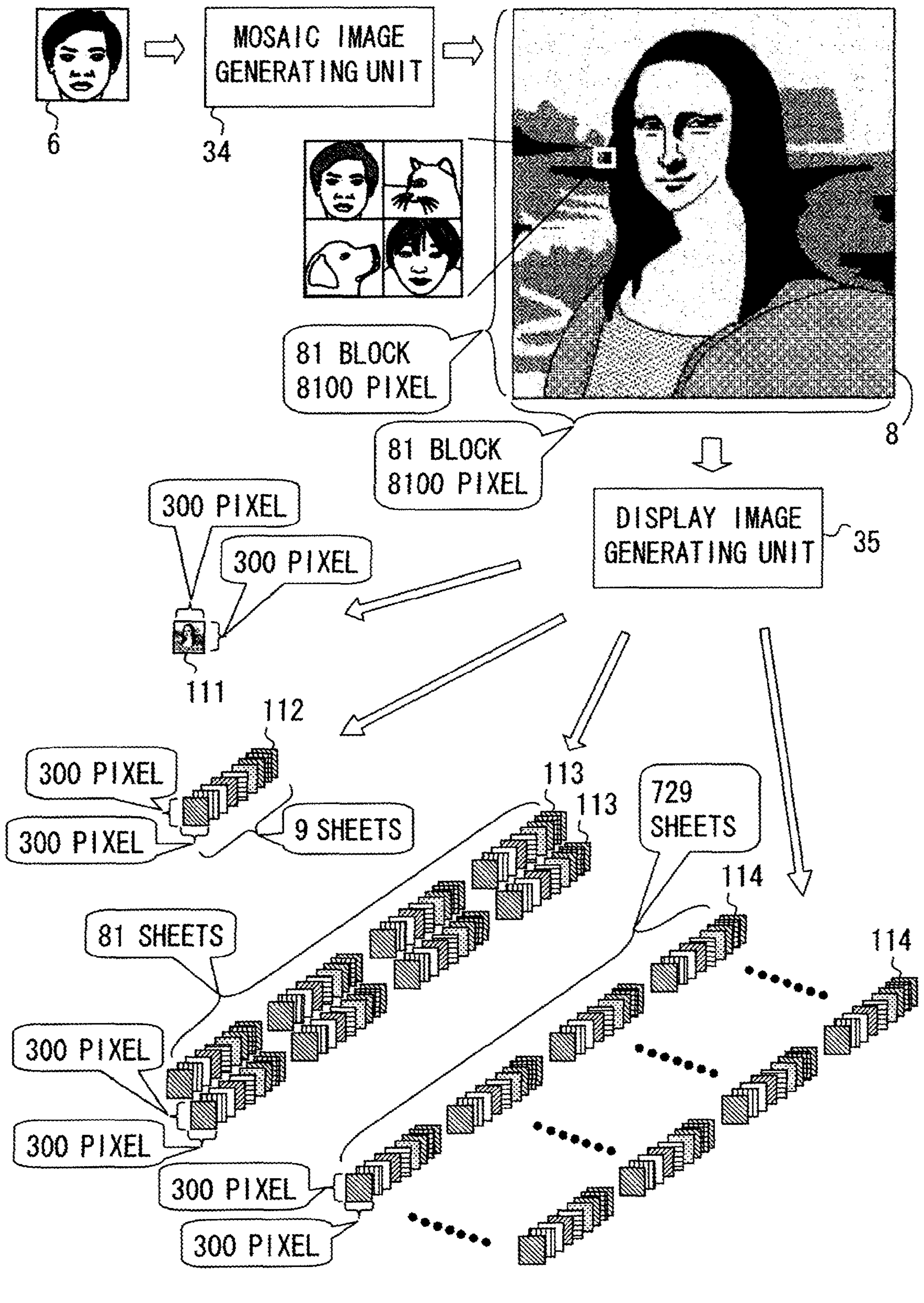
FIG. 11 is a conceptual diagram representing inputs and outputs of the mosaic image generating unit and a display image generating unit.

FIG. 11 is a conceptual diagram representing inputs and outputs of the mosaic image generating unit 34 and the display image generating unit 35. As explained above, the mosaic image generating unit 34 receives an input of the material image files 6 and thus generates the mosaic image file 8. The display image generating unit 35 receives an input of this mosaic image file 8.

The display image generating unit 35 generates the display image file group 38, of which a type corresponds to a predetermined number of stages provided for the zoom display (the zoom-out display and the zoom-in display) of the mosaic image on the mobile terminal 2. The first working example, since four stages are provided as the predetermined number of stages, involves generating four types of display image file groups 38 (the numeric codes 111, 112, 113 and 114 shown in FIG. 11). It should be noted that the present invention does not restrict the number of zoom display stages.

Figure 12:
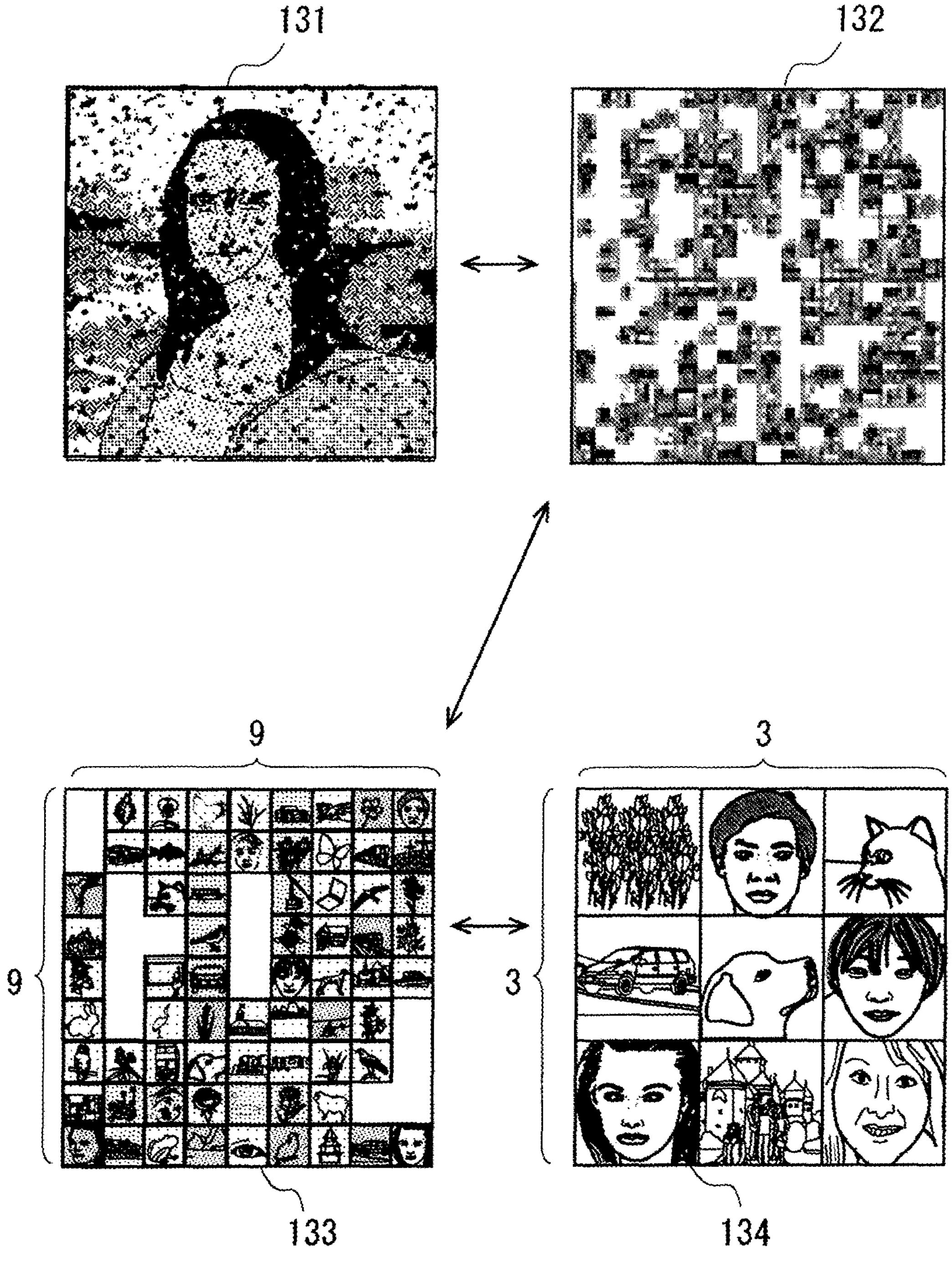
FIG. 12 is a diagram representing zoom-display of the mosaic image on the mobile terminal.

Each of the four types of display image file groups 38 will hereinafter be described with reference to FIG. 12. FIG. 12 is a diagram representing the zoom display of the mosaic image on the mobile terminal. Note that the following discussion exemplify a case where the mobile terminal 2 has specifications of the screen capable of displaying the image having a dimension of 300 pixels by 300 pixels.

Figure 43:
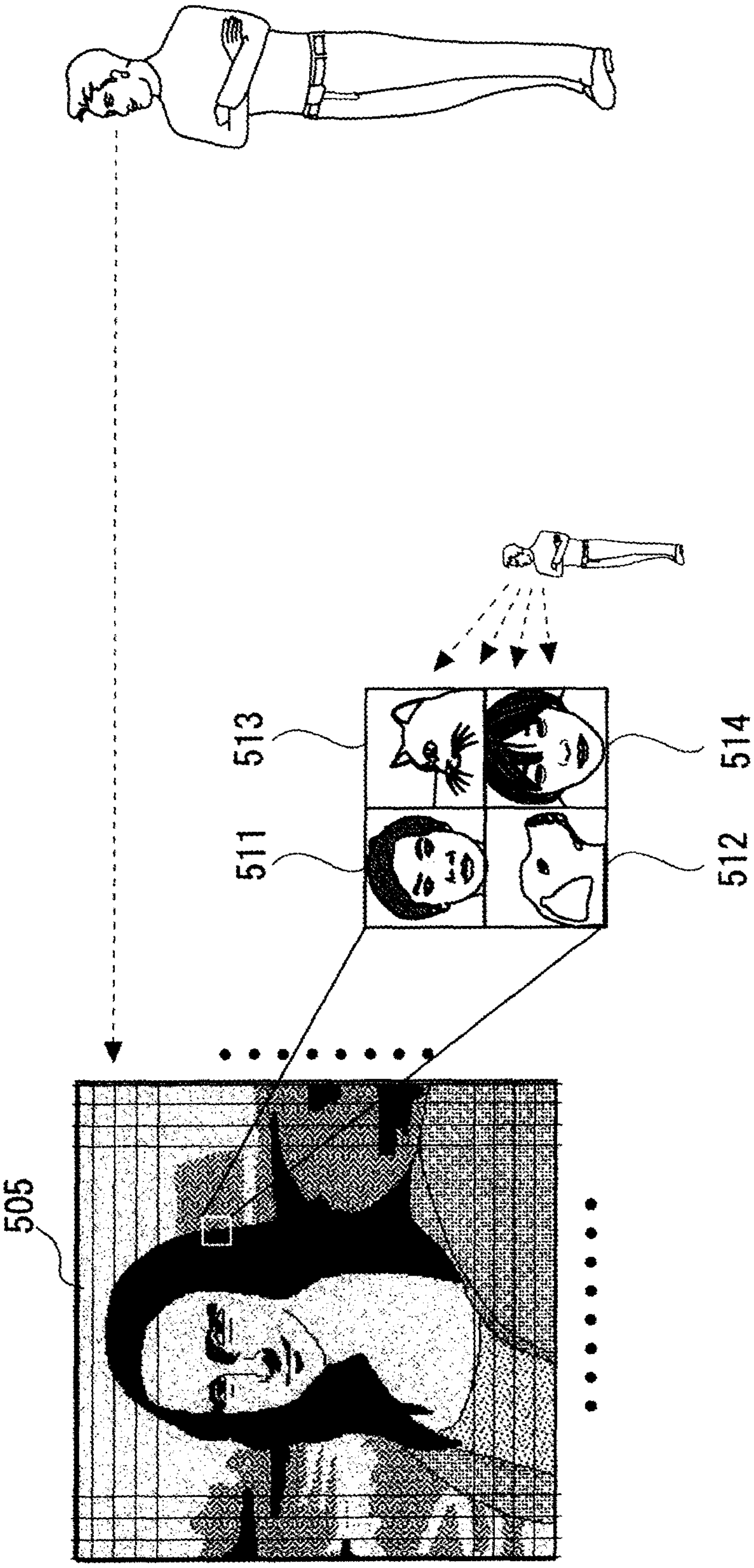
FIG. 43 is a diagram illustrating an example of photo mosaic.

A display image file 111 is a file for forming a first screen 131 displayed on the mobile terminal 2. The first screen 131 displays the mosaic image that is zoomed out most. To be specific, the first screen 131 shows a whole image of the mosaic image that is visually recognized when looking at a mosaic image 505 in FIG. 43 from a remote place as well as being the image in the state of containing, though unable to visually recognize the individual material images, all of these material images. As illustrated in FIG. 11, the display image file 111 contains the image of 300 pixels by 300 pixels.

Each of display image files 112 is a file for organizing a second screen 132 displayed on the mobile terminal 2. The second screen 132 shows one screen unit of the mosaic image zoomed in at one stage (which will hereinafter be referred to as a second-stage mosaic image) from the first screen 131. In the first working example, this second-stage mosaic image is to be an image into which the first screen 131 is enlarged nine times (threefold by threefold) at an area ratio. With this enlargement, the display image generating unit 35 generates nine sheets of display image files 112 each having the same size (300 pixels by 300 pixels) of one screen unit as the first screen 131 has. As a result, each of the display image files 112 contains the material images or the empty block images of 729 blocks (this block count is obtained by dividing totally 6561 blocks by 9).

Each of display image files 113 is a file for organizing a third screen 133 displayed on the mobile terminal 2. The third screen 133 shows one screen unit of the mosaic image further zoomed in at one stage (which will hereinafter be referred to as a third-stage mosaic image) from the second screen 132. In the first working example, this third-stage mosaic image is an image into which the first screen 131 is enlarged eighty-one times (ninefold by ninefold) at the area ratio. With this enlargement, the display image generating unit 35 generates eighty-one sheets of display image files 113 each having the same size (300 pixels by 300 pixels) of one screen unit as the first screen 131 has. As a result, each of the display image files 113 contains the material images or the empty block images of 81 blocks (this block count is obtained by dividing totally 6561 blocks by 81).

Each of display image files 114 is a file for organizing a fourth screen 134 displayed on the mobile terminal 2. The fourth screen 134 shows one screen unit of the mosaic image still further zoomed in at one stage (which will hereinafter be referred to as a fourth-stage mosaic image) from the third screen 133. In the first working example, this fourth-stage mosaic image is an image into which the first screen 131 is enlarged seven-hundred twenty-nine (729) (27-fold by 27-fold) at the area ratio. With this enlargement, the display image generating unit 35 generates 729-sheets of display image files 114 each having the same size (300 pixels by 300 pixels) of one screen unit as the first screen 131 has. As a result, each of the display image files 114 contains the material images or the empty block images of 9 blocks (this block count is obtained by dividing totally 6561 blocks by 729). The fourth screen 134 enables the user to visually recognize the user's own material image clearly.

Figure 13:
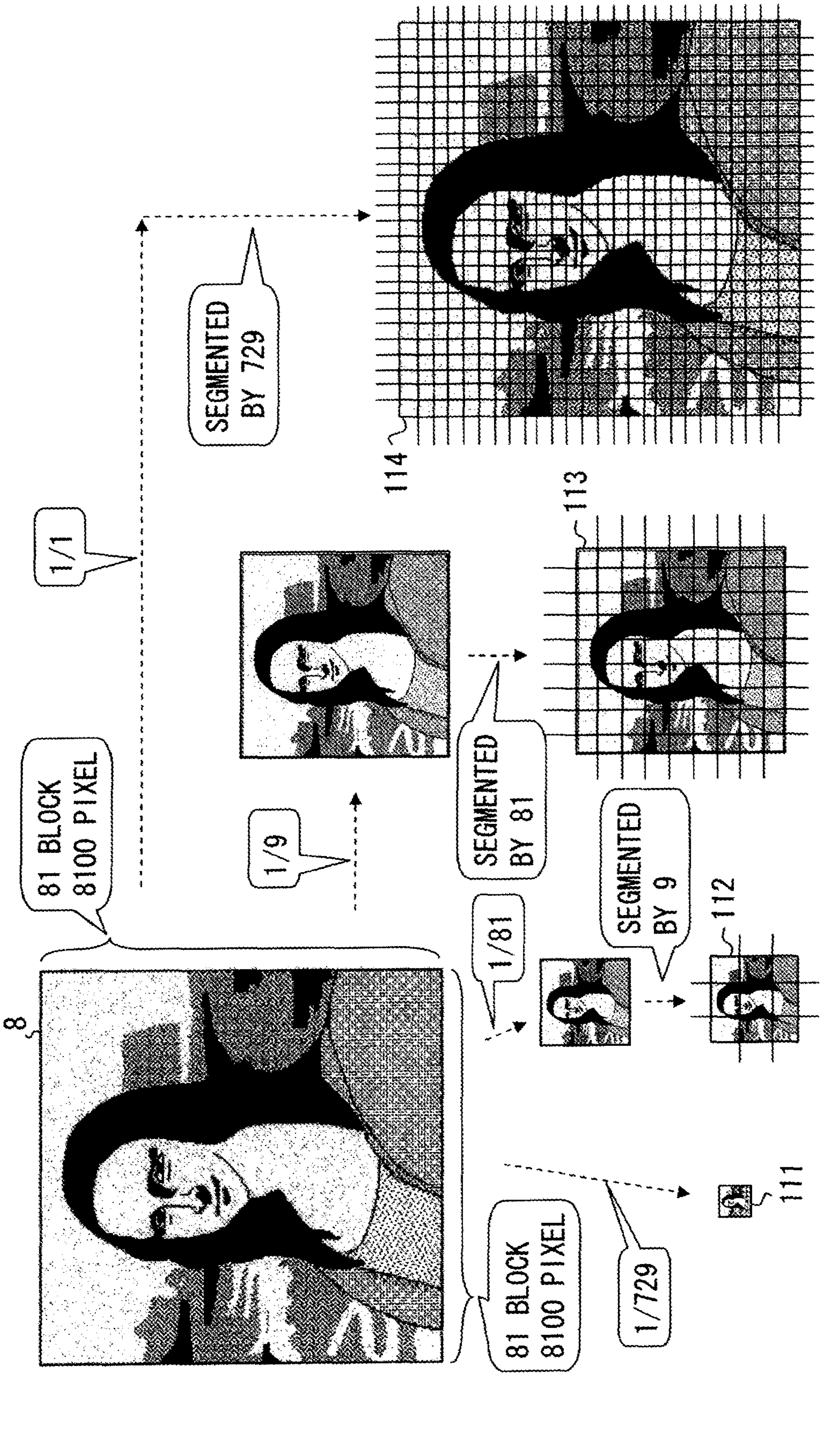
FIG. 13 is a conceptual diagram representing a generating process of a display image file group by the display image generating unit.

FIG. 13 is a conceptual diagram representing a process of how the display image generating unit 35 generates the display image file group 38. The display image generating unit 35 generates the display image file group 38 described above in the following way.

The display image generating unit 35, upon receiving the mosaic image file 8, makes four copies of this file 8. The display image generating unit 35 reduces one of the copied mosaic images to a scale of 1/729, another copy to a scale of 1/81 and still another copy to a scale of 1/9. One residual mosaic image remains unreduced.

The display image generating unit 35 outputs the mosaic image reduced by the factor of 729 in a status quo as the display image file 111. The display image generating unit 35 segments the mosaic image reduced by the factor of 81 into nine pieces of segment images, and outputs each segmented image as the display image file 112. The display image generating unit 35 segments the mosaic image reduced by the factor of 9 into 81 pieces of segment images, and outputs each segment image as the display image file 113. The display image generating unit 35 segments the intact-copied mosaic image into 729 pieces of segment images, and outputs each segment image as the display image file 114. The display image generating unit 35 stores the four types of thus-output display image file groups 38 in the display information storage unit 37.

It should be noted that the present invention does not restrict the technique by which the display image generating unit 35 generates the display image file groups, and the technique may be changed by taking the following points of view into consideration in a way that takes account of the image size (pixel count) and the block count of the target image specified by the setting information and the screen specifications of the mobile terminal 2 as well.

The image size of one screen unit displayed on the mobile terminal 2 is set to a size of one display screen (which will hereinafter be referred to as a unit size). The display image corresponding to the maximum zoom-out display, i.e., the mosaic image reduced at the minimum, is generated in reduction so that the mosaic image generated corresponding to the size of the target image becomes the unit size.

While on the other hand, with respect to the display image corresponding to the maximum zoom-in display, such a size is determined that the size of each display image is the unit size and each cell displayed on the display image is coincident with each block. A reduction rate and a segment count of the mosaic image generated corresponding to the size of the target image are determined based on the thus-determined size of each display image. As for the residual display image, the reduction rate of the mosaic image generated in the image size of the target image is determined corresponding to the stage count of the corresponding zoom display, and the segment count is determined so that each of the post-segmenting image becomes the minimum unit.

[Mobile Terminal 2]

Figure 14:
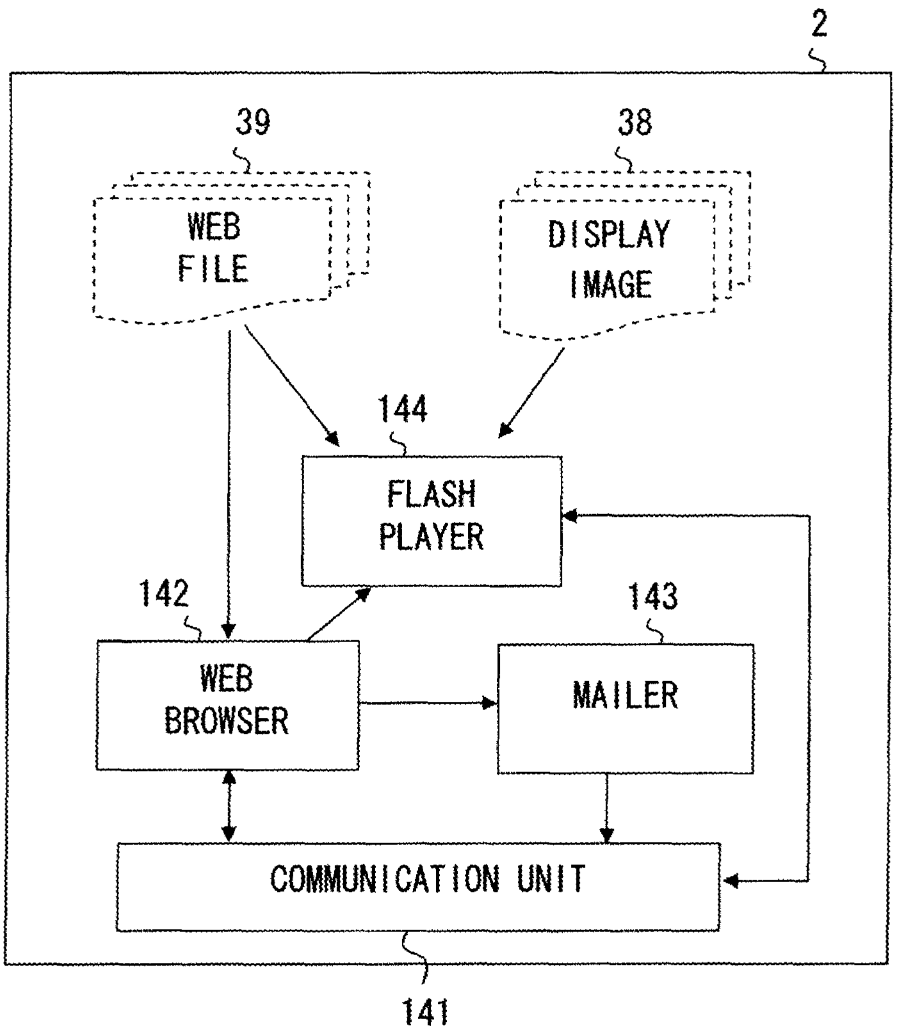
FIG. 14 is a block diagram representing a conceptual configuration of a function of the mobile terminal in the first working example.

FIG. 14 is a block diagram representing a conceptual configuration of the functions of the mobile terminal 2 in the first working example. The mobile terminal 2 includes, as shown in FIG. 14, the communication unit 141, a WEB browser 142, a mailer 143, a FLASH player 144, etc. The mobile terminal 2 is, these applications being executed, provided with the mosaic image providing service described above.

The communication unit 141 controls the NI controller 24 and processes the data transmitted and received to and from the server 10 on the basis of the protocols such as HTTP, SMTP and POP. The communication unit 141 receives the WEB file 39, the display image data 38, etc transmitted from the server 10. Further, the communication unit 141 carries out the communications with the server 10, which accompany the operation on the screen displayed by the WEB file 39 and the display image data 38. Moreover, the communication unit 141, in the case of transmitting the mail to the server 10, executes the protocol for transmitting the mail and transmits the mail data to the server 10.

The WEB browser 142 gets the WEB file 39, which is provided from the server 10, displayed on the display and controls the user's operation corresponding to this display. The WEB browser 142, if the WEB file 39 contains a data file such as the SWF file and the JAVA (registered trademark) file for executing the predetermined process, gets an application for executing this data file to run as plug-in software on the WEB browser.

For example, if the WEB file 39 contains the SWF file, the FLASH player 144 for executing the SWF file is invoked as shown in FIG. 14. The FLASH player 144 executes the SWF file, thereby displaying the rich screen on the WEB browser 142 that will be explained later on and realizing a predetermined user interface (UI). Note that if the WEB file 39 contains no such data file, the FLASH player 144 is not required to be installed in the mobile terminal 2.

An in-depth description of the user interface of the mosaic image providing service actualized on the mobile terminal 2 such as this, will be given later on.

[Operational Example]

An operational example of the mosaic image providing system in the first working example will be discussed along with the user interface provided by this system. As described above, the display image data 38 and the WEB file 39 are downloaded into the mobile terminal 2 and executed by the WEB browser 142 etc, whereby the user interface is realized on the mobile terminal 2.

Figure 15:
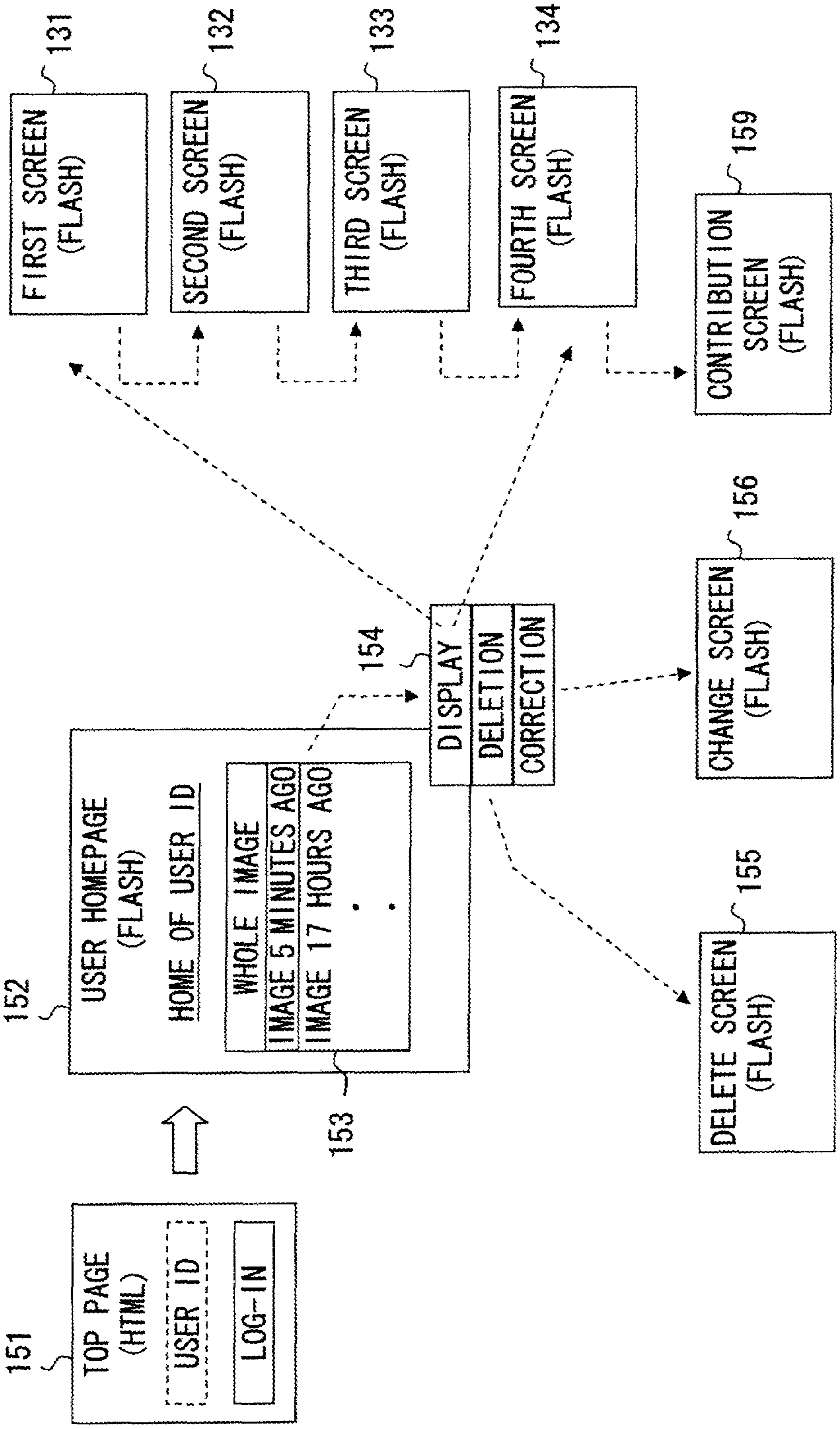
FIG. 15 is a diagram representing a processing flow of a user interface for a mosaic image providing service in the first working example.

FIG. 15 is a diagram representing a user interface flow of the mosaic image providing service in the first working example.

The user executes the WEB browser 142 on the mobile terminal 2 and thus accesses the mosaic image providing system in the first working example. A top page 151 is thereby displayed on the mobile terminal 2. The top page 151 is realized by, e.g., the HTML file. At this time, on the server 10, the display image control unit 33, in response to the access from the mobile terminal 2, extracts the HTML file as the WEB file 39 for creating the top page from the display information storage unit 37, and transmits this HTML file to the mobile terminal 2.

The user inputs the user's own ID to the top page 151 by operating the mobile terminal 2 and logs in to the present mosaic image providing system 1 by selecting a log-in button etc. At this time, this user ID is transmitted to the server 10 from the mobile terminal 2, and the predetermined function unit of the server 10 determines whether this user ID has already been registered or not, thus authenticating the user.

Upon completing the user authentication, the display image control unit 33 of the server 10 extracts the WEB file 39 for creating a user homepage 152 specified by the user ID from the display information storage unit 37. The user homepage 152 is actualized by, e.g., FLASH. Hence, the display image control unit 33 transmits the WEB file 39 containing this FLASH file to the mobile terminal 2. On the mobile terminal 2, the FLASH player 144 executes the downloaded FLASH, whereby the user homepage 152 is displayed on the WEB browser 142. At this time, when there exist an image file, a sound file, etc necessary for this page, the thus-executed FLASH requests the server 10 for these files. The display image control unit 33 of the server 10 extracts the requested files from the display information storage unit 37 and sequentially downloads the files into the mobile terminal 2. A page (screen) realized by another FLASH is actualized by the same operation, and hence an explanation of the detailed operation is omitted as the case may be.

Displayed in the user homepage 152 is a display menu 153 for selecting a want-to-display mosaic image together with a user name associated with the user ID. Note that if the user can be authenticated by another function, the user homepage 152 may be directly displayed without displaying the top page 151.

The display menu 153 includes a menu (an [entire image] menu in FIG. 15) for making the maximum zoom-out display of the mosaic image, a menu for displaying the image contributed by the user, and so on. The menu for displaying the user contribution image is displayed to enable the image to be selected on a per-contribution-date/time basis ([image 5 minutes ago], [image 17 hours ago] in FIG. 15). The information on the contribution date/time is acquired in such a way that the FLASH executed on the mobile terminal 2 queries the server 10 and the display image control unit 33 of the server 10 searches through the mosaic image information DB 36. The display information storage unit 37 of the server 10 is, as described above, stored with the normal material images of the individual users on the per-contribution-date/time basis.

Figure 16:
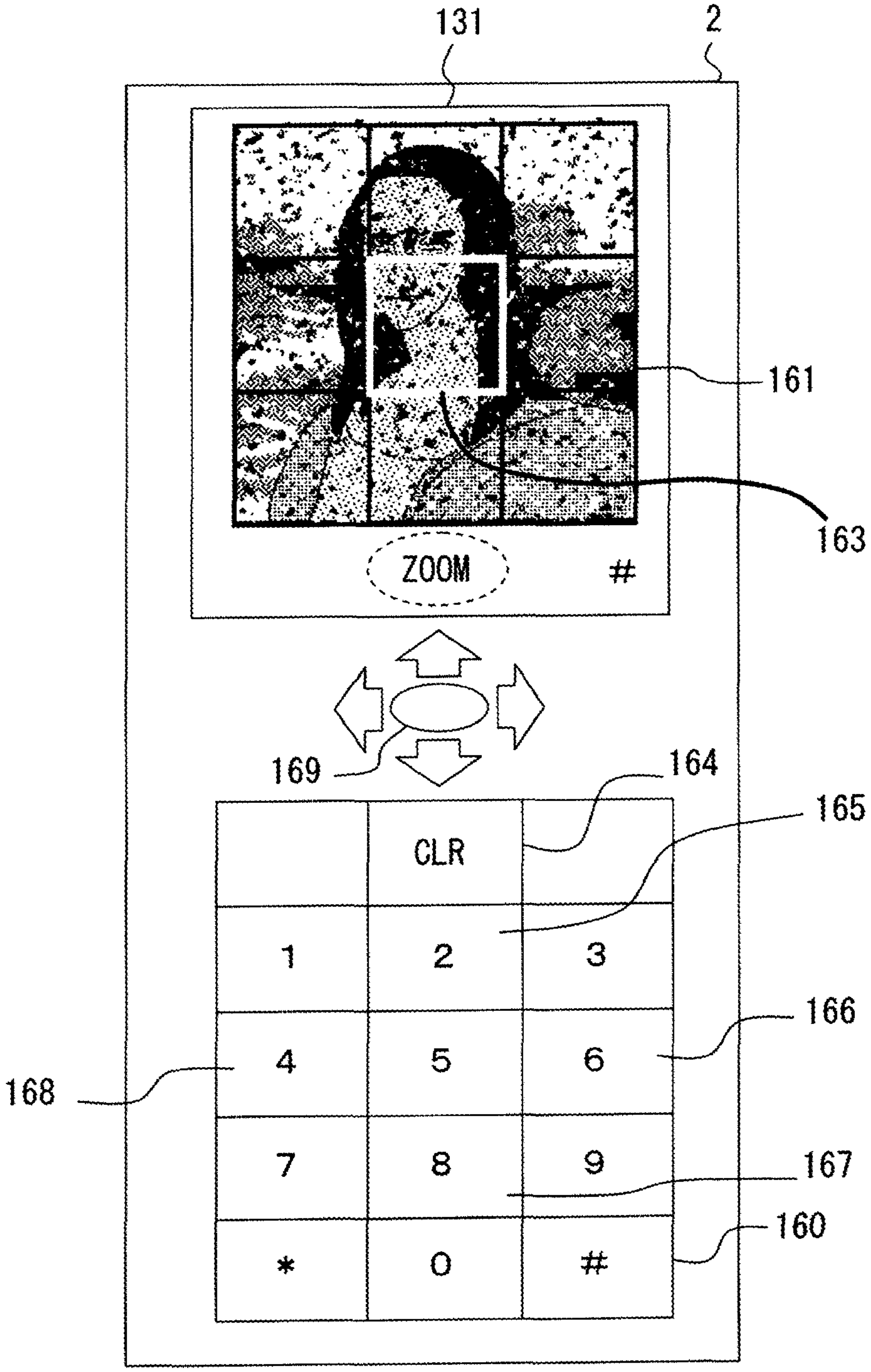
FIG. 16 is a diagram representing an example of an arrangement on a first screen 131.

When the [entire image] menu in the user homepage 152 is selected, the first screen 131 is displayed. The first screen 131 is realized by, e.g., the FLASH and is displayed as shown in FIG. 16. FIG. 16 is a diagram representing an example of a structure of the first screen 131. Note that the key arrangement, the display layout, the display shape, etc on the mobile terminal 2 shown in FIG. 16 are merely exemplifications. The allocation of the keys having the respective functions is also a mere exemplification, but is not limited to the following example.

The FLASH file for realizing the first screen 131 is downloaded as the WEB file 39 and then executed on the mobile terminal 2, at which time the FLASH requests the server 10 for the display image file 111 (see FIG. 11) and displays, in a display area 161, the mosaic image contained in the downloaded display image file 111. This mosaic image is a mosaic image that is zoomed out at the maximum. In the first working example, this mosaic image has the image size (pixel count) of 300 pixels by 300 pixels. If the mobile terminal 2 is unable to display this image size in the status quo, the FLASH player 144 reduces the image size down to a display-enabled size. The FLASH executes and thus actualizes the process related to the first screen 131, which will hereinafter be described.

On the occasion of displaying the first screen 131, the nine cells are formed in a selectable mode on the mosaic image within the display area 161. The first screen 131 is displayed, in which state a selection frame 163 is displayed when selecting a numeral key 165, 166, 167 or 168 or a determination key 169. The selection frame 163 is displayed for the user to select any one of the cells displayed within the display area 161. The selection frame 163 is moved by operating the numeral key 165, 166, 167 or 168. The selection frame 163 is erased by operating, e.g., a "#" key 160.

The user selects the cell indicating a want-to-see area of the mosaic image in the display area 161 with the selection frame 163, and then operates the determination key 169. With this operation, the second screen 132 (see FIG. 12) in which the selected cell area is displayed in the zoom-in mode is displayed.

At this time, the memory of the mobile terminal 2 retains items of information on the respective display images at the second stage that should be displayed next when selecting each cell. These items of information are downloaded together with the display image file 111 from the server 10. The specific items of information are file identifying information for specifying the respective nine display image files 112 that organize the mosaic image at the second stage, associative relation information between each piece of file identifying information and each cell, and so forth.

Through this process, the FLASH, when any one of the cells is selected on the first screen 131, transmits the file identifying information retained in the way of being associated with the selected cell to the server 10. The display image control unit 33 of the server 10 extracts the display image file 112 specified by the file identifying information from among the nine display image files 112 and downloads the extracted file 112. As a result, the second screen 132 at the next zoom display stage is displayed on the mobile terminal 2. As a consequence, the second screen 132 at the next zoom display stage is displayed on the mobile terminal 2.

Similarly, when downloading the display image file 112, the server 10 downloads, into the mobile terminal 2, the file identifying information for specifying each of the nine display image files 113 (see FIG. 11) that should be displayed in the case of displaying the display image in the zoom-in mode and the associative relation information between these pieces of file identifying information and the respective cells.

It is to be noted that the present invention does not restrict the key operation itself but may take whatever operation methods if capable of selecting the want-to-see area of the mosaic image and displaying this selected area in the zoom-in or zoom-out mode. Further, the example that the nine cells are provided within the display area 161 is shown, however, whatever modes can be adopted if configured to enable the want-to-see area to be selected without being limited to this cell count.

On the second screen 132, similarly to the first screen 131 illustrated in FIG. 16, the display image in the downloaded display image file 112 is, as described above, displayed in the display area 161 having the nine cells. When selecting the cell containing the want-to-see area of the mosaic image within the display area 161 with the selection frame 163 and operating the determination key 169, there is displayed the third screen 133 (see FIG. 12) on which the area of the selected cell is displayed in the zoom-in mode.

At this time, as described above, the file identifying information for specifying the display image file 113 associated with the selected cell has already been downloaded and retained. With this operation, a display request containing this file identifying information is transmitted to the server 10, and the display image control unit 33 of the server 10 extracts the specified display image file 113 from within the eighty one (81) display image files 113 and then downloads the extracted file 113. Moreover, when downloading this display image file 113, the server 10 downloads, into the mobile terminal 2, the file identifying information for specifying each of the nine display image files 114 (see FIG. 11) that should be displayed in the case of displaying the display image in the zoom-in mode and the associative relation information between these pieces of file identifying information and the respective cells.

Figure 17:
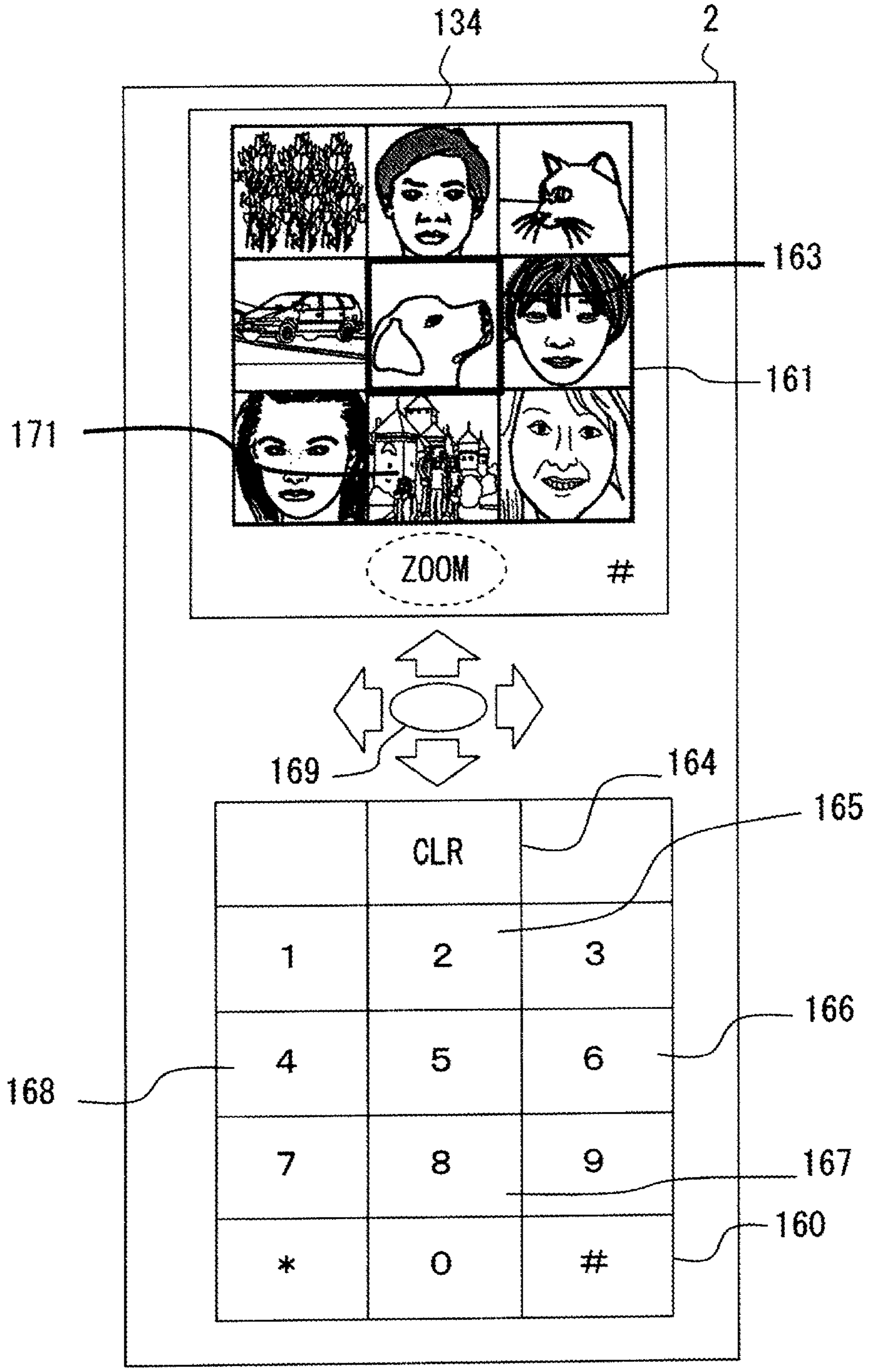
FIG. 17 is a diagram representing an example of an arrangement on a fourth screen 134.

On the third screen 133, the target image is the mosaic image at the third stage, and this mosaic image is processed in the same way as on the second screen 132 described above. On the third screen 133, when any one of the cells is selected with the selection frame 163 and the determination key 169 is operated, the fourth screen 134 on which the selected cell area is displayed in the zoom-in mode is displayed as illustrated in FIG. 17. FIG. 17 is a diagram representing a configuration example on the fourth screen 134.

The fourth screen 134 shows the image into which the mosaic image is displayed in the zoom-in mode at the maximum. Hence, one material image is displayed in each of the cells on the fourth screen 134. Namely, each of the cells on the fourth screen 134 corresponds to each of the blocks (coordinate information) of the whole mosaic image. Accordingly, when the fourth screen 134 is displayed, the server 10 downloads the block ID associated with each cell together with the corresponding display image file 114 into the mobile terminal 2.

By the way, on the second screen 132, the third screen 133 and the fourth screen 134, if the image exists in the moving direction when the selection frame 163 is moved in a direction that is not shown at the present, the neighboring display image in the moving direction is displayed. In this case, the mobile terminal 2 sends, to the server 10, a display request for specifying the display image file (112, 113 or 114) containing the neighboring display image in the moving direction, and the server 10 transmits, to the mobile terminal 2, the display image file, the file identifying information for specifying the display image files at the next stage that should be displayed in the case of displaying the display image in the zoom-in mode and the associative relation information between these pieces of file identifying information and the respective cells.

In the function of browsing the mosaic image, the operational example related to the zoom-in display to the fourth screen 134 from the first screen 131 has been exemplified so far. The zoom-out display to the first screen 131 from the fourth screen 134 is carried out by placing the selection frame 163 at a want-to-zoom-out area and operating a clear (CLR) key 164. At this time, the mobile terminal 2 has already retained the information for specifying the display image file to be displayed in the case of displaying the currently-displayed display image in the zoom-out mode. This retention may involve retaining the information on the display image displayed last time in the process of the zoom-in display and may also involve retaining, when downloading the currently-displayed display image, the information downloaded in synchronization therewith.

Further, the menu for displaying the user's contribution image is selected within the user homepage 152, in which case the fourth screen 134 is directly displayed. At this time, the display image containing the material image contributed by the user is displayed on the fourth screen 134. Specifically, the FLASH transmits the display request containing the user ID of this user to the server 10, and the display image control unit 33 of the server 10 searches through the mosaic image information DB 36 by use of this user ID, thereby extracting the block ID indicating the coordinate in which to arrange the material image contributed by the user. As a result, the display image control unit 33 acquires the display image file 114 associated with the block ID from the display information storage unit 37 and downloads the acquired file 114 into the mobile terminal 2, whereby the fourth screen 134 is displayed.

Next, an operational example of the mosaic image providing system 1 on such an occasion that the user contributes a prepared piece of material image, will be discussed.

The user, after logging in to the mosaic image providing system 1, transitions to the first screen 131 from the user homepage 152. The user, as described above, manipulates the selection frame 163 on the respective screens, thereby zoom-in-displaying a want-to-place position for the user's own material image within the mosaic image in the sequence such as the first screen 131, the second screen 132, the third screen 133 and the fourth screen 134. The user selects, with the selection frame 163, a cell 171 in which any material image is not yet placed in the images displayed in the display area 161 on the fourth screen 134. A predetermined empty block image is displayed in the cell 171 where the material image is not yet placed. When the cell 171 is selected with the selection frame 163 and the determination key 169 is manipulated, a contribution screen 159 is displayed. The contribution screen 159 is realized by, e.g., the FLASH.

Figure 18:
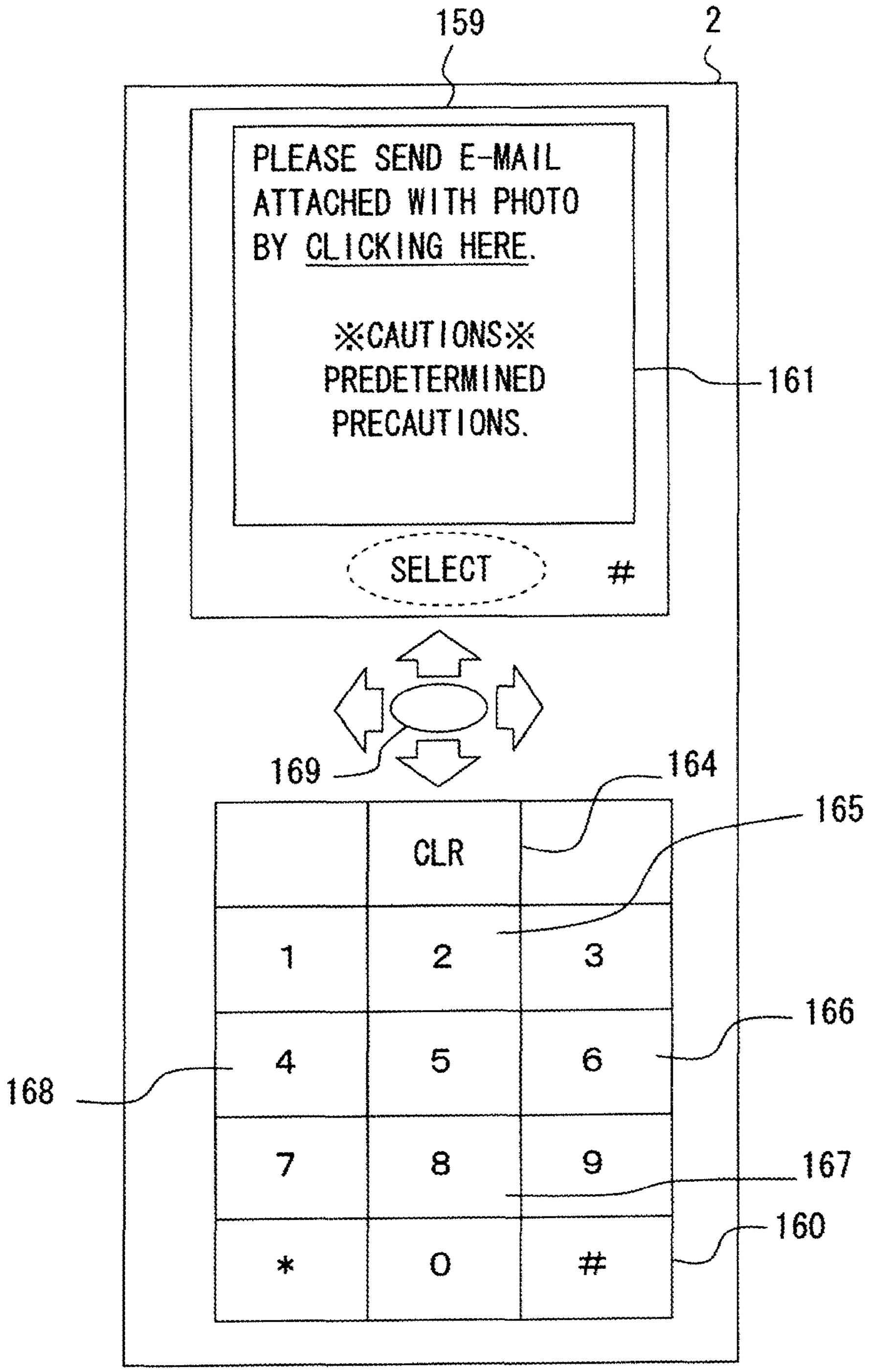
FIG. 18 is a diagram representing an example of an arrangement on a contribution screen 159.

FIG. 18 is a diagram representing an example of an arrangement on the contribution screen 159. For example, an operating explanation about the contribution of the material image and a notice (e.g., precautions about copyrights and rights of images which belong to others) related to the contributions are displayed within the display area 161 on the contribution screen 159. When a predetermined position (which is a [click here] bar in the example of FIG. 18) within the display area 161 is selected by the user, the FLASH starts up the mailer 143.

At this time, the FLASH delivers, to the mailer 143, the user ID and a mail address of the mosaic image providing system 1 together with the block ID associated with the cell 171 selected with the selection frame 163 on the basis of the retained information. The mailer 143 generates an electronic sentence in which a character string containing the block ID and the user ID each transferred from the FLASH is stored in a subject (SUBJECT) field, and the mail address of the mosaic image providing system 1 is stored in a destination address field. The user attaches the material image file 6 to the electronic sentence by operating the interface of the general type of mailer 143 and transmits the mail. It should be noted that the present invention does not restrict the functions of the mailer 143.

In the server 10, the mail control unit 32 receives the thus-transmitted mail, and extracts the material image file 6, the block ID and the user ID from this mail. The mail control unit 32 requests the mosaic image information DB 36 to issue an image ID of this material image. The mosaic image information DB 36 is stored with the newly-issued image ID in the way of being associated with the user ID and the block ID thereof. Along with this operation, the mail control unit 32 transfers the image ID, the block ID and the material image file 6 to the mosaic image generating unit 34. With this process, the mosaic image generating unit 34 generates the mosaic image file 8, and concomitantly the display image generating unit 35 updates the display image file group 38. An in-depth description of the mosaic image generating process of the mosaic image generating unit 34 will be given later on.

At this time, the material image preprocessing unit 44 of the mosaic image generating unit 34 generates the normal material image from the contributed material image and stores the generated image as the normal material image file 30 in the display information storage unit 37. Then, the material image preprocessing unit 44 stores information indicating a storage location of the normal material image file of the contributed material image and information indicating contribution date/time of the material image, in a record associated the image ID.

Thus, according to the mosaic image providing system 1, the material image can be contributed by operating the mobile terminal 2. Further, the user can specify freely the position where the material image is placed without being restricted by the target image and the material image. Moreover, the server 10 may also automatically determine this material image arranging position from the blocks in which the material images are not yet placed. In this case, a scheme is that the block ID defined as the position information may not be included in the subject (SUBJECT) field of the mail.

Further, the mosaic image providing system 1 also supports a delete mode and a change mode of the material image that has already been contributed through the operation on the mobile terminal 2.

Figure 19:
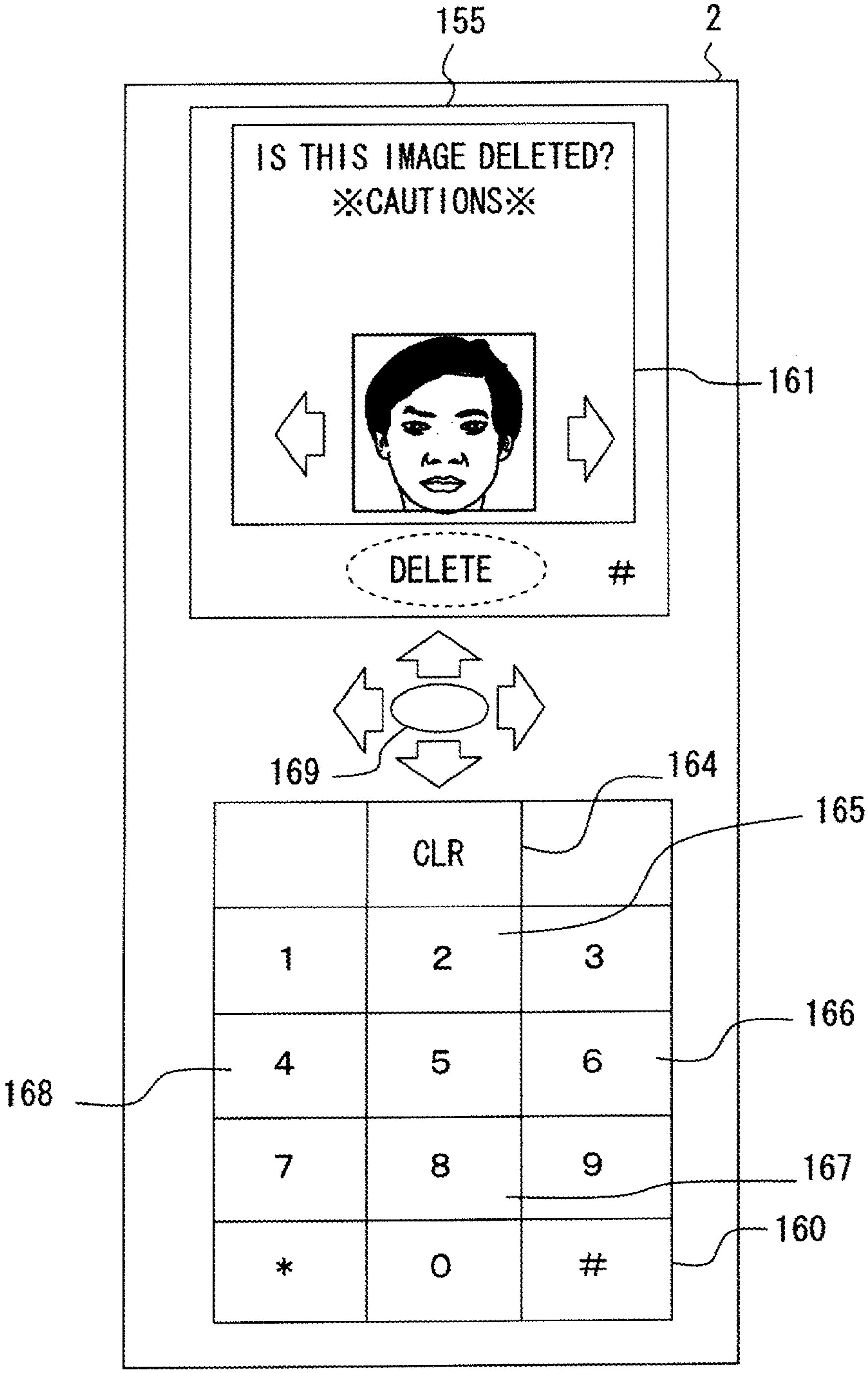
FIG. 19 is a diagram representing an example of an arrangement on a delete screen 155.

FIG. 19 is a diagram illustrating an example of a configuration of a delete screen 155. When selecting a delete menu (operation menu 154) in the menu for displaying the user's contribution image on the user homepage 152, this delete screen 155 is displayed. Any one of the material images contributed by the user is displayed within the display area 161 on the delete screen 155. When selecting the "contribution date/time" in the menu on the user homepage 152, the material image contributed at that date/time is displayed as a delete target image.

Specifically, the FLASH transmits a material image request containing the user ID to the server 10. Then, the display image control unit 33 of the server 10 extracts, from the mosaic image information DB 36 on the basis of the specified user ID, the image ID of the material image contributed by the user, the information indicating the storage location of the normal material image file 30 with the material image being processed and the information indicating the contribution date/time, and acquires the normal material image file 30 of this user from the display information storage unit 37 on the basis of these extracted items of information. The server 10 transmits the image ID, the information indicating the contribution date/time and the normal material image file 30 to the mobile terminal 2. The downloaded material image is displayed in the display area 161.

When operating the determination key 169 on this delete screen 155, the FLASH transmits a delete request containing the downloaded image ID and the information indicating the contribution date/time to the server 10. With this transmission, the display image control unit 33 of the server 10, upon receiving this delete request, deletes the record, in which the image ID and the contribution date/time are registered from within the mosaic image information DB 36, and deletes the normal material image file 30 associated with the image ID and the contribution date/time from the display information storage unit 37.

The display image control unit 33, on the occasion of deleting the relevant record from the mosaic image information DB 36, extracts the block ID stored as the position information of the material image to be deleted and requests the mosaic image generating unit 34 to delete this material image by specifying this block ID. With this deletion, the mosaic image generating unit 34 generates the mosaic image where the material image is replaced with the empty block image, and concomitantly the display image generating unit 35 updates the display image file group 38. An in-depth description of the mosaic image generating process of the mosaic image generating unit 34, which corresponds to the delete process, will be given later on.

Thus, according to the mosaic image providing system 1, the material image can be deleted by the operation on the mobile terminal 2.

The process of deleting the material image described above may be executed by performing the delete operation in a way that selects the cell in which to display the want-to-delete material image on the fourth screen 134 by use of the selection frame 163. In this case, the mobile terminal 2 transmits the delete request containing the block ID associated with the selected cell to the server 10, and the server 10, in response to this delete request, may replace the image in the block specified by the block ID with the empty block image.

Figure 20:
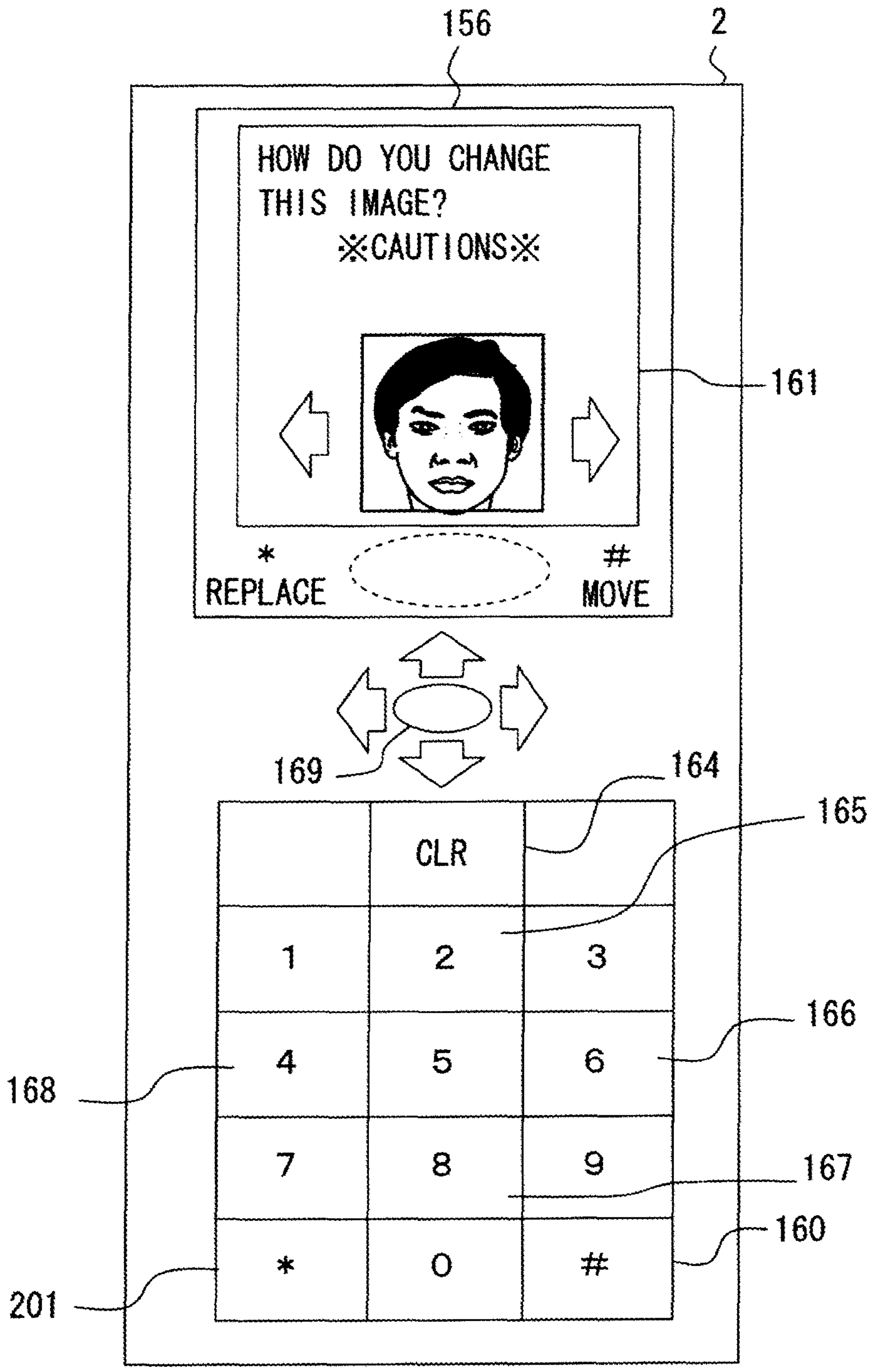
FIG. 20 is a diagram representing an example of an arrangement on a change screen 156.

FIG. 20 is a diagram representing an example of a configuration of a change screen 156. When selecting a change menu (operation menu 154) in the menu for displaying the user's contribution image on the user homepage 152, this change screen 156 is displayed. Any one of the material images contributed by the user is displayed within the display area 161 on the change screen 156. When selecting the "contribution date/time" in the menu on the user homepage 152, the material image contributed at that date/time is displayed as a change target image. A specific generating process on this screen is the same as in the case of the delete screen 155 described above.

On this change screen 156, when a [#] key 160 is manipulated, such a process is executed as to place the currently-contributed material image, and, when a [*] key 201 is manipulated, such a process is executed as to replace the currently-contributed material image with a new material image.

To be specific, when the [#] key 160 is manipulated, the FLASH transmits the image ID of the change target material image to the server 10 and receives the display image file 114 containing the material image specified by the image ID from the server 10, thereby displaying the fourth screen 134 containing the change target material image (see FIG. 17).

At this time, the fourth screen 134 is displayed in such a state that the cell, in which the change target material image exists, is selected with the selection frame 163. In this state, the selection frame 163 is moved to the empty block by using the numeral keys 165, 166, 167 and 168. When the determination key 169 is manipulated in the state where the selection frame 163 is placed at the cell in which the empty block image is displayed, the change target material image is moved to the cell at which the selection frame 163 is placed.

Hereat, the FLASH transmits, to the server 10, a movement request containing the image ID of the change target material image and the block ID associated with the cell to which this material image is moved. With this transmission, the display image control unit 33 of the server 10, upon receiving this movement request, changes a value of the block ID associated with the image ID within the mosaic image information DB 36 to a value contained in this movement request. Along with this change, the display image control unit 33 requests the mosaic image generating unit 34 to move the material image in a way that specifies the pre-change block ID and the post-change block ID. In response to this request, the mosaic image generating unit 34 generates the mosaic image in which the material image arrangement is changed, and concomitantly the display image generating unit 35 updates the display image file group 38. An in-depth description of the mosaic image generating process by the mosaic image generating unit 34, which corresponds to this movement process, will be given later on.

Thus, according to the mosaic image providing system 1, the material image can be moved also by the operation on the mobile terminal 2.

Figure 21:
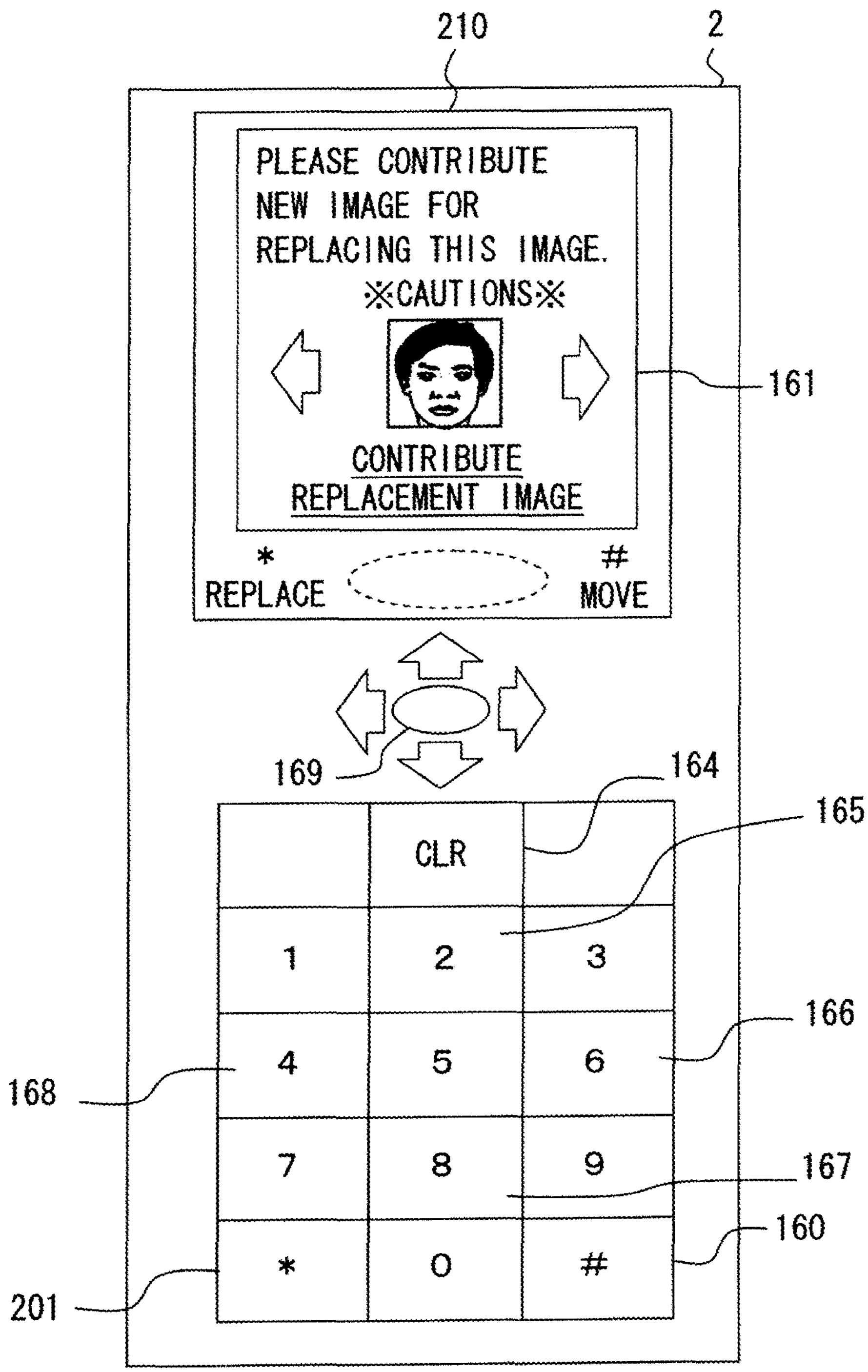
FIG. 21 is a diagram representing an example of an arrangement on a replacement screen 210.

On the other hand, when replacing the material image, i.e., on the occasion that the [*] key 201 is manipulated, a replacement screen 210 as illustrated in FIG. 21 is displayed. FIG. 21 is a diagram representing an example of a configuration of the replacement screen 210. The replacement of the material image is basically the same as the process when contributing the material image explained above. When the user selects a predetermined position (which is a [contribute-replacement-image] bar in the example of FIG. 21) within the display area 161, the FLASH starts up the mailer 143, and in turn the mailer 143 transmits to the server 10 an electronic sentence attached with the new material image file 6 for the replacement. A scheme different from when making the contribution is that the image ID of the original material image is set together with the user ID in the subject field of the mail electronic sentence.

In the server 10, the mail control unit 32 receives the thus-transmitted mail and extracts the material image file 6 for the replacement, the user ID and the image ID of the original material image from this mail. The mail control unit 32 extracts, based on the image ID of the original material image, the block ID related to the original material image from the mosaic image information DB 36. Further, the mail control unit 32 requests the mosaic image information DB 36 to issue the image ID. The mosaic image information DB 36 is stored with the newly-issued image ID in the way of being associated with the user ID and the block ID. Along with this storage, the mail control unit 32 transfers, together with this image ID and the block ID, the material image file 6 for the replacement to the mosaic image generating unit 34. With this transfer, the mosaic image generating unit 34 generates the mosaic image file 8 in which the original material image is replaced by the new material image, and concomitantly the display image generating unit 35 updates the display image file group 38. An in-depth description of the mosaic image generating process by the mosaic image generating unit 34, which corresponds to this replacement process, will be given later on.

At this time, the material image preprocessing unit 44 of the mosaic image generating unit 34 generates the normal material image from the new material image, and stores the generated normal material image as the normal material image file 30 in the display information storage unit 37. Then, the material image preprocessing unit 44 stores the information indicating the storage location of the normal material image file of this new material image and the information indicating the contribution date/time of the material image in the record associated with this image ID.

Thus, according to the mosaic image providing system 1, the material image can be replaced also by the operation on the mobile terminal 2.

Next, an operational example of the mosaic image generating unit 34 of the server 10 in the first working example will hereinafter be described with reference to FIGS. 22 and 23.

Figure 22:
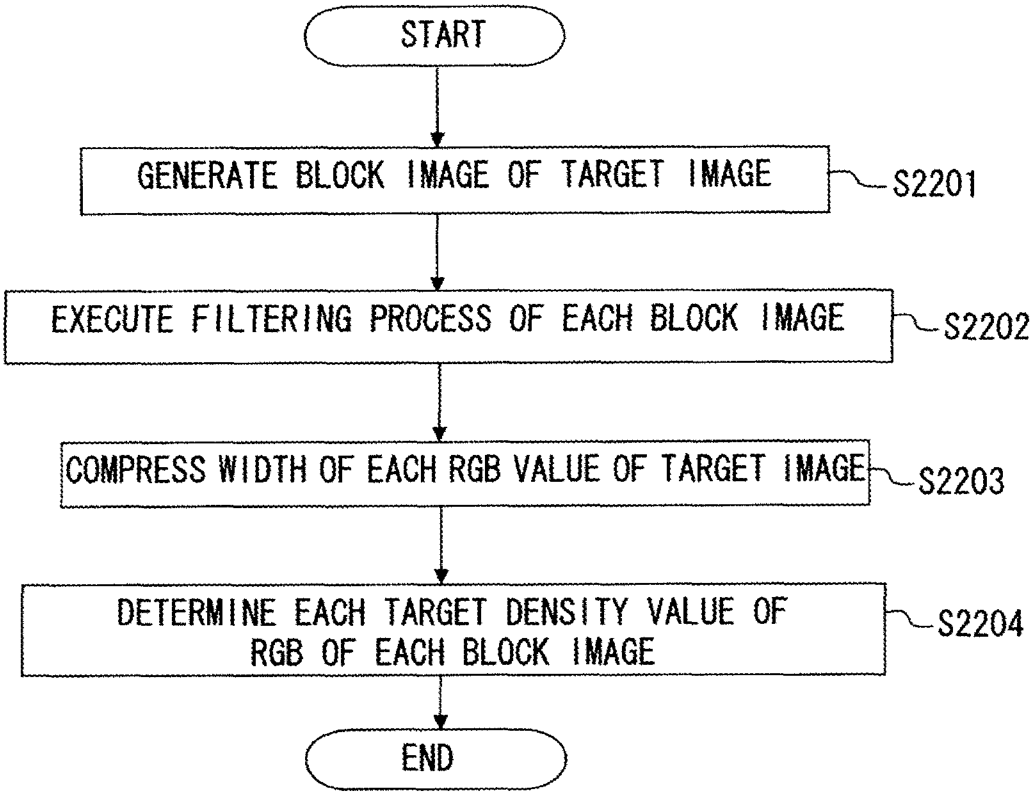
FIG. 22 is a flowchart illustrating a process related to the target image in the mosaic image generating unit in the first working example.

FIG. 22 is a flowchart illustrating a process related to the target image of the mosaic image generating unit 34 in the first working example.

The target image processing unit 41 acquires the target image file 5 as a basis of the mosaic image and segments this target image file 5 into a predetermined number of areas (blocks) (S2201). This segment count (block count) of the target image is acquired from the setting information. An image in each of the segmented areas of this target image file 5 is referred to as a block image.

The target image processing unit 41 executes a filtering process of the target image file 5 on the per-segmented-block basis (S2202). To be specific, at first, the target image processing unit 41 calculates the average value (the average R-value, the average G-value, the average B-value) of the density value (gradation value) of every color of RGB with respect to each block image. The target image processing unit 41 sets the RGB values of all the pixels forming the block image to the average RGB value calculated with respect to the block image. The color of each block image is thereby uniformed into the average RGB value of each block image.

Subsequently, the target image converting unit 42 compresses (reduces), with respect to the target image processed by the target image processing unit 41, the unit width of RGB-value so as not to use the ambient densities (the color approximate to white and black) of the allowable maximum density value (the density value “255”) and the allowable minimum density value (the density value “0”) while keeping the fixed tone(S2203). A best mode, for instance, is that the target image converting unit 42 compresses the unit width of the density value so that the allowable minimum density value “0” becomes the density value “32” and the allowable maximum density value “255” becomes the density value “223” in the state of fixing the central density value (127.5).

The target image is thus converted, thereby preventing, if the average density value of the material image gets approximate to the target density value of the target image, the material image from being hard to see due to excessive approximation to white or black.

The block image processing unit 43 acquires, based on the target image processed by the target image converting unit 42, the respective density values (the gradation values) of RGB of each block image as the target density values (the R target value, G target value, the B target value) (S2204). These acquired target density values of the respective block images are transmitted to the material image correcting unit 48.

It is sufficient that the process related to the target image described above is executed basically once when determining the target image.

Figure 23:
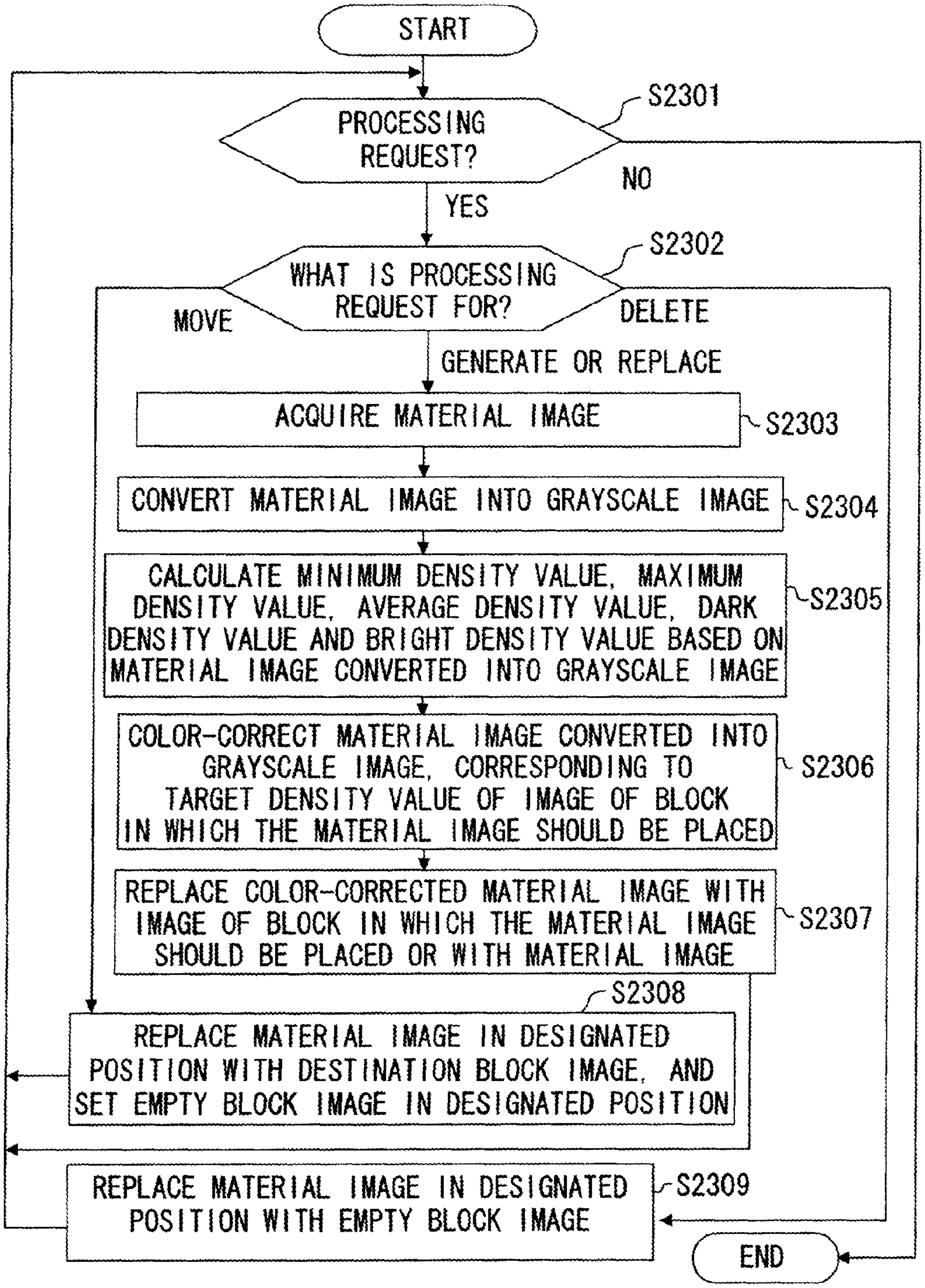
FIG. 23 is a flowchart illustrating a mosaic image generating process of the mosaic image generating unit in the first working example.

FIG. 23 is a flowchart illustrating a mosaic image generating process of the mosaic image generating unit 34 in the first working example. The mosaic image generating process shown in FIG. 23 is executed at, e.g., a predetermined cycle. It should be noted that the present invention does not restrict the timing of executing the mosaic image generating process, but this process may be executed each time the material image is contributed or deleted or changed.

The material image acquiring unit 46 checks existence of processing requests given from the mail control unit 32 or the display image control unit 33 (S2301). These processing requests are managed in, e.g., a queue. If the processing requests exist (S2301; YES), the material image acquiring unit 46 acquires any one of these processing requests, and determines what this processing request is given for (S2302). The material image acquiring unit 46, whereas if any processing request does not exist (S2301; NO), finishes the process.

The material image acquiring unit 46, when determining that this processing request is the request when contributing the material image or the replacement request (S2302; generation or replacement), acquires the material image file 6 transmitted in the way of being attached to the mail together with the processing request (S2303). The material image acquiring unit 46 acquires one material image file 6 and obtains, in combination, the information on the block position (block ID) in the target image, in which the material image is placed.

The material image preprocessing unit 44 acquires, from the setting information, the information on the block image of the block in which the material image in the material image file 6 should be placed. The information on the block image contains the size (the pixel count), the shape, etc of the block image. The material image preprocessing unit 44 processes the size, the shape, etc in the material image file 6 so as to match with these acquired items of information.

The material image converting unit 45 converts the material image processed by the material image preprocessing unit 44 into the grayscale image (S2304). Owing to this conversion, a process of dealing with the density value of any one of the basic colors will hereinafter get sufficient for the case of manipulating the respective RGB values of the material image. Further, the dispersion in the RGB values of the material image can be eliminated, and hence, if the material image correcting unit 48 makes the color correction with respect to the material image file, the visual recognizability of the material image can be improved such as preventing occurrence of a color that does not exist so far in the material image.

The material image calculating unit 47 calculates, with respect to a grayscale material image 42 converted by the material image converting unit 45, the statistic value about any one of the basic colors of RGB contained in this material image. Specifically, to begin with, the material image calculating unit 47 extracts the minimum density value in the density values of the basic colors held by the whole pixels contained in the material image, and subtracts this minimum density value from the respective density values of the whole pixels of the material image. The material image calculating unit 47 calculates, with respect to the thus-converted single basic color, the minimum density value (which is the same as the allowable minimum density value), the maximum density value, the average density value and a ratio (the dark density value, the bright density value) of the density values ranging from the minimum density value up to the average density value to the density values ranging from the average density value up to the maximum density value, respectively (S2305).

The material image correcting unit 48 acquires the respective statistic values related to the material image 42, which are calculated by the material image calculating unit 47, and further acquires respectively the R target value, the G target value and the B target value of the block image of the block in which the material image 42 is placed on the basis of the identifying information indicating the block image where this material image 42 is placed. The material image correcting unit 48 corrects the respective RGB values of the material image 42 so that the average density value calculated by the material image calculating unit 47 becomes the R target value, the G target value and the B target value of the target block image (S2306).

When shifting the average density value of the original material image to the target density value, there are a case in which the maximum density value of the original material image exceeds the allowable maximum density value for the device and a not-exceeding case. The material image correcting unit 48, when determining that the maximum density value exceeds the allowable maximum density value, reduces (compresses) the distribution width of the original material image so that the maximum density value becomes the allowable maximum density value in a status of fixing the average density value to the target density value. While on the other hand, the material image correcting unit 48, when determining that the maximum density value does not exceed the allowable maximum density value, expands the distribution width of the original material image so that the average density value becomes the target density value in a status of fixing the minimum density value to the allowable minimum density value. Thus, the material image correcting unit 48 executes the process so as to retain the tone of the original material image to the greatest possible degree for increasing the visual recognizability of the material image while making the original material image close to the tone of the block image in which to arrange this material image in order to enhance the visual recognizability of the whole mosaic image.

The mosaic image generating unit 49 replaces the block image of the block in which the material image is to be placed, in the target image file, with the material image that is color-corrected by the material image correcting unit 48 (S2307). The block image of the block in which the material image should be placed is detected from the block ID. If the processing request is the replacement request, the previous material image is placed in the block where the material image should be placed. Hence, the mosaic image generating unit 49 replaces the original material image with the newly-color-corrected material image for the replacement (S2307).

By the way, the material image acquiring unit 46, when determining that the processing request is the movement request (S2302; movement), transmits to the mosaic image generating unit 49 this movement request and the pre-change and post-change block IDs that are acquired together with the movement request. With this transmission, the mosaic image generating unit 49 replaces the block image (the material image or the empty block image) in the position specified by the post-change block ID with the block image (the material image) in the position specified by the pre-change block ID, and sets the block image in the position specified by the pre-change block ID to the empty block image (S2308). The empty block image is, e.g., the image that is preset for explicitly showing the block in which the material image is not placed.

Furthermore, the material image acquiring unit 46, when determining that the processing request is the delete request (S2302; delete), transmits the delete request and the block ID acquired together with this delete request to the mosaic image generating unit 49. The mosaic image generating unit 49 replaces the block image specified by this block ID with the empty block image (S2309).

Thus, upon completing one processing request, the material image acquiring unit 46 checks the existence of the next processing request (S2301). The material image acquiring unit 46, when determining that the next processing request exists (S2301; YES), executes the same process as described above with respect to the next processing request. Thus, the process continues till the processing request comes to non-existence. As a matter of course, without being limited to the scheme that the respective processing requests are thus sequentially processed, the plurality of processing requests may also be processed for change.

As discussed above, when the mosaic image file 8 is updated, the display image generating unit 35 updates the display image file group 38 according to this updated mosaic image file 8 at the predetermined timing. A method of updating the display image file group 38 may involve, in the same way as the aforementioned generation method of the display image file group 38 (see FIG. 13), newly generating the display image file group 38 and may also involve updating only the file containing the block with the change being caused with respect to the display image files 112, 113 and 114.

<Operation and Effect in First Working Example>

An operation and an effect of the mosaic image providing system 1 in the first working example discussed above will hereinafter be described.

In the server 10, the mosaic image generating unit 34 generates the mosaic image file 8 by use of the plurality of material image files 6. The mobile terminal 2 attaches the material image files 6 to the mail and thus transmits the files 6 together with the position information (the block ID) in which the material image is desired to be placed. As a matter of course, the method of acquiring the material image files 6 is not limited to using the mail.

In the mosaic image generating unit 34, the material image undergoes the tone-correction so as to match with the tone of the image in the block specified by the designated block ID within the target image. Namely, according to the first working example, it is feasible to arbitrarily specify where the material image is placed without being restricted by the tone of the target image.

In regard to the target image, in a state of being converted so as not to use the color close to white and black while keeping the fixed tone, each of the target density values of RGB of each block is determined. With this determination, even when the material image is made approximate to each of the target density values of RGB of each block, it is possible to prevent the material image from being hard to see due to the excessive approximation to white or black. Namely, it is feasible to prevent the visual recognizability of the individual material image from declining in terms of generating the mosaic image.

Further, the mosaic image generating unit 34 in the first working example, after the material image has been converted into the grayscale image, calculates the statistic values (the average density value, the minimum density value, the maximum density value, the dark density value and the bright density value) of the basic color held by the material image. Thus, a quantity of the calculation of the statistic value of the basic color held by the material image can be reduced owing to the conversion into the grayscale image. In addition, the dispersions of the RGB values of the material image can be restrained owing to the conversion into the grayscale image, and hence, even when making the color-correction so that the material image gets approximate to the block image, it is feasible to prevent the color, which does not exist in the material image, from being generated.

Moreover, on the occasion of getting the material image approximate to the tone of the block image, the unit width of the RGB value of the material image is reduced so as to retain the tone of the original material image to the greatest possible degree. With this reduction, the visual recognizability of the whole mosaic image can be enhanced by getting the original material image close to the tone of the block image where this material image is placed, and the visual recognizability of the material image can be also improved because of being processed so as to retain the tone of the original material image to the greatest possible degree.

Thus, according to the mosaic image providing system in the first working example, even when letting the user arbitrarily designate the position of the material image by eliminating the restriction to the material image corresponding to the target image, the visual recognizability of each of the material image and the mosaic image can be maintained.

In the server 10, the display image generating unit 35 generates the display image file group 38 for supporting the zoom-display mode on the screen of the mobile terminal 2 from the mosaic image file 8 generated for keeping this high visual recognizability. This display image file group 38 is invoked from the WEB file 39 downloaded into the mobile terminal 2, then downloaded into this mobile terminal 2 and displayed in the state of being segmented into the plurality of cells on the screen of the mobile terminal 2. The plurality of cells is generated by, e.g., the FLASH of the WEB file 39 and is operated by the operation keys such as the numeral keys, the direction keys and the determination key on the mobile terminal 2.

The display image file group 38 generated by the display image generating unit 35 has the size (the pixel count) (300 by 300 pixels in the first working example) in which each individual file can be displayed on one screen of the mobile terminal 2, and is generated corresponding to the respective zoom-display stages of the mobile terminal. To be specific, the mosaic image is copied corresponding to the stage count (the four stages in the first working example) of the zoom-display stages of the mobile terminal 2, then each copied piece of mosaic image is reduced at the reduction ratio (1-fold, 1/9-scale, 1/81-scale, 1/729-scale) corresponding to the zoom stages, and the reduced mosaic image is segmented by the predetermined number, thereby generating the display image file group 38.

In those elements, the segment count is determined to have the size (the pixel count) (300 pixels by 300 pixels in the first working example) in which each individual file can be displayed on one screen of the mobile terminal 2, and the reduction ratio is determined to have the size in which the smallest mosaic image is displayed on one screen of the mobile terminal 2 and to have the size in which each of the display images obtained by segmenting the largest mosaic image has the same block count as the cell count of the cells displayed on the screen of the mobile terminal 2. The reduction ratio of the display image, which corresponds to the halfway-stage (1/9-scale, 1/81-scale) of the zoom, is determined between the maximum reduction ratio and the minimum reduction ratio, and the segment count is determined from the same point of view as described above.

Thus, in the first working example, the server 10 generates the display image corresponding to each screen image displayed by the mobile terminal 2. Then, on the mobile terminal 2, the zoom-out display and the zoom-in display between the mosaic image and the material image can be realized on the screen simply by downloading the necessary display image from the server 10.

Moreover, in the first working example, when the display image file group 38 is downloaded, the information (the file identifying information) for specifying the display image file at the next zoom stage, which should be displayed in the case of being displayed further in the zoom-in mode from the display image, is downloaded for every cell. With this operation, in the case of being displayed in the zoom-in mode from the predetermined display image, the display image file, which should be displayed, is immediately specified by use of the downloaded information, and the server 10 downloads the specified file into the mobile terminal 2.

Therefore, according to the first working example, the zoom-display of the mosaic image can be efficiently realized at a high speed. Further, this type of zoom-display is actualized with the selection frame 163 operated by using the operation keys etc on the mobile terminal 2, and hence, according to the first working example, the stepwise zoom-display of the mosaic image can be realized by only the operations on the mobile terminal 2.

Herein, if the display image (the fourth screen 134) displayed in the zoom-in mode at the maximum is displayed, each cell corresponds to each block, and therefore the block ID associated with each cell is downloaded into the mobile terminal 2 from the server 10.

In the first working example, the use of the downloaded block ID enables the contribution, the deletion and the change (replacement, movement) of the material image to be actualized on the mobile terminal 2. When making the contribution, the selecting operation is performed by moving the selection frame 163 at the desired cell on the fourth screen 134, and the block ID associated with the selected cell is designated, thus requesting the server 10 for the contribution together with the new material image file. In response to this request, the server 10 processes the new material image and generates the mosaic image in which this processed material image is placed in the position specified by the designated block ID.

Therefore, according to the first working example, the contribution of the material image with the desired position being designated can be realized on the mobile terminal 2. As a matter of course, the arbitrary position can be, because of the contributed material image being corrected by the mosaic image generating unit 34, designated without being restricted by the block image in this position, and this designation of the position can be executed by only the operation of selecting the cell on the screen of the mobile terminal 2, thus enabling the high operability to be actualized.

When changing the material image also, the selecting operation is done by moving the selection frame 163 at the desired cell on the fourth screen 134, and the change is requested in a way that designates the block ID associated with the selected cell. In response to this request, the server 10 changes the mosaic image placed in the position specified by the designated block ID, and generates the mosaic image in which this change reflects. When replaced, the new material image for the replacement is transmitted together with the block ID to the server 10, and, when moved, the block ID of the moving source block and the block ID of the moving destination block are transmitted thereto.

Further, when deleting the material image, any one of the material images contributed by the user is selected on the delete screen 155, and the server 10 is notified of the image ID of this selected material image. With this notification, the server 10 extracts, based on the image ID, the block ID specifying the position where the material image is placed from the mosaic image information DB 36, and replaces the block image specified by the block ID with the empty block image.

Thus, according to the mosaic image providing system 1 in the first working example, it is feasible to realize all of the contribution, the deletion and the change of the material images for forming the mosaic image through the operations on the mosaic image as well as displaying the mosaic image on the mobile terminal 2. As for the deleting and changing operations, the already-generated mosaic image and display image are updated by these operations and are thus provided to the mobile terminal 2.

The mobile terminal is equipped with the small display screen and the limited number of operation keys, and hence any system did not exist, which is capable of presenting, with the high visual recognizability, both of the mosaic image that is visually recognized originally by the person who looks at the image from the remote place and the material image that is visually recognized originally by the person who looks at the image at close range while switching over these images with the high operability. The mosaic image providing system 1 in the first working example can, however, realize all of the operations for enjoying the mosaic image on the mobile terminal and provide the mosaic image having the highly visual recognizability with the excellent usability.

Second Working Example

The mosaic image providing system in a second working example will hereinafter be described. The mosaic image providing system in the second working example is different from the system in the first working example in terms of only the function of the mosaic image generating unit 34 of the server 10.

[Device Configuration]

[Server 10]

The mosaic image generating unit 34 in the second working example will hereinafter be explained. The mosaic image generating unit 34 in the first working example discussed above calculates, after converting the material image into the grayscale image, the statistic value of the grayscale material image. The mosaic image generating unit 34 in the second working example executes the process related to the material image without being converted into the grayscale image.

<Mosaic Image Generating Unit>

Figure 24:
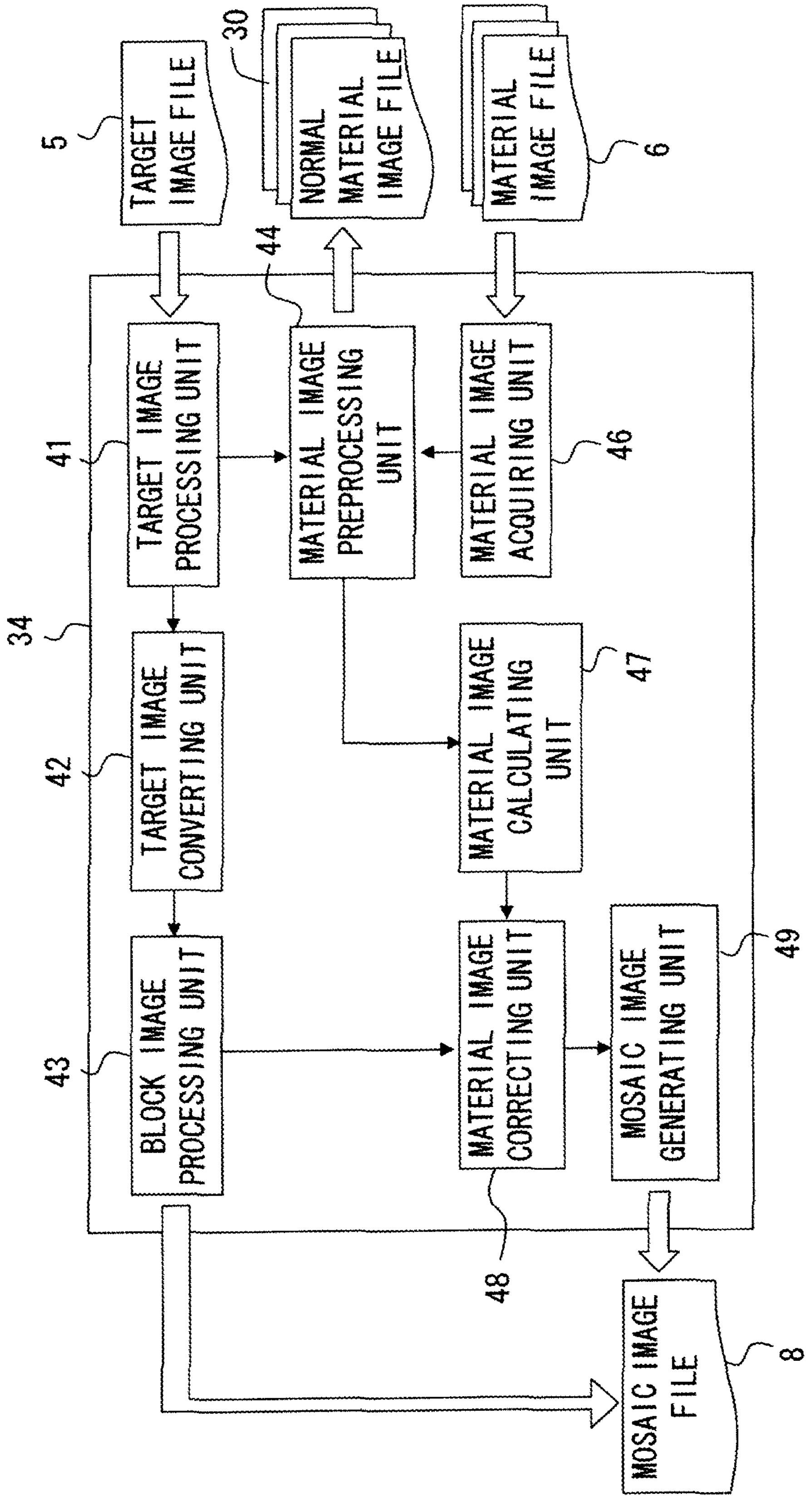
FIG. 24 is a function block diagram representing a conceptual configuration of a function of the mosaic image generating unit in a second working example.

A configuration of the mosaic image generating unit 34 in the second working example will hereinafter be described with reference to FIG. 24. FIG. 24 is a function block diagram representing a conceptual configuration of the functions of the mosaic image generating unit 34 in the second working example. The functional configuration in the second working example has nothing different from the first working example except omission of the material image converting unit 45 which converts the material image into the grayscale image. The following discussion will focus on the function units having the different functions from those in the first working example.

<<Material Image Calculating Unit 47>>

Figure 25:
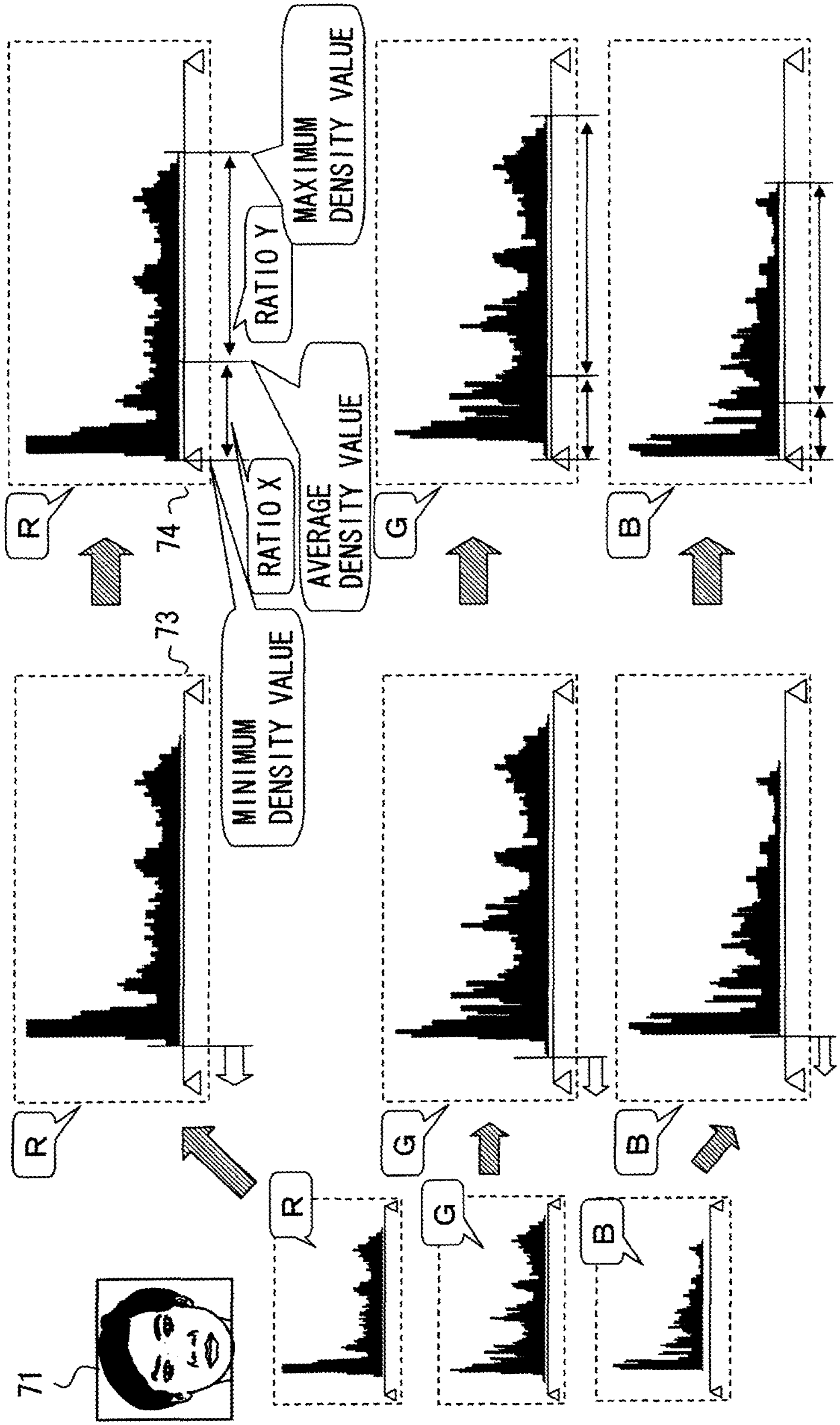
FIG. 25 is a diagram representing a processing concept of the material image calculating unit in the second working example.

The material image calculating unit 47 executes, with respect to the material image processed by the material image preprocessing unit 44, the following process about the histogram of each color of RGB contained in the material image. In the first working example, the process is targeted at the grayscale material image 72, and hence it is sufficient to carry out the process about any one of the basic colors of RGB, however, the second working example involves processing about the respective colors of RGB as shown in FIG. 25. FIG. 25 is a diagram representing a processing concept of the material image calculating unit 47 in the second working example.

The material image calculating unit 47, with respect to the material image 71, calculates the minimum density value (which is the same as the allowable minimum density value), the maximum density value, the average density value, the dark density value and the bright density value about RGB, respectively. Note that the method of calculating these statistic values is the same as in the first working example, and therefore its explanation is herein omitted.

FIG. 26 is a diagram illustrating an example of how the RGB statistic values of the material image are calculated in the second working example. In FIG. 26, the same values as those in the first working example are exemplified as the entire R-values (the entire density values of R), and hence the respective statistic values calculated with respect to R are the same as those in the first working example. Specifically, the values calculated with respect to R are the minimum density value (0), the maximum density value (215), the average density value (93.60), the dark density value (0.44, 93.60) and the bright density value (0.56, 121.40). The values calculated with respect to G are the minimum density value (0), the maximum density value (228), the average density value (62.75), the dark density value (0.28, 62.75) and the bright density value (0.72, 165.25). The values calculated with respect to B are the minimum density value (0), the maximum density value (75), the average density value (29.55), the dark density value (0.39, 29.55) and the bright density value (0.61, 45.45).

<<Material Image Correcting Unit 48>>

The material image correcting unit 48 in the first working example makes the color-correction of the material image by utilizing, as the statistic values of RGB, the statistic values of any one of the basic colors, which are calculated by the material image calculating unit 47. The material image correcting unit 48 in the second working example conducts the color-correction of the material image by using each of the RGB statistic values calculated by the material image calculating unit 47. To be specific, the material image correcting unit 48 conducts the color-correction of the material image so that the respective RGB average density values calculated by the material image calculating unit 47 become the R target value, the G target value and the B target value of the target block image.

Figure 27:
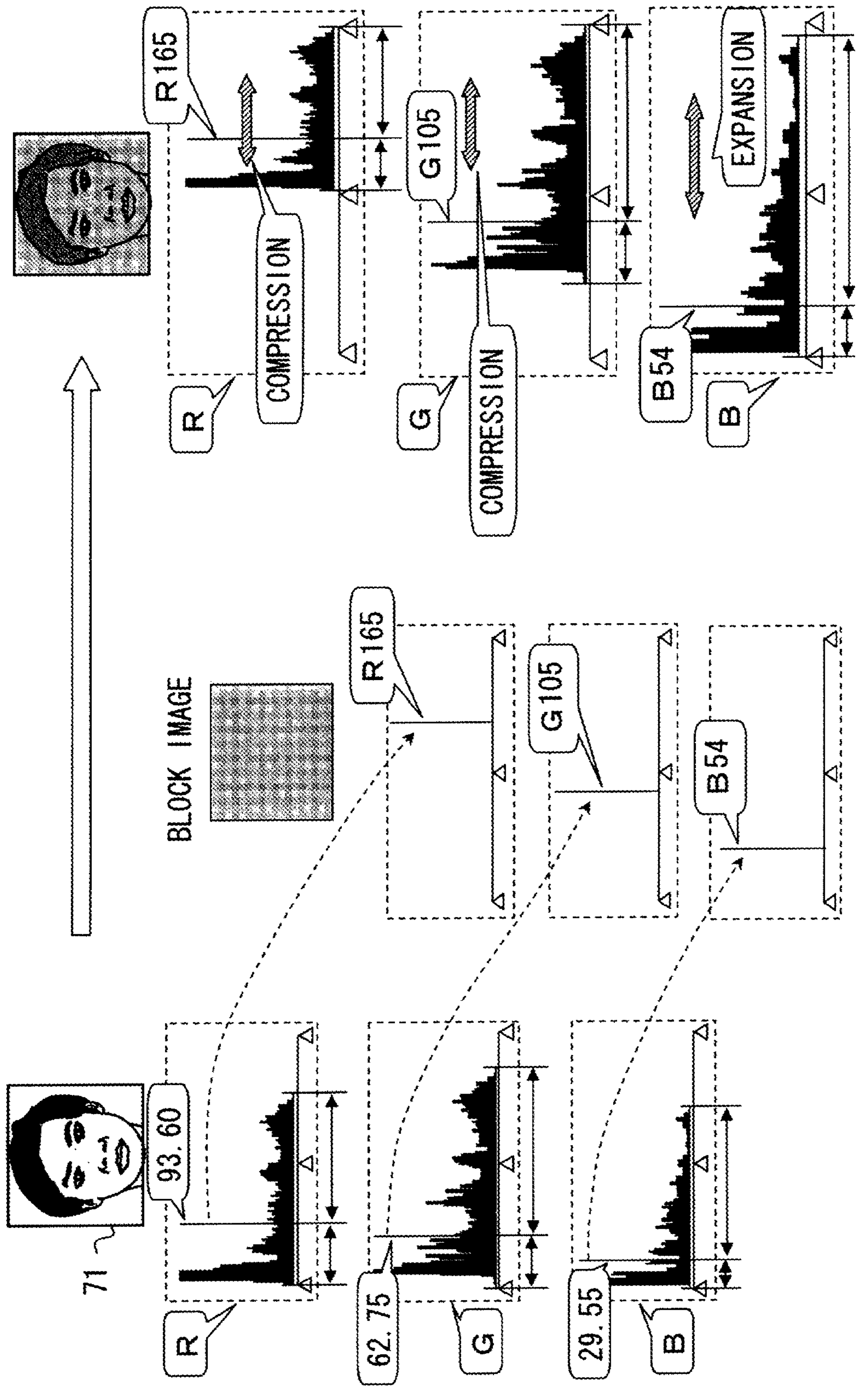
FIG. 27 is a diagram representing an example of a color-correcting process of the material image in the second working example.

FIG. 27 is a diagram representing an example of the color correcting process of the material image in the second working example. As for the average density values of the material image 71, as described above, the material image calculating unit 47 calculates the average R-value at 93.60, the average G-value at 62.75 and the average B-value at 29.55. On the other hand, as for the RGB target values of the block image of the block in which the material image 71 should be placed, the block image processing unit 43 determines the R target value to be 165, the G target value to be 105 and the B target value to be 54.

The material image correcting unit 48 makes the color-correction of the material image 71 so that the average R-value (93.60) becomes the R target value (165) of the block image, the average G-value (62.75) becomes the G target value (105) of the block image and the average B-value (29.55) becomes the B target value (54) of the block image.

At this time, the material image correcting unit 48, similarly to the first working example, when shifting the average density value of the material image to the target density value, determines with respect to each color of RGB whether the maximum density value of the original material image exceeds the allowable maximum density value or not. The process in the case of determining that the maximum density value exceeds the allowable maximum density value and the process in the not-exceeding case are the same as those in the first working example.

Figure 28:
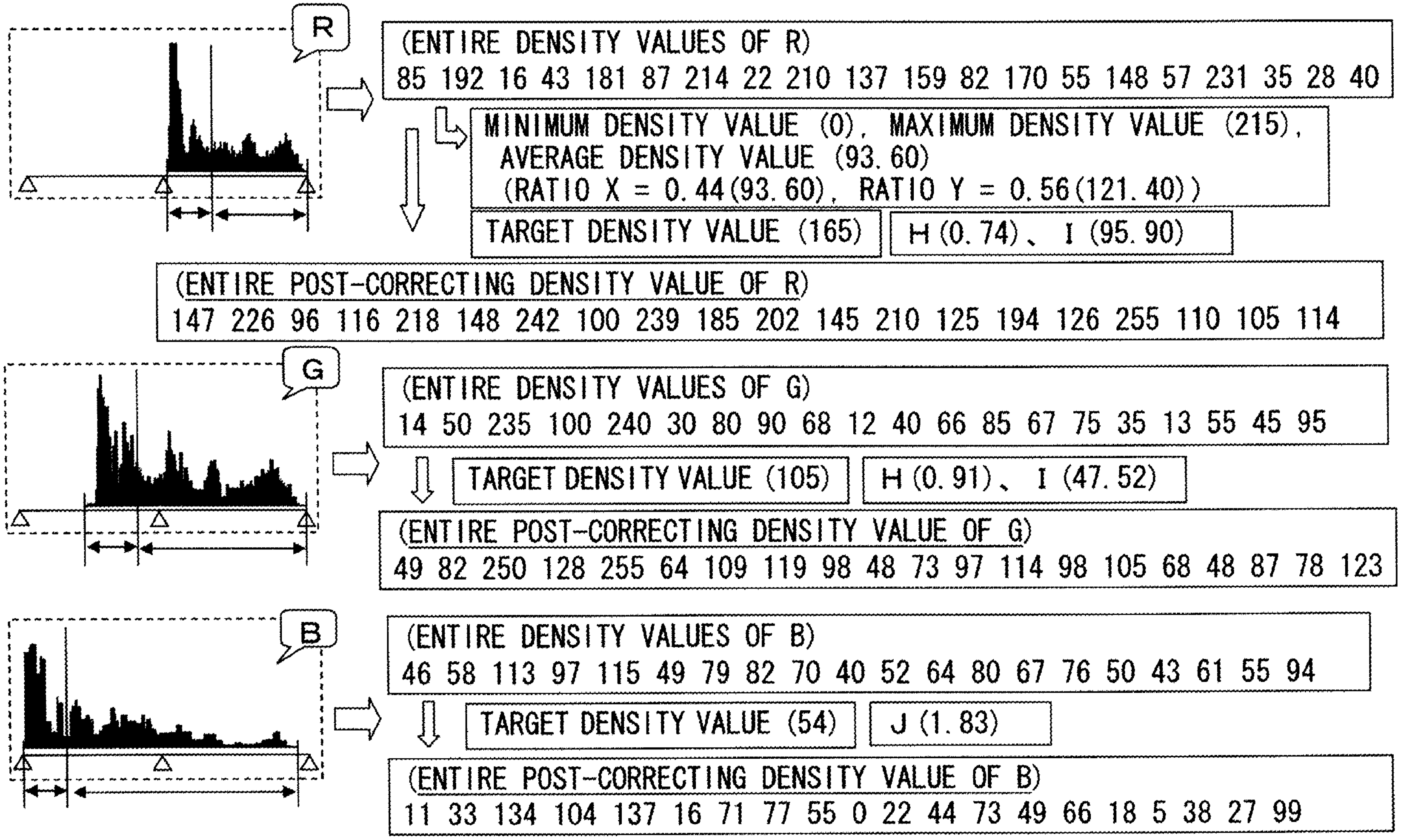
FIG. 28 is a diagram representing a specific example of a correcting process of the material image in the second working example.

The specific process of the material image correcting unit 48 in the second working example will hereinafter be described with reference to FIG. 28. FIG. 28 is a diagram illustrating a specific example of the material image correcting process in the second working example, and illustrates an example in which the material image has the RGB values shown in FIG. 26.

The material image correcting unit 48, at first, as shown in below, determines whether or not a value obtained by dividing the target value by the dark density value exceeds the allowable maximum density value (255) with respect to each of RGB.

$$R \text{ Target Value}(165)/\text{Dark Density Value }(0.44)=375 \quad \text{(R-Value)}$$

$$G \text{ Target Value}(105)/\text{Dark Density Value}(0.28)=375 \quad \text{(G-Value)}$$

$$B \text{ Target Value}(54)/\text{Dark Density Value}(0.39)=138.46 \quad \text{(B-Value)}$$

The material image correcting unit 48, when determining that the calculated value exceeds the allowable maximum density value, corrects each density value of each pixel of the original material image by use of the following (Formula A) in the same way as in the first working example. While on the other hand, the material image correcting unit 48, when determining that the calculated value does not exceed the allowable maximum density value, corrects each density value of each pixel of the original material image by use of the (Formula B) in the same way as in the first working example.

According to the example of FIG. 28, the material image correcting unit 48 corrects the whole R-values and the whole G-values of the material image with the (Formula A) and corrects the whole B-values with the (Formula B). To be specific, with respect to the R-value, H is 0.74 (=(255−165)/121.40), and I is 95.90 (=255−(215*0.74)). As for the G-value, H is 0.91(=(255−105)/165.25), and I is 47.52(=255−(228*0.91)), and with respect to the B-value, J is 1.83(=54/29.55).

[Operational Example]

Figure 29:
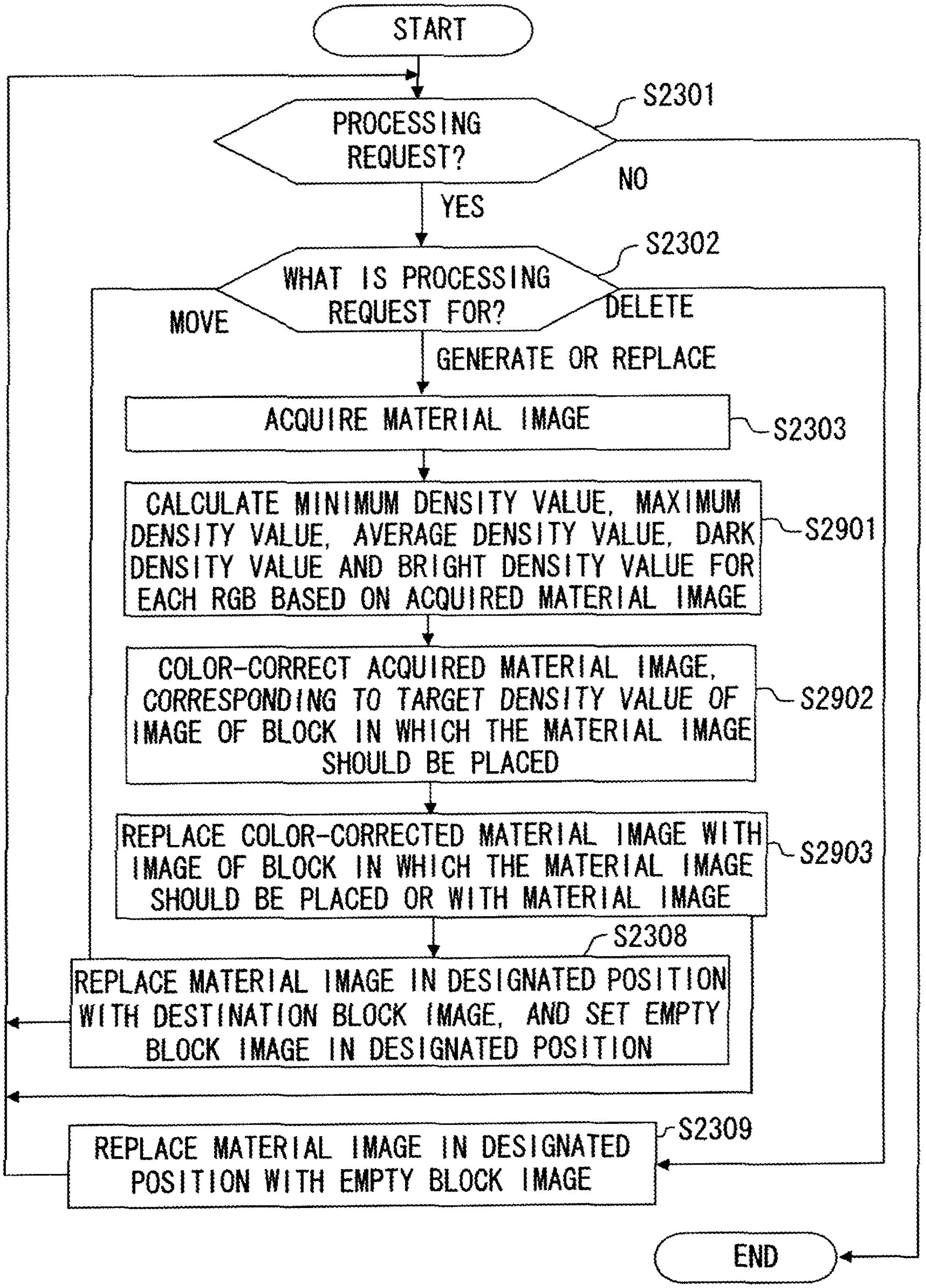
FIG. 29 is a flowchart illustrating a mosaic image generating process of the mosaic image generating unit in the second working example.

Next, an operational example of the mosaic image generating unit 34 in the second working example will hereinafter be described with reference to FIG. 29. FIG. 29 is a flowchart illustrating the mosaic image generating process of the mosaic image generating unit 34 in the second working example. The process (see FIG. 22) for the target image is the same as in the first working example, and hence its description is herein omitted.

The material image acquiring unit 46 obtains the processing request (S2301) and, as a result of determining what a content of this processing request is (S2302), when determining that this processing request is the request when contributing the material image or the replacement request (S2302; generation or replacement), acquires the material image file 6, transmitted in the way of being attached to the mail with the processing request, together with the block position (the block ID) in the target image where the material image is placed (S2303).

Herein, the mosaic image generating unit 34 in the second working example omits the process (S2304) of converting the material image into the grayscale image in the first working example shown in FIG. 23. Consequently, the target file is the material image file 6 which is acquired by the material image acquiring unit 46 (S2303) and undergoes resizing corresponding to the information of the target block in the material image preprocessing unit 44, and the material image calculating unit calculates the respective statistic values (the minimum density value, the maximum density value, the average density value, the dark density value and the bright density value) with respect to RGB (S2901).

Note that the statistic value calculating method is the same as in the first working example. Namely, in the RGB values of the whole pixels contained in the material image 71, the minimum density value of each color of RGB is extracted, and this minimum density value is subtracted from each of the density values of the whole pixels of this material image. The material image calculating unit 47 calculates, with respect to the thus-converted RGB values, the minimum density value (which is the same as the allowable minimum density value), the maximum density value, the average density value and the ratio (the dark density value, the bright density value) of the density values ranging from the minimum density value up to the average density value and the density values ranging from the average density value up to the maximum density value, respectively.

The material image correcting unit 48 acquires the respective RGB statistic values related to the material image 71, which are calculated by the material image calculating unit 47, and further acquires respectively the R target value, the G target value and the B target value of the block image of the block in which the material image 71 is placed. The material image correcting unit 48 color-corrects the respective RGB values of the material image 71 so that the average R-value, the average G-value and the average B-value calculated by the material image calculating unit 47 become the R target value, the G target value and the B target value of the target block image (S2902). At this time, the material image correcting unit 48, similarly to the first working example, when shifting the average density value of the original material image to the target density value, determines with respect to each color of RGB whether the maximum density value of the original material image exceeds the allowable maximum density value or not, and executes the same process as in the first working example, corresponding to a result of this determination.

The mosaic image generating unit 49 replaces the block image of the block in which the material image is to be placed, in the target image file, with the material image that is thus color-corrected by the material image correcting unit 48 (S2903). The block image of the block in which the material image is to be placed is detected from the block ID. If the processing request is the replacement request, the previous material image is placed in the block where the material image is to be placed. Hence, the mosaic image generating unit 49 replaces the original material image with the newly-color-corrected material image for the replacement (S2903).

For others, the processes if the processing request is the moving request (S2302; movement) and if the processing request is the delete request (S2302; delete) are the same as those in the first working example.

<Operation and Effect in Second Working Example>

Herein, the operation and the effect of the mosaic image providing system in the second working example discussed above will be stated.

In the second working example, without converting the material image into the grayscale image, the respective RGB statistic values with respect to the original material image are calculated. Then, the original material image undergoes the tone-correction so as to match with the tone of the target block image by utilizing the respective statistic values calculated about RGB.

Thus, in the second working example, unlike the first working example, the material image is tone-corrected based on the respective statistic values calculated by use of the original RGB values without converting the material image into the grayscale image.

Hence, according to the second working example, the dispersion in the respective RGB values of the material image is left, and it is therefore feasible to express a feeling of roughness on the completed mosaic image as compared with the first working example and to allow, with respect to each material image, a latitude of appearance in each material image such as providing the material image much closer to the tone of the original image and providing the material image which exhibits a little bit extravagant color.

Third Working Example

The mosaic image providing system in a third working example will hereinafter be described. The mosaic image providing system in the third working example provides not only the functions of providing the material images for organizing the mosaic image and manipulating the provided material images as described above but also a new function capable of performing the communications between the users via the mosaic image. Specifically, the mosaic image providing system in the third working example provides the function enabling the user who browses the mosaic image to contribute a comment concerning each of the material images organizing the mosaic image and to browse the contributed comment.

[Device Configuration]

The mosaic image providing system in the third working example for realizing the new function is different from that in the first working example in terms of only the function of the server 10, and hence the following discussion will focus on a functional configuration of the server 10 in the third working example. Note that the hardware configuration may be the same as in the first working example.

[Server 10]

Figure 30:
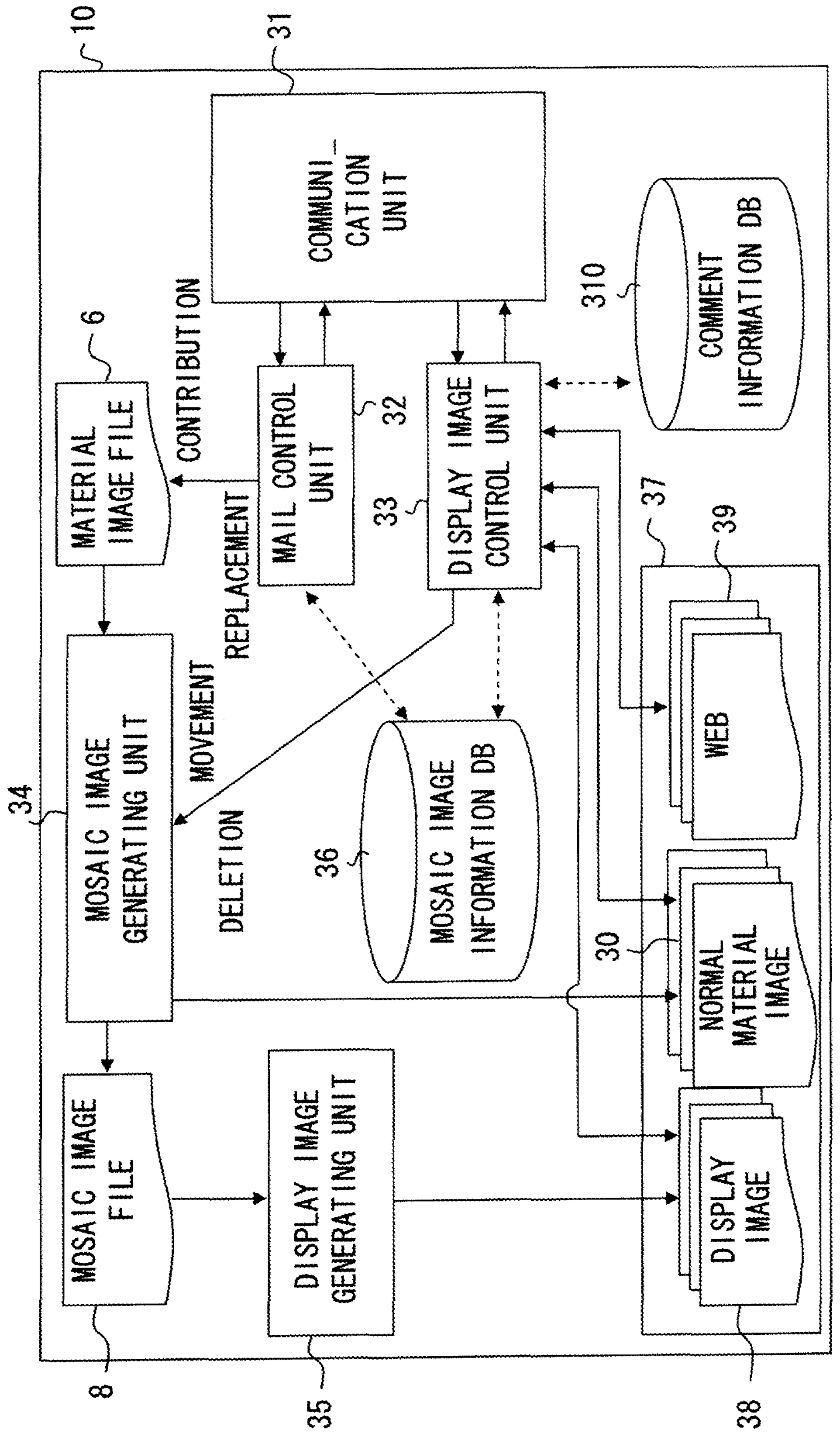
FIG. 30 is a block diagram representing a conceptual configuration of a function of the server in a third working example.

FIG. 30 is a block diagram illustrating a conceptual configuration of the function of the server 10 in the third working example. The server 10 in the third working example further includes a comment information database (DB) 310 in addition to the components of the first working example. The following discussion will focus on the function units of the server 10, which are different from those in the first working example.

FIG. 31 is a diagram representing the comment information DB 310 in the third working example. As illustrated in FIG. 31, the comment information DB 310 is stored with an image ID for identifying the material image, a comment contributed to the material image, a user ID (a comment entry user ID) for identifying the user who enters this comment, comment open range information and comment contribution date/time information in the way of being associated with each other. Among these items of information, the image ID and the comment entry user ID are the same as the image ID and the user ID stored in the mosaic image information DB 36.

The open range information is information for limiting a range within a comment can be referred to and is exemplified by designation of a range enabling only the identical person who enters the comment ([the identical person] in FIG. 31) to refer to the comment, designation that does not limit the range ([all users] in FIG. 31) and designation of the range enabling only the user to make reference, who contributes the material image placed adjacent to the material image to which the comment is contributed ([neighbor] in FIG. 31). The present invention does not limit the designation of the range such as this and may therefore permit the designation of a range for specifying the unique user, the designation of a range for specifying a predetermined user group, etc.

The WEB file 39 stored in the display information storage unit 37 on the mobile terminal 2 contains a file (e.g., the SWF file) for configuring the user interface for contributing the comment for the selected material image and displaying the contributed comment.

The display image control unit 33 executes, in addition to the processes in the first working example, a process corresponding to the information transmitted from the mobile terminal 2 by downloading the WEB file 39 for configuring the new interface such as this into the mobile terminal 2 and operating the new interface. The display image control unit 33, when the mobile terminal 2 transmits the comment information, the target image ID, the user ID of the user defined as an originator of this comment and the open range information thereto, stores these items of information in the comment information DB 310.

Further, the display image control unit 33, when downloading the predetermined display image file 111, 112, 113 or 114, downloads together the comment information contributed to the material image placed within the display image in this downloaded file. Each display image file is attached with file identifying information for specifying each file. This file identifying information is used, thereby specifying the block ID contained in each display image file.

The display image control unit 33 recognizes the whole block IDs within the display image from pieces of identifying information of the display image file to be downloaded, and extracts, from the mosaic image information DB 36, the image IDs of the respective material images placed in the positions specified by the thus-recognized respective block IDs. The display image control unit 33 extracts, based on all of the thus-extracted image IDs, the comment information contributed to each material image of which the open range embraces the user who requests the display from the comment information DB 310. The display image control unit 33 downloads the thus-extracted comment information together with the display image file.

At this time, the display image control unit 33 may restrict the comments to be downloaded in the whole comment information by taking account of a traffic and a memory capacity of the mobile terminal 2. For example, in the case of downloading the display image files 111, 112 and 113, the block count of the blocks within the display image is large, and therefore only 50-items of comments counted from the latest in terms of the contribution date/time may be downloaded, or alternatively the comments each delimited to a character length enabled to be displayed on the mobile terminal 2 may also be downloaded.

The display image control unit 33 in the third working example downloads only the comments in the whole comment information, which are required to be displayed on the mobile terminal 2. Specifically, the display image control unit 33 selects a combination of the comments that should be simultaneously displayed so as not to overlap the comments displayed on the screen of the mobile terminal 2 with each other, and switches over the combination of the comments to be downloaded when receiving a display update request from the mobile terminal 2 or at a predetermined cycle. The comment combination may be one comment combination for each of the cells on the screen of the mobile terminal 2 and may also be one comment combination given to each of the upper stage, the middle stage and the lower stage. Note that the FLASH on the mobile terminal 2 may execute selecting the combination of the comments in all of the downloaded comments, which should be displayed simultaneously.

[Operational Example]

An operational example of the mosaic image providing system in the third working example will hereinafter be discussed. It is to be noted that the following discussion will focus on the operational example targeted at only a communication function between the users, which is newly added to the mosaic image providing system in the third working example. With respect to this newly-added function also, the user interface is actualized on the mobile terminal 2.

Figure 32:
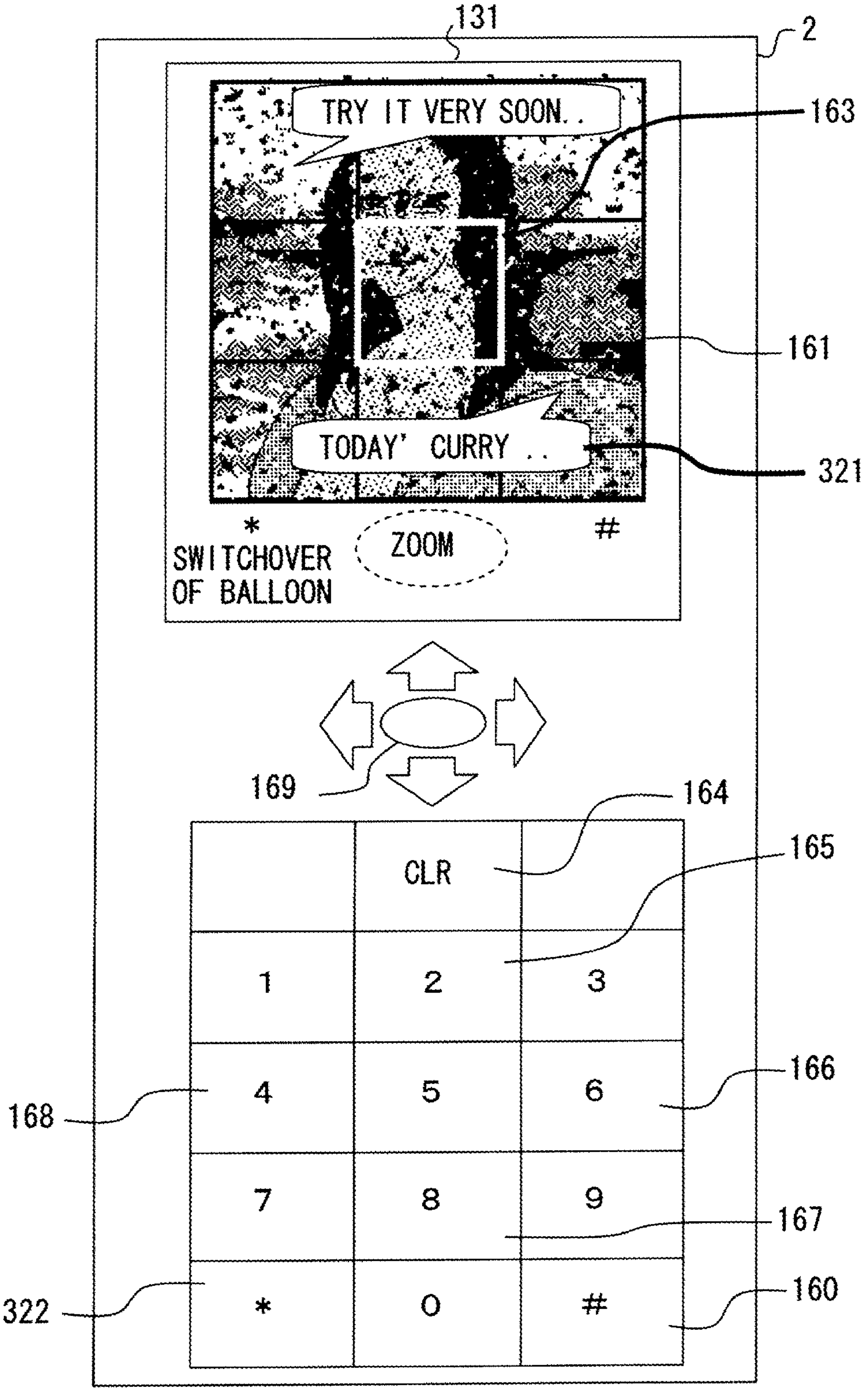
FIG. 32 is a diagram representing an example of an arrangement on the first screen 131 in the third working example.

FIG. 32 is a diagram illustrating an example of an arrangement on the first screen 131 in the third working example. As shown in FIG. 32, on the first screen 131 in the third working example, the comment is displayed as a balloon (indicated by the numeric code 321) over the mosaic image displayed in the display area 161. This is realized by, e.g., the FLASH. The comment display mode is not limited to the balloon, but a mode enabling a grasp of the relations of the comment with the target material image to which the comment is contributed may be available.

The FLASH acquires the downloaded comment information together with the display image file 111, and gets a predetermined number of characters of each comment displayed in the balloon. The balloon 321 is displayed to indicate the position of the material image to which the comment is contributed. This position can be determined from a correlation between a reduction ratio of the display image and the position of the block specified by the block ID.

According to the description given above, there is downloaded the comment information satisfying the designation of the open range and related to the combination of the comments that should be simultaneously displayed, and hence the FLASH displays only the comments that take this open range into consideration. Note that the FLASH may execute the process related to the open range of the comments. In this case, the comment information not restricted to the open range is downloaded together with the open range information, and the FLASH selects the should-be-displayed comments based on conditions of the open range.

When the [*] key 322 is manipulated on the first screen 131, the FLASH switches over the display and non-display of the balloon 321 to be displayed.

The same process as on the first screen 131 described above is executed also on the second screen 132 and the third screen 133.

Figure 33:
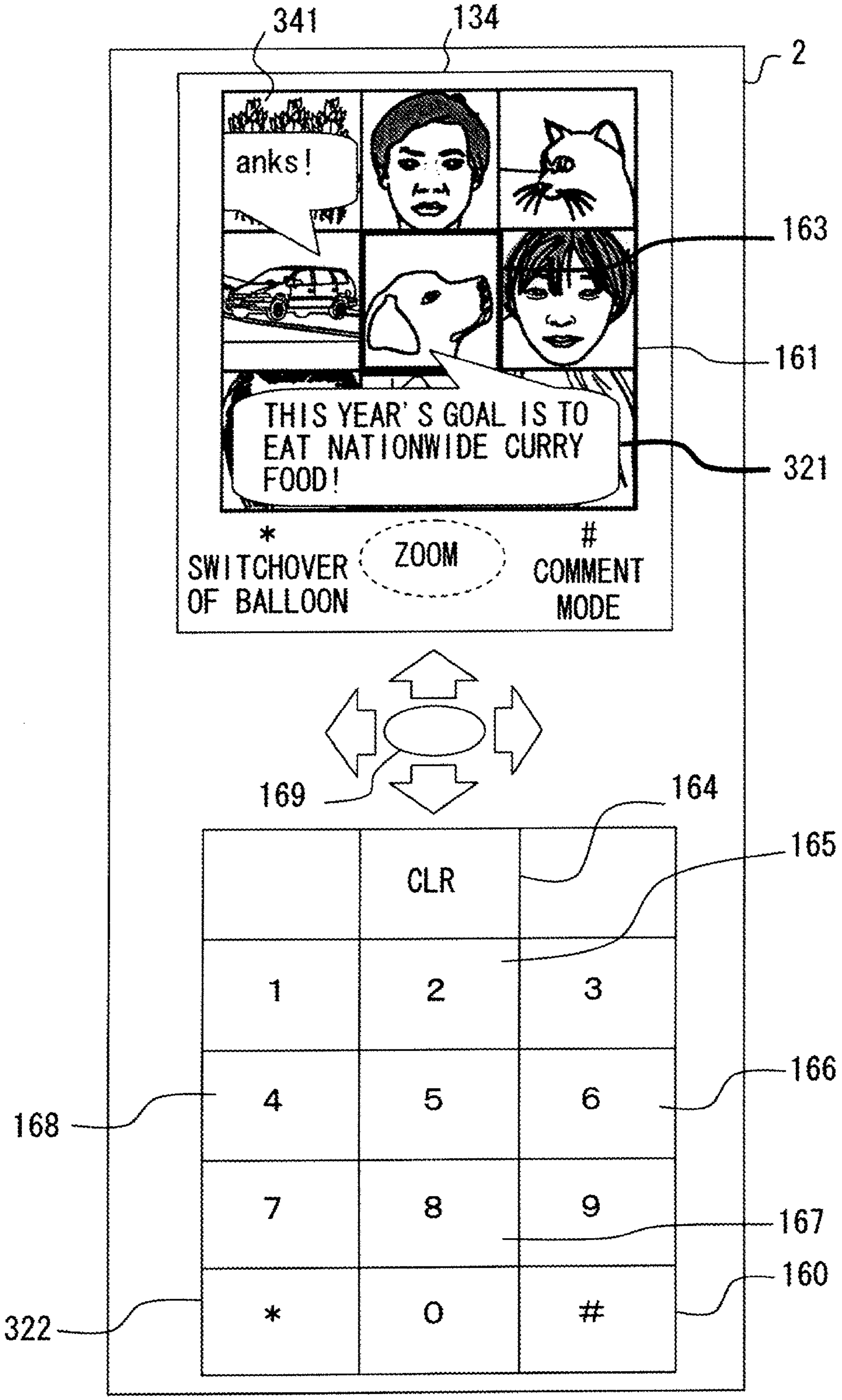
FIG. 33 is a diagram representing an example of an arrangement on the fourth screen 134 in the third working example.

FIG. 33 is a diagram representing an example of an arrangement on the fourth screen 134 in third working example. As illustrated in FIG. 33, similarly to the first screen 131 described above, the comment is displayed within the balloon 321 also on the fourth screen 134 in the third working example. On the fourth screen 134, there are a small number of material images, so that all of the comment information contributed to the respective material images and contained in the open range is downloaded.

The FLASH, in the same way as in the case of the first screen 131 described above, displays the balloons 321 to indicate the contributed material images so as not to overlap these balloons with each other. Note that the character count of the comment displayed within the balloon 321 in the case of the fourth screen 134 may be set larger than the character count on the first screen 131.

In the third working example, the FLASH displays the balloons 341 for displaying the comments contributed to the material images at the right and left edges in such a state that not entire but partially-cut balloons are shown. Hence, the user browsing this fourth screen 134 can view only a proportion of the comment displayed within the balloon 341. This partially-displayed comment provokes a user's desire for viewing the display image extending in a cut-off direction of the balloon 341 and induces the user to move to a neighboring display image. Therefore, the scheme according to the third working example enables the user to view more of images. Note that the FLASH, if operated to move in the left direction on the drawing in the example of FIG. 33, controls the screen to display all of the cut-off balloon 341 (to unveil the hidden image).

Further, on the fourth screen 134, when the cell in which to display the material image is selected with the selection frame 163 and when the determination key 169 is manipulated, a comment display screen 341 for contributing the comment to the material image is displayed. The comment display screen 341 is realized by, e.g., the FLASH.

Figure 34:
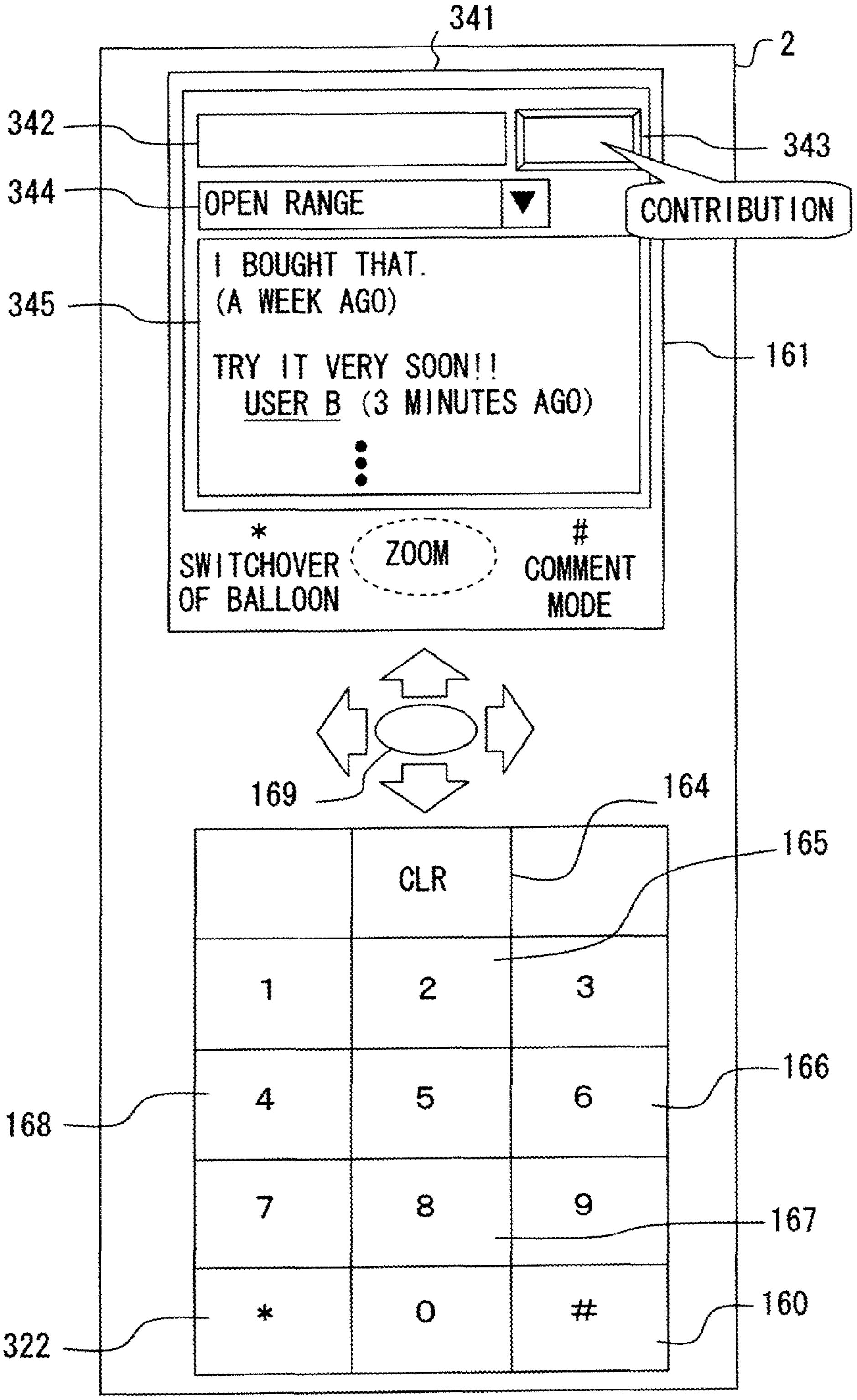
FIG. 34 is a diagram representing an example of an arrangement on a comment display screen 341 in the third working example.

FIG. 34 is a diagram illustrating an example of an arrangement on the comment display screen 341 in the third working example. A comment input box 342, a contribution button 343, an open range designating box 344, a comment display window 345, etc are displayed in the display area 161 on the comment display screen 341.

The comment is inputted to the comment input box 342, a desired range is set in the open range designating box 344, and the contribution button 343 is selected, at which time the FLASH transmits the inputted comment, the image ID specifying the material image being currently selected and the open range information to the server 10. The display image control unit 33 of the server 10 receives the thus-transmitted comment information and stores the comment information in the comment information DB 310.

The comments contributed to the now-being-selected material image are displayed in the sequence from the latest from upward to downward in the comment display window 345. When each of the comments is displayed in this comment display window 345, the contribution date/time and the information about the user who contributes this comment are displayed together. The comment contributed by the contributor himself or herself to the material image may be displayed in a color different from other comments.

Moreover, the comment contributor user is, e.g., displayed with an underline to indicate that the user can shift to the fourth screen 134 on which to, if this user contributes the material image, display this contributed material image. When the display such as this is selected, the fourth screen 134 containing the material image contributed by the user is displayed.

Figure 35:
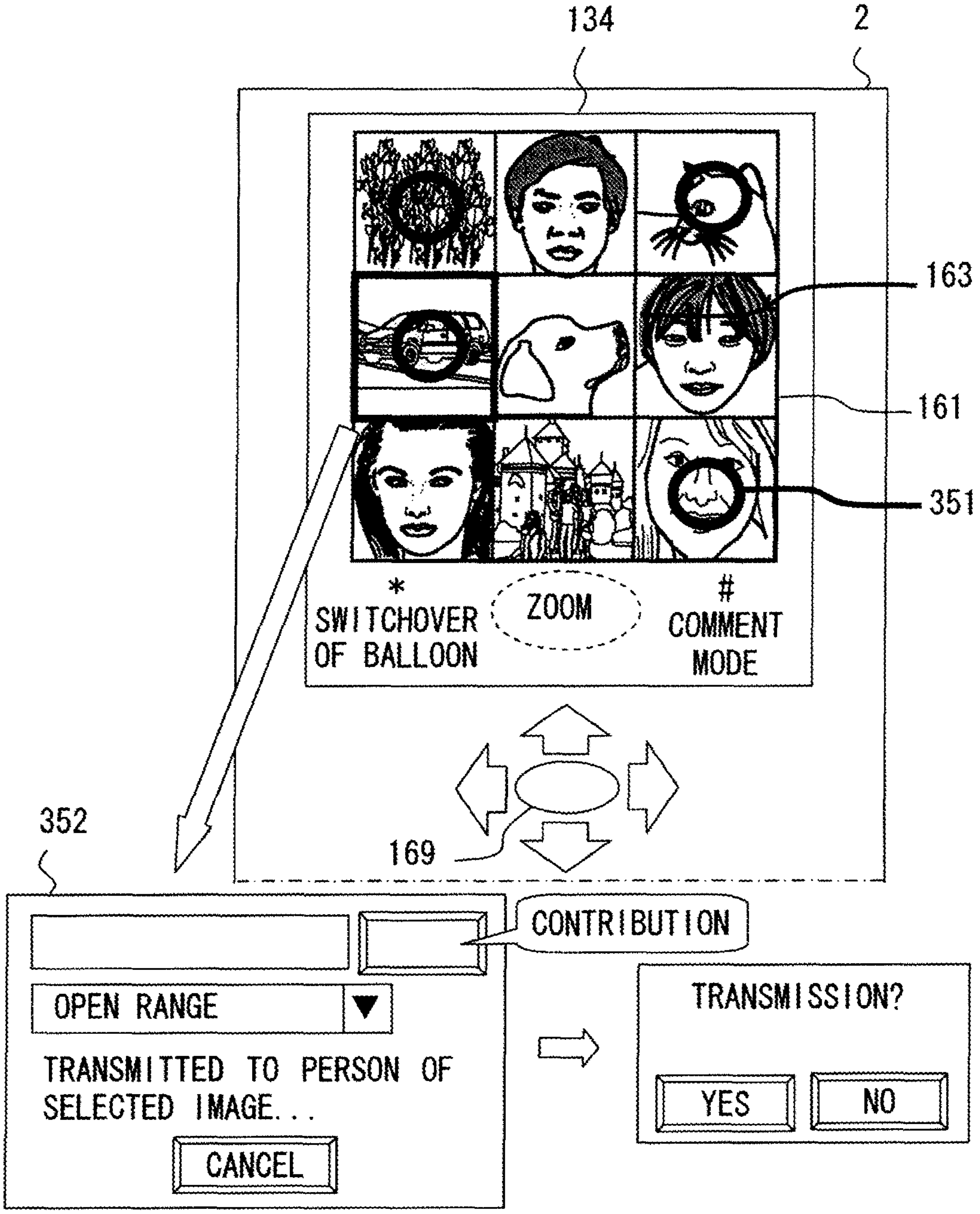
FIG. 35 is a diagram representing an example of a batch-wise comment contribution to a plurality of material image in the third working example.

Further, on the fourth screen 134, when a [#] key 160 is manipulated, the screen is transitioned to an operation mode enabling the comments to be contributed to the plurality of material images at one time. In this operation mode, the material image to which the comment is desired to be contributed is selected with the selection frame 163, and the determination key 169 is manipulated, at which time a selection mark 351 is, as shown in FIG. 35, displayed at this cell. FIG. 35 is a diagram illustrating an example of a batchwise comment contribution to the plurality of material images in the third working example. After displaying the selection marks 351 at the plurality of cells through this operation and when manipulating a [*] key 322, a comment input screen 352 is displayed. The comment input screen 352 is realized by, e.g., the FLASH.

When the comments are inputted on this comment input screen 352, the inputted comments are processed as the comments contributed to the material images fitted with the selection marks 351. Namely, the FLASH transmits, together with these comments, the plurality of image IDs specifying the material images fitted with the selection marks 351 and the user IDs to the server 10.

<Operation and Effect in Third Working Example>

Herein, an operation and an effect of the mosaic image providing system in the third working example discussed above will hereinafter be stated.

In the third working example, on the fourth screen 134 for displaying the images when the mosaic image is displayed in the zoom-in mode at the maximum, any one of the cells is selected with the selection frame 163, and subsequently the comment display screen 341 is displayed. Set on this comment display screen 341 are the comment about the material image within the now-being-selected cell and the open range information of this comment. When the comment information is inputted on the comment display screen 341, the user ID, the comment information, etc are transmitted together with the image ID specifying the material image within the now-being-selected cell to the server 10. In the server 10, the comment information DB 310 is stored with the image ID, the user ID, the comment information (the comment, the open range information, etc), the contribution date/time, etc, which are transmitted from the mobile terminal 2.

Moreover, when transitioned to a comment mode by manipulating the [#] key 160 on the fourth screen 134, the plurality of cells can be selected by operating the selection frame 163. When selecting the plurality of cells and manipulating a [*] key 322, the comment input screen 352 is displayed. Upon inputting the comments on the comment input screen 352, the plurality of image IDs specifying the material images within the plurality of selected cells, the user IDs and the inputted comments are transmitted to the server 10. In the server 10, the inputted comments are registered in the respective records specified by the image IDs and the user IDs.

Thus, the mosaic image providing system in the third working example enables the user not only to browse and operate the mosaic image but also to contribute the comments to the material images.

As to the thus-contributed comment information, when the display image files 111, 112, 113 and 114 are downloaded, the comment information contributed to the material images contained in the downloaded display images is downloaded.

With this downloading, the contributed comments are displayed as the balloons on the first screen 131, the second screen 132, the third screen 133 and the fourth screen 134. The balloon is formed to indicate the displayed target material image within the mosaic image.

Accordingly, the user can browse not only the zoom-displayed mosaic image but also the comments contributed to the material images in the browsing range. Moreover, the shape of the balloon can specify which material image to which the comment is contributed is, thereby enabling a search for a popular material image to which a multiplicity of comments is contributed and enabling a message to be sent to an acquaintance via the material image.

Namely, the mosaic image providing system in the third working example can provide a communication site to the users via the mosaic image. By extension, it is feasible to enhance a customer attracting characteristic of the mosaic image providing system and increase a degree of recognition of the material images as the basis of the mosaic image.

Fourth Working Example

The mosaic image providing system in a fourth working example will hereinafter be described. Each of the systems in the first through third working examples provides the mosaic image, in which the mobile terminal 2 is used as the user interface by the user. The mosaic image providing system in the fourth working example provides the mosaic image by employing a printing device as an output means.

[System Architecture]

Figure 36:
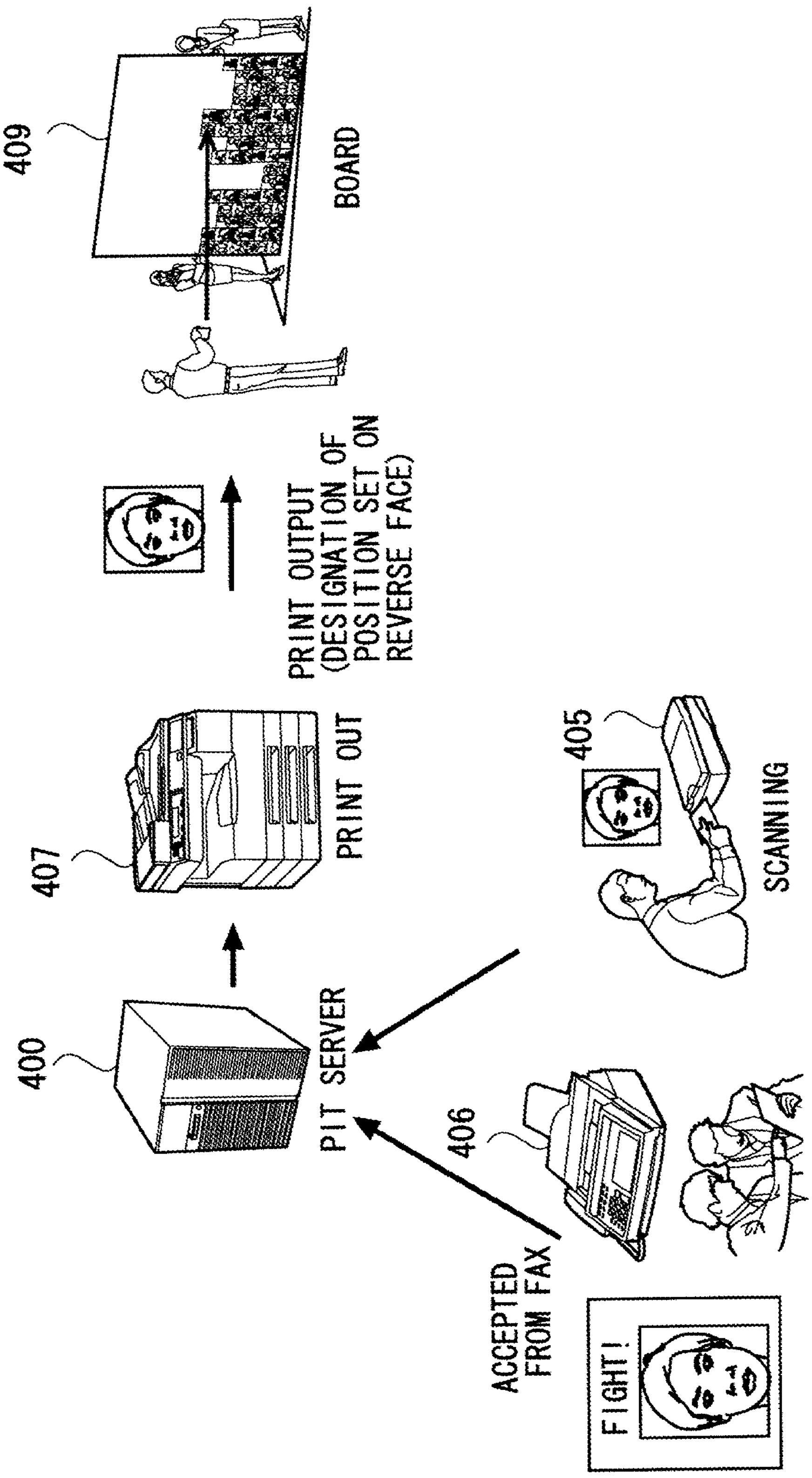
FIG. 36 is a diagram representing an outline of an architecture of a mosaic image providing system in a fourth working example.

A system architecture of the mosaic image providing system in the fourth working example will hereinafter be described with reference to FIG. 36. FIG. 36 illustrates an outline of the architecture of the mosaic image providing system in the fourth working example. The mosaic image providing system 1 in the fourth working example includes a server 400, a scanner 405, a FAX device 406, a printer 407, etc. The server 400 is connected to the scanner 405, the FAX device 406 and the printer 407. The present invention does not restrict a connection system between the server 400 and the respective devices, however, the following discussion will exemplify an example (topology) in which the scanner 405 and the FAX device 406 are connected to the server 400 via a network such as Ethernet (registered trademark), and the printer 407 is connected to the server 400 via a serial communication line such as USB (Universal Serial Bus).

In the mosaic image providing system 1 of the fourth working example, the scanner 405 or the FAX device 406 captures the material image, the server 400 corrects the thus-captured material image corresponding to the position where this material image is placed, and the printer 407 prints the post-correcting material image and the position information on the position where this image is placed onto a predetermined medium. This medium, onto which the image is printed by the printer 407, is stuck to the position specified by the positional information on, e.g., a board 409 illustrated in FIG. 36. This process is executed for the plurality of material images prepared by the plurality of users, whereby the mosaic image is finally formed on the board 409.

A size of the mosaic image as a complete version and the number of the mediums on which the post-correcting material images are printed, are previously designed by a service manager etc who utilizes the mosaic image providing system 1. For example, the service manager etc designs the number of participant users who provide the material images and sets the number of the participant users to the number of the mediums. These items of design information on the mosaic image are inputted to the server 400 through a keyboard etc (unillustrated). The server 400 determines, based on these items of design information, sizes and an array of the mediums on which the post-correcting material images are printed. Coordinate information in the thus-determined array of the mediums become the positional information printed together with the post-correcting material images on the mediums. The positional information is expressed by the coordinate information such as the sixth row in length and the fourth column in width.

[Device Configuration]

Configurations of the devices building up the mosaic image providing system 1 in the fourth working example will hereinafter be described.

[Scanner and FAX Device]

The scanner 405 and the FAX device 406, through the general types of their functions, capture the material images from the mediums prepared by the user into the mosaic image providing system 1. The material image is sufficient if capture-enabled as digital data into the mosaic image providing system 1 and is what is printed on the medium such as a photo and a sheet of paper.

The scanner 405 generates the digital data (the material image file) containing the material image by reading beams of light reflected from the medium prepared by the user. The generated material image file is temporarily stored in the memory provided inside the scanner 405 and is thereafter transmitted to the server 400.

The FAX device 406 receives the data transmitted from another FAX device and stores the received data as the digital data (the material image file) in the memory etc. This material image file 421 contains the material images. Thereafter, the material image file 421 is transmitted to the server 400.

The material image files stored by the scanner 405 and the FAX device 406 may be collected at a predetermined cycle by the server 400 and may also be transmitted to the server 400 by the scanner 405 and the FAX device 406. Note that the FAX device 406 may be a dedicated device and may also be a computer (personal computer etc) having the FAX function.

The present invention does not limit, if capable of capturing the material image into the mosaic image providing system 1 from the medium prepared by the user, the material image capturing means such as this to the scanner 405 and the FAX device 406.

[Printer]

The printer 407 receives print image data transmitted from the server 400 and prints this print image data on the predetermined medium. This predetermined medium may be a dedicated printing medium such as the sheet of paper and an OHP (OverHead Projector) sheet and may also be clothing and an installed wall if the image can be transferred to these mediums.

The print image data contains the post-correcting material image and the positional information described above. The print image data is printed on the predetermined medium in a printing medium size and with a print resolution, which are determined by the server 400. Further, the positional information contained in the print image data may be printed in a predetermined position that is flush with the surface on which the post-correcting material image is printed and may also be printed on another surface.

The present invention limits, if capable of printing the post-correcting material image generated by the server 400 and the positional information thereof on the predetermined medium, neither this type of printing means to the printer 407 nor the type of the predetermined medium.

[Server]

The server 400 may be built up by the general-purpose computer such as a general type of personal computer and may also be built up by a dedicated computer. A hardware configuration of the server 400 is the same as in the first working example, and hence its description is herein omitted (see FIG. 2). The NI controller 16 in the fourth working example, however, actualizes the communications with the scanner 405, the FAX device 406 and the printer 407.

Figure 37:
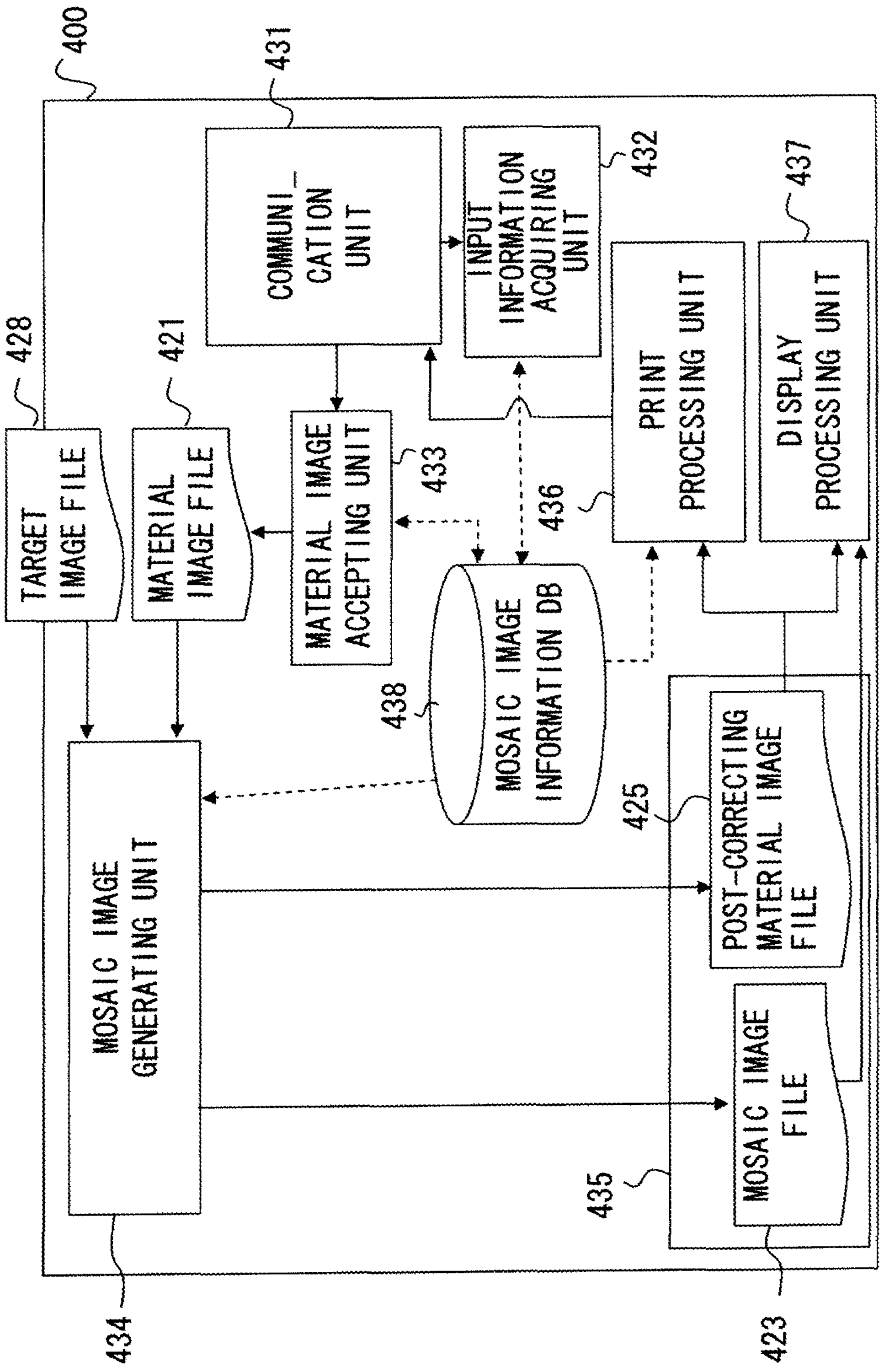
FIG. 37 is a block diagram representing a conceptual configuration of a function of the server in the fourth working example.

FIG. 37 is a block diagram illustrating a conceptual configuration of the function of the server 400 in the fourth working example. The server 400 includes, as shown in FIG. 37, a communication unit 431, an input information acquiring unit 432, a material image accepting unit 433, a mosaic image generating unit 434, an image data storage unit 435, a print processing unit 436, a display processing unit 437, a mosaic image information database (DB) 438, etc.

The communication unit 431 controls the NI controller 16 and thus processes the data transmitted and received according to a predetermined protocol between the server 400 and the devices such as the scanner 405, the FAX device 406 and the printer 407. The communication unit 431 transmits a material image file 421 transmitted from the scanner 405 or the FAX device 406 to the material image accepting unit 433. Further, the communication unit 431 transmits the print image data of the post-correcting material image sent from the print processing unit 436 to the printer 407.

The material image accepting unit 433, when accepting via the communication unit 431 the material image file 421 that is transmitted from the scanner 405 or the FAX device 406, issues the image ID for identifying the material image within the material image file 421. The material image accepting unit 433 stores the issued image ID in the mosaic image information DB 438, and transmits the material image file 421 together with the image ID thereof to the mosaic image generating unit 434.

The input information acquiring unit 432 acquires the design information related to the mosaic image described above. This design information is inputted via, e.g., the keyboard etc and is transmitted to the input information acquiring unit 432 from the UI controller 15. This design information contains the size of the mosaic image as the complete version and the number of the mediums on which the post-correcting material images are printed. Hereafter, the number of the mediums on which the post-correcting material images are printed, is referred to as a material image count.

The input information acquiring unit 432 determines the array (the overall arrangement) of the respective material images corresponding to the size of the mosaic image and the material image count. The input information acquiring unit 432 determines, corresponding to this array, a print size (including a shape) of the post-correcting material image. Further, the input information acquiring unit 432 determines the print resolution of the post-correcting material image. The print resolution, without depending on the print size of the post-correcting material image, may be determined to be a fixed value, i.e., 300 ppi (pixel per inch) or 300 dpi (dot per inch) and may also be determined corresponding to the print size of the post-correcting material image, the type of the printing medium and specifications of the printer 407.

Further, the input information acquiring unit 432, upon determining the print size of the post-correcting material image, determines the pixel count (the data quantity, the pixel count, etc) of the post-correcting material image corresponding to the print size and the print resolution. The pixel count determined herein includes the information on the shape of the material image. To be specific, for instance, the print size of the post-correcting material image is determined to be 5.08 cm (2 in.) long and 2.54 cm (1 in.) wide, and the print resolution is determined to be 300 ppi or 300 dpi, in which case the pixel count of the post-correcting material image is determined to be 600 (length)×300 (width) (pixels).

The input information acquiring unit 432 stores, in the mosaic image information DB 438, the thus-determined material image count, print size (including the shape) of the post-correcting material image, pixel count of the post-correcting material image and print resolution of the post-correcting material image. These items of information, which are determined by the input information acquiring unit 432 and stored in the mosaic image information DB 438, may be separately changed by the user interface connected to the server 400.

The input information acquiring unit 432 further detects that the material image is obtained by the material image accepting unit 433, and acquires the desired positional information of the material image. This desired positional information of the material image, similarly to the design information, may be inputted by the keyboard etc and acquired via the UI controller 15, and may also be acquired from the image information within the material image file 421. If this information is acquired from the image information, the existing OCR (Optical Character Reader) process may be applied. The desired positional information of the material image is indicated by the position coordinate (e.g., the fifth row in length, the second column in width) of the desired block, corresponding to the already-designed block arrangement within the target image.

The input information acquiring unit 432 may automatically but arbitrarily determine the position of the material image. In this case, the input information acquiring unit 432, corresponding to the information stored in the mosaic image information DB 438, recognizes the block in which the material image is not yet placed and determines the position of the material image from within this block on the basis of a predetermined rule. This predetermined rule is exemplified such as preferentially selecting, if determined to generate the material images in the way of being stacked up sequentially from downward, the lower empty block. The input information acquiring unit 432 stores the thus-acquired positional information of the material images in the mosaic image information DB 438.

The mosaic image information DB 438 is stored with the design information (the overall information) on the mosaic image and the information on the respective material images. Stored as the design information on the mosaic image are the material image count, the print size (including the shape) of the post-correcting material image, the pixel count (including the shape) of the post-correcting material image, the print resolution of the post-correcting material image and so on. Stored as the information on the respective material images are the image ID for identifying the material image which is acquired by the material image accepting unit 433, the positional information on which the material image is placed based, the information indicating the storage location of the post-correcting material image file in the way of being associated with each other. Each of the material images is, as will be mentioned later on, placed in at least one of the areas (the blocks) into which the target image is segmented by the predetermined number. Hence, the mosaic image information DB 438 is stored with the positional information of each material image as the block ID defined as the information for specifying the position of the block in which to arrange the material image. Hereafter, the positional information of the material image will be termed the block ID as the case may be.

The image data storage unit 435 is stored with a mosaic image file 423 including the mosaic image as the complete version and a post-correcting material image file 425 including the post-correcting material image. These files are generated by the mosaic image generating unit 434 that will be described later on.

The print processing unit 436 generates the print image data containing the post-correcting material image and the positional information, and transmits the print image data together with the print size and the print resolution related to this data to the printer 407. The post-correcting material image is extracted from the post-correcting material image file 425 generated by the mosaic image generating unit 434 and stored in the image data storage unit 435. The positional information is extracted from the mosaic image information DB 438 on the basis of the image ID of the material image, of which the mosaic image generating unit 434 notifies when the post-correcting material image file 425 is generated. Further, the print size and the print resolution are also extracted from the mosaic image information DB 438. It should be noted that the present invention, by which the post-correcting material image and the positional information are, it is sufficient, printed on the predetermined medium in the setting size and with the setting print resolution of the printing medium, does not therefore limit the print image data generating method of the print processing unit 436 and the communication method between the printer 407 and the print processing unit 436, respectively.

The display processing unit 437 extracts the mosaic image file 423 and the post-correcting material image file 425 stored in the image data storage unit 435, and gets the mosaic image and the post-correcting material image contained therein to be displayed on the display (unillustrated) connected to the server 400. Owing to this contrivance, the service manager etc who utilizes the mosaic image providing system 1 can, before the mosaic image is formed on the medium, check, through simulation, a state of the corrected material image and a state of the mosaic image at that time. This post-correcting material image may be modified by another rendering application. Note that if this type of simulating function is not required, the display processing unit 437 may be neither provided nor operated.

The mosaic image generating unit 434 receives the material image file 421 acquired by the material image accepting unit 433, further acquires the target image file 428 containing the target image as the basis of the mosaic image, and generates, based on these files, the post-correcting material image file 425 and the mosaic image file 423. These generated post-correcting material image file 425 and mosaic image file 423 are stored in the image data storage unit 435. A detailed function of the mosaic image generating unit 434 will hereinafter be described.

<Mosaic Image Generating Unit>

Figure 38:
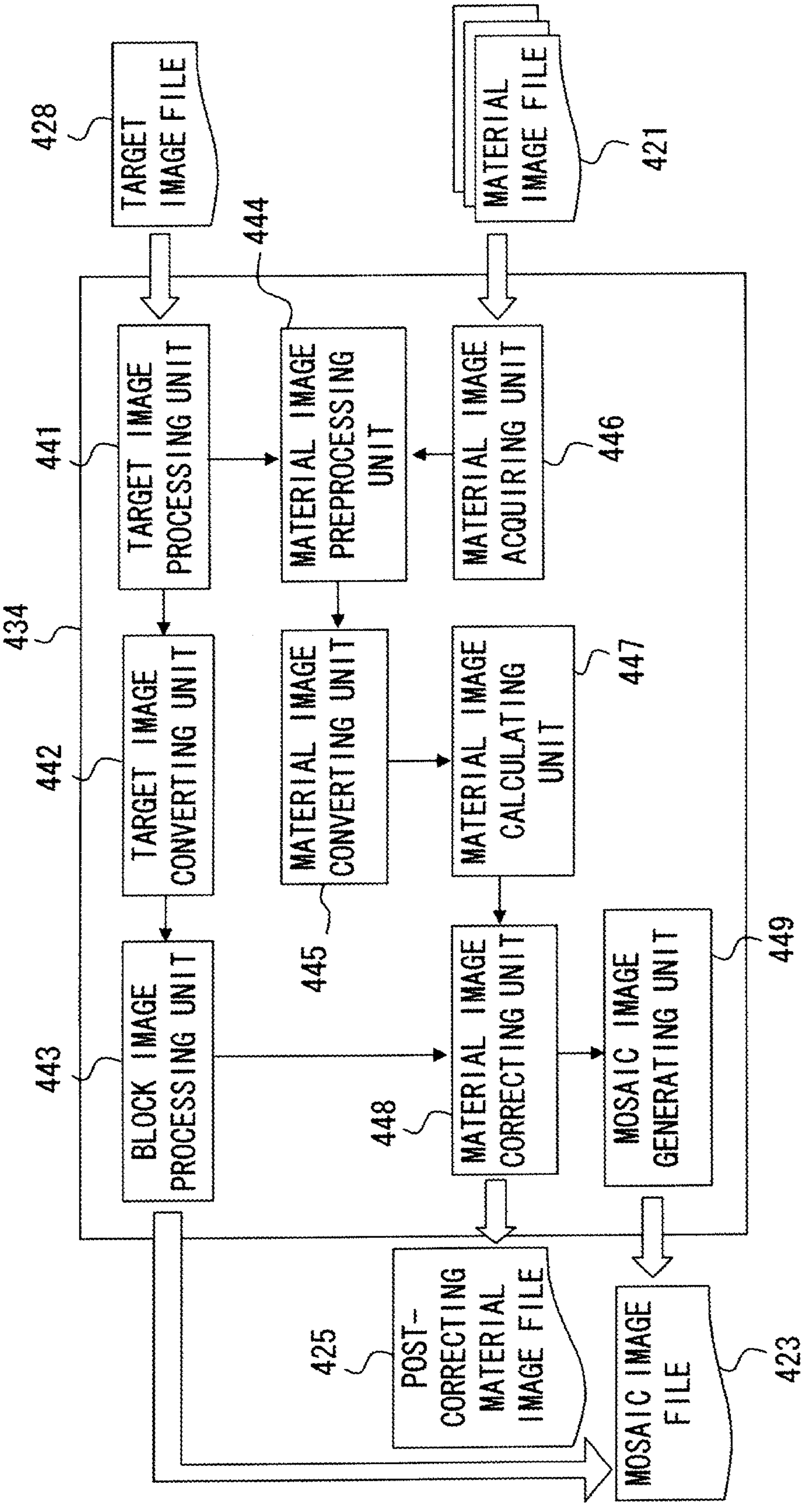
FIG. 38 is a block diagram representing a conceptual configuration of a function of the mosaic image generating unit in the fourth working example.

FIG. 38 is a block diagram illustrating a conceptual configuration of the function of the mosaic image generating unit 434 in the fourth working example. The mosaic image generating unit 434 in the fourth working example includes, as shown in FIG. 38, a target image processing unit 441, a target image converting unit 442, a block image processing unit 443, a material image acquiring unit 446, a material image preprocessing unit 444, a material image converting unit 445, a material image calculating unit 447, a material image correcting unit 448, a mosaic image generating unit 449, etc. Namely, the mosaic image generating unit 434 in the fourth working example has the same configuration as in the first working example, however, the processes of some processing units are different from those in the first working example. The description of the respective processing units will hereinafter be focused on the different units from those in the first working example.

The material image file 421 is, as described above, transmitted from the material image accepting unit 433. The target image file 428 may be stored beforehand on a hard disc etc and may also be captured by the material image accepting unit 433 with the same technique as about the material image. The discussion will hereinafter be made by exemplifying an example where the target image file 428 and the material image file 421 are files of the color images, respectively. Further, the following discussion will exemplify a case in which R (Red), G (Green) and B (Blue) are used as color information (color spaces) held by the respective image files 421, 428. The present invention does not, as a matter of course, restrict these color component models, and hence the color models such as C (Cyan), M (Magenta), Y (Yellow) and K (Key tone) may also be utilized.

The present invention restricts neither the forms of the target image itself and the material image itself such as the photo image and the color image nor the generating methods (a file format etc) of the target image file 428 and the material image file 421. If the target image and the material image are the color images and if the mosaic image to be generated is also the color image, however, the mosaic image providing system 1 in the fourth working example exhibits a much higher effect. An in-depth description of each of these function units will hereinafter be given.

<<Target Image Processing Unit 441>>

The target image processing unit 441 acquires the file (the target image file 428) of the target image as the basis of the mosaic image to be generated. The target image processing unit 441 segments, as illustrated in FIG. 5, the target image within this target image file 428 into a predetermined number of areas (blocks) and executes the filtering process of the target image within the target image file 428 on the segmented-block basis.

The target image processed by the target image processing unit 441 is the image serving as the basis of the complete version of mosaic image. With this configuration, the mosaic image generating unit 434 deals with the number of the material images in the complete version of mosaic image as the segment count (the block count) of the target image. The target image processing unit 441, upon acquiring the target image file 428, extracts the material image count from the mosaic image information DB 438, and determines the extracted material image count to be the segment count of the target image.

The target image processing unit 441 extracts the pixel counts of the post-correcting material images from the mosaic image information DB 438, and determines the pixel count (the image size) of the mosaic image on the basis of the extracted pixel counts. Specifically, for instance, if the print sizes of all of the material images are the same, the pixel count of the mosaic image is determined in a way that multiplies the pixel count of the post-correcting material images by the block count. For example, if the print sizes of the respective material images are different, the pixel counts of all of the material images, which are stored in the mosaic image information DB 438, are extracted, and the pixel count of the mosaic image is determined by adding up those material image pixel counts.

The target image processing unit 441 converts the target images within the target image file 428 so as to have the thus-determined pixel count. Note that if the mosaic image simulating function is not requested, there is no necessity for generating the mosaic image file 423, and hence the converting process about the pixel count of the target images may not be executed, but it is enough to perform only the following segmentation.

The target image processing unit 441 segments, by use of the same technique as by the target image processing unit 41 in the first working example illustrated in FIG. 5, the thus-converted target image by the thus-determined block count, and executes the filtering process. The target image segmenting process and the filtering process are the same as those in the first working example, and therefore their explanations are herein omitted (see FIG. 5).

<<Target Image Converting Unit 442>>

The target image converting unit 442 further executes the converting process for the target image processed by the target image processing unit 441 in the same way as by the target image converting unit 42 in the first working example. This converting process is the same as in the first working example, and hence its explanation is herein omitted (see FIG. 6).

<<Block Image Processing Unit 443>>

The block image processing unit 443 acquires, similarly to the block image processing unit 43 in the first working example, the RGB density values (the gradation values) of the respective block images as the target density values on the basis of the target images processed by the target image converting unit 442. This process, with respect to each block image, leads to acquisitions of an R target density value (which will hereinafter be referred to as an R target value), a G target density value (which will hereinafter be referred to as a G target value) and a B target density value (which will hereinafter be referred to as a B target value).

<<Material Image Acquiring Unit 446>>

The material image acquiring unit 446, when acquiring the material image file 421 and the image ID of the material image from the material image accepting unit 433, obtains the block ID as the positional information of the material image on the basis of this image ID from the mosaic image information DB 438. Further, the material image acquiring unit 446 acquires the pixel counts of the post-correcting material images as the overall information from the mosaic image information DB 438. The processing target of the function units, which will hereinafter be described, is the material image file 421 obtained by the material image acquiring unit 446. The material image acquiring unit 446 sends the pixel count of the post-correcting material image as the information that should be used for processing together with the processing target material image to the material image preprocessing unit 444.

<<Material Image Preprocessing Unit 444>>

The material image preprocessing unit 444, when acquiring the material image and the pixel count of the post-correcting material image from the material image acquiring unit 446, converts the material image so as to have this pixel count. The material images sent from the material image acquiring unit 446 are the data read from the medium prepared by the user and are not therefore uniformed in terms of the pixel count and the shape. The pixel count transmitted from the material image acquiring unit 446 contains the information corresponding to the shape. Hence, the material image preprocessing unit 444 uniforms the material images with the pixel count sent from the material image acquiring unit 446.

Figure 39:
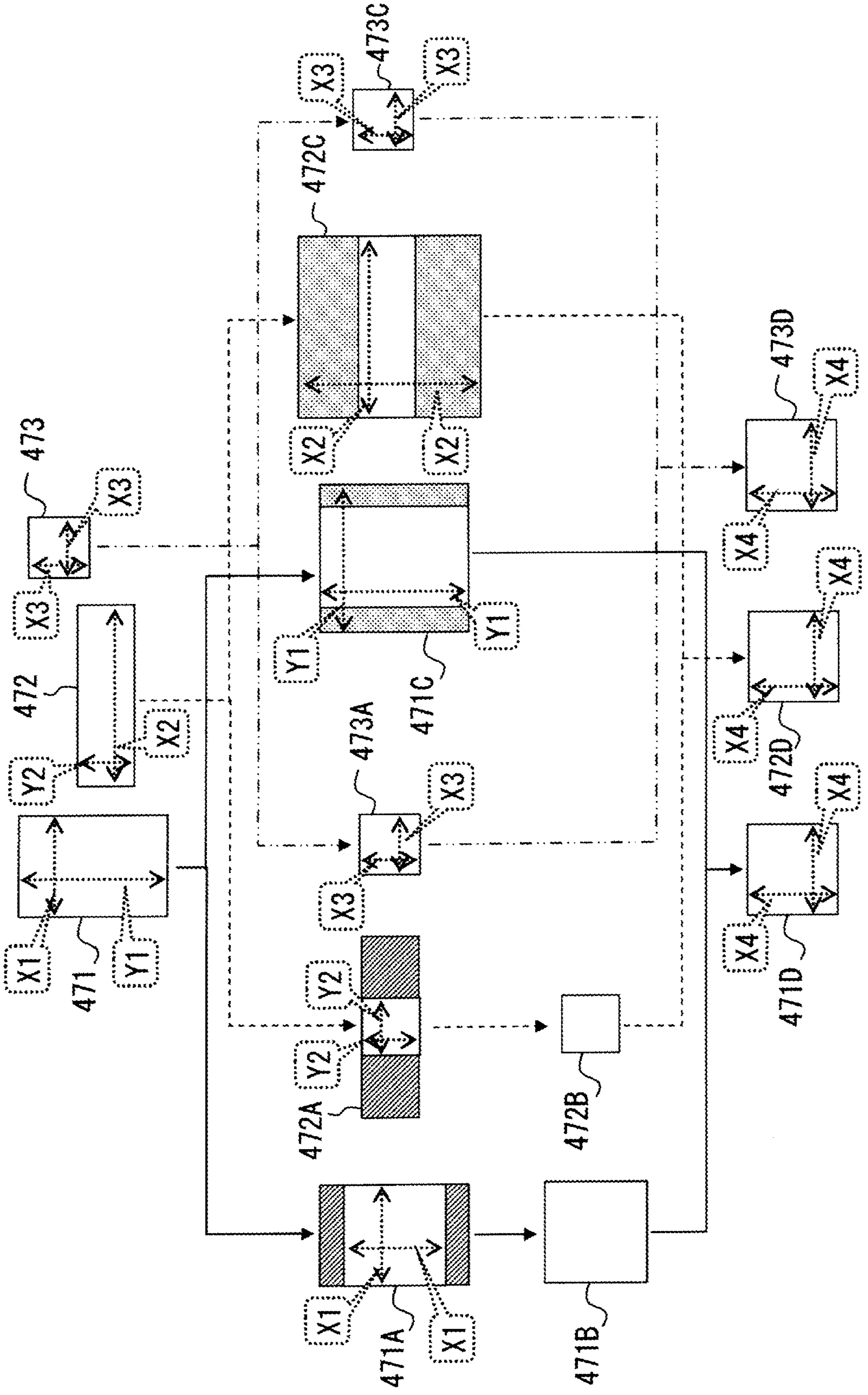
FIG. 39 is a block diagram representing a processing image of a material image preprocessing unit in the fourth working example.

FIG. 39 is a diagram representing a processing image of the material image preprocessing unit 444 in the fourth working example. The material image preprocessing unit 444, specifically, as illustrated in FIG. 39, converts the material image into an image having the uniform pixel count and the uniform shape by trimming and resizing the material image. There are two techniques for this converting process, which are given as below. Any one of these two techniques may be selected on a per-material-image basis by the user, and information for designating any one of the techniques may be stored as an initial value in the server 400.

The first technique is a technique of cutting out the captured material image on a short-side basis. If this first technique is selected, the material image preprocessing unit 444 cuts out a square shape, of which one side has a length of the short side, from within the captured material image. In the example of FIG. 39, a captured material image 471 is cut out with the square shape of which one side is a short side X1, and is thus converted into an image 471B. A captured material image 472 is cut out with the square shape of which one side is a short side Y2, and is thus converted into an image 472B.

The second technique is a technique of adding a margin to the captured material image on a long-side basis. If this second technique is selected, the material image preprocessing unit 444 adds a predetermined margin to the captured material image, and generates an image taking the square shape of which one side includes this long side. The predetermined margin may be colored in a predetermined color and may also be marked with a predetermined pattern. In the example of FIG. 39, the margins are added to both sides of the captured material image 471 in FIG. 39 so as to take the square shape of which one side is a long side Y1, and is thus converted into an image 471C. The margins are added to the upper and lower sides of the captured material image 472 in FIG. 39 so as to take the square shape of which one side is a long side X2.

Note that a captured material image 473 has the square shape of which one side has a length X3, and is not therefore trimmed even if either of these techniques is selected.

The material image preprocessing unit 444, after converting the material image captured as described above into the uniform shape, resizes (reduces or expands) the post-converting material image so as to have the pixel count. The shapes and the pixel counts of the thus-resized material images 471D, 472D and 473D get uniformed. The material image preprocessing unit 444 transmits the thus-normalized normal material images to the material image converting unit 445.

<<Material Image Converting Unit 445>>

The material image converting unit 445 converts the material image processed by the material image preprocessing unit 444 into the grayscale image by the same technique as the material image converting unit 45 does in the first working example. The technique of generating the grayscale image is the same as in the first working example, and hence its explanation is herein omitted (see FIG. 7).

<<Material Image Calculating Unit 447>>

The material image calculating unit 447 calculates, with respect to the grayscale image converted by the material image converting unit 445, the predetermined statistic values (the minimum density value, the maximum density value, the average density value, the dark density value and the bright density value) on the basis of any one of the basic colors of RGB contained in the material image. The statistic value calculating technique of the material image calculating unit 447 is the same as the technique of the material image calculating unit 47 in the first working example, and therefore its description is herein omitted (see FIG. 9).

<<Material Image Correcting Unit 448>>

The material image correcting unit 448 acquires the respective statistic values related to the grayscale image 82 processed by the material image calculating unit 447, and obtains the block ID specifying the position of the block in which the material image is placed. The material image correcting unit 448 acquires, from the block image processing unit 443, the R target value, the G target value and the B target value of the block image of the block specified by the block ID, respectively. The material image correcting unit 448 makes the color-correction of the material image so that the material image average density value calculated by the material image calculating unit 447 becomes the R target value, the G target value and the B target value of the target block image. This color-correction process of the material image is the same as the process of the material image correcting unit 48 in the first working example, and hence its description is herein omitted (see FIGS. 9 and 10). Namely, the material image correcting unit 448 executes, for enhancing the visual recognizability of the entire mosaic image, the process so as to retain the tone (color tone) of the material image to the greatest possible degree in order to enhance the visual recognizability of the material image while making the material image close to the tone of the block image.

<<Mosaic Image Generating Unit 449>>

The mosaic image generating unit 449 generates the mosaic image by replacing the material image undergoing the color-correction in the material image correcting unit 448 with the block image of the block where the material image in the target images within the target image file 428 should be placed. Herein, the description is that the mosaic image is generated by replacing the material image with the target block image in the target image file 428, however, the mosaic image may be, if enabling the material image to be placed in the should-be-placed block position, generated from a new image file.

The block image in the position where any material image does not exist may be placed in this position, and the image having a predetermined color may be placed to facilitate the recognition that the block is the empty block where the material image is not yet placed. Hereafter, the image placed in the empty block is termed the empty block image. The mosaic image generated by the mosaic image generating unit 449 has the material images or the empty block images corresponding to the segment count stored in the mosaic image information DB 438. The mosaic image file 423, which saves the thus-generated mosaic image, is stored in the image data storage unit 435.

[Operational Example]

Figure 40:
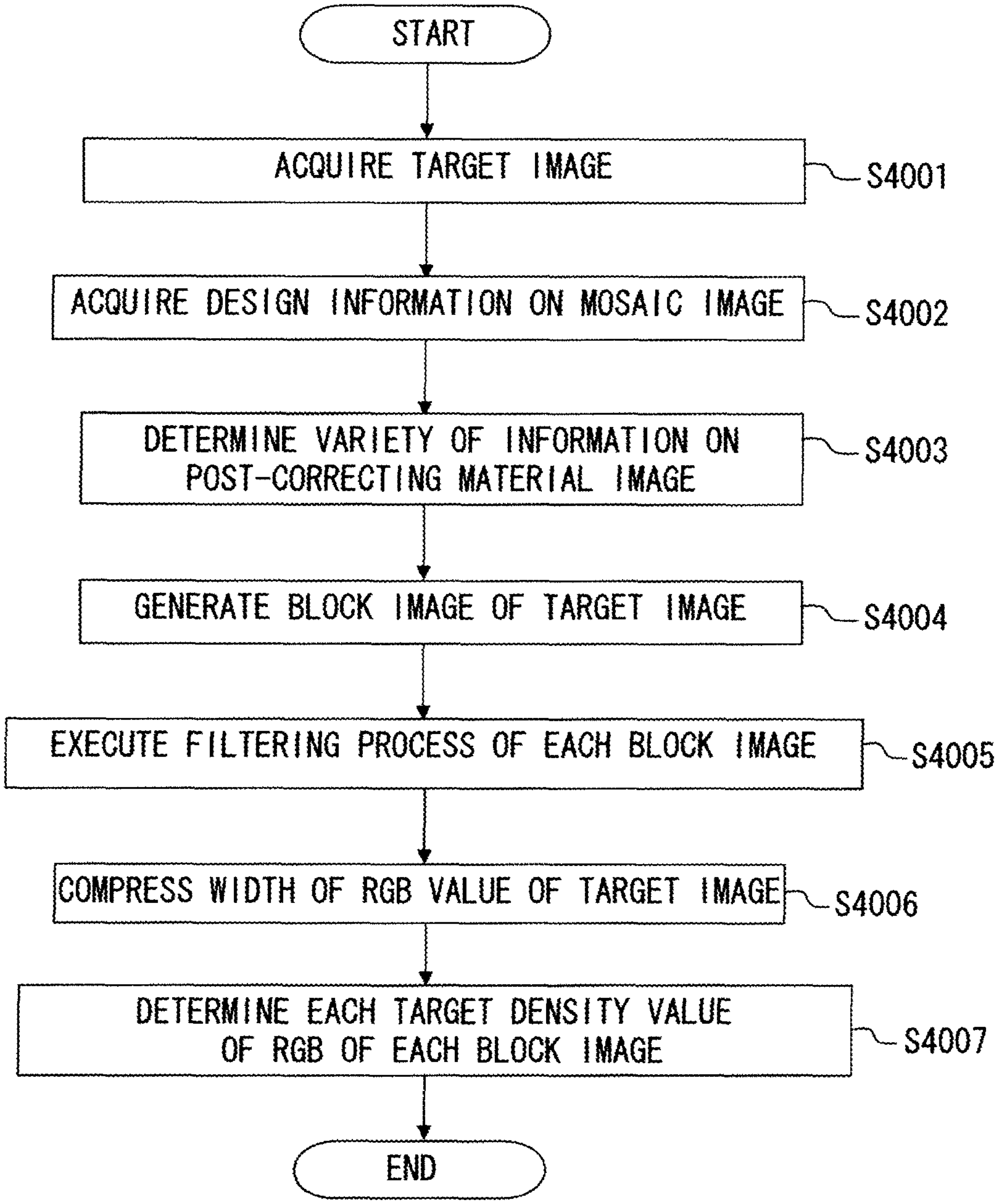
FIG. 40 is a flowchart illustrating a process when determining the target image in the mosaic image providing system in the fourth working example.
Figure 41:
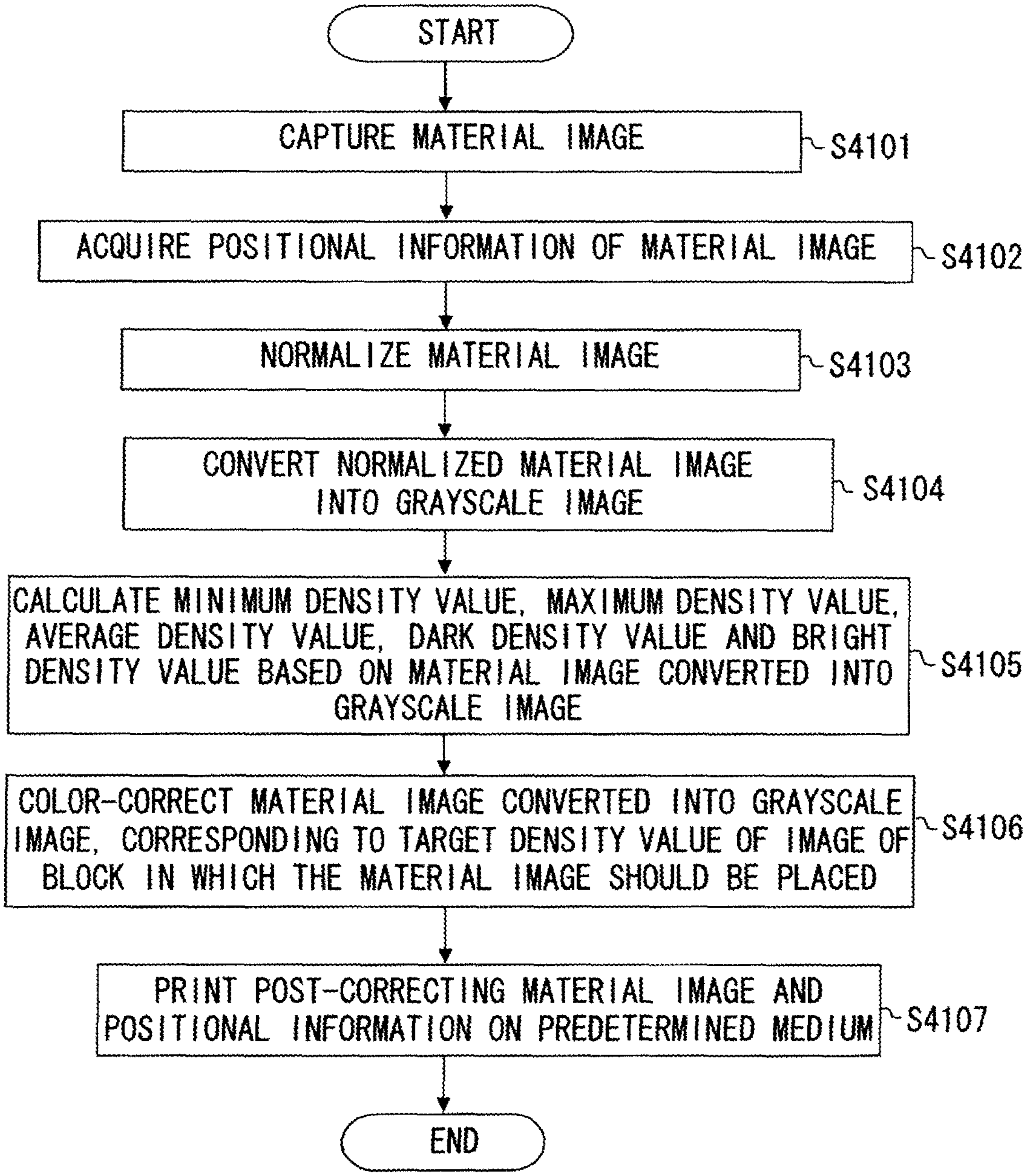
FIG. 41 is a flowchart illustrating a material image correcting process in the mosaic image providing system in the fourth working example.

An operational example of the mosaic image providing system in the fourth working example will hereinafter be described with reference to FIGS. 40 and 41. FIG. 40 is a flowchart illustrating a process when determining the target image in the mosaic image providing system 1 in the fourth working example. FIG. 41 is a flowchart illustrating the material image correcting process in the mosaic image providing system 1 in the fourth working example.

The process shown in FIG. 40 may be executed basically once when the target image is determined (when starting up the system operation). The server 400 in the mosaic image providing system 1 in the fourth working example acquires the target image file 428 containing the target image serving as the basis of the mosaic image (S4001).

In the server 400, the input information acquiring unit 432 acquires the design information on the mosaic image via the communication unit 431 (S4002). This design information contains the size of the complete version of mosaic image and the material image count.

The input information acquiring unit 432 determines, corresponding to this design information, the variety of settings related to the post-correcting material image (S4003). To start with, the input information acquiring unit 432 determines, based on the size of the complete version of mosaic image and the material image count that are contained in the design information, the form of the medium on which to print the post-correcting material image, i.e., determines the print size and the shape of the post-correcting material image. The print sizes and the shapes of the post-correcting material images may be all the same and may also be individually different. In the fourth working example, the print sizes and the shapes of the post-correcting material images are all uniformed to have the square shape and the same size.

Moreover, the input information acquiring unit 432 determines the print resolution of the post-correcting material image, and determines the pixel count (the data quantity, the pixel count, etc) of each post-correcting material image on the basis of the print resolution and the print size. The information on this pixel count is generated in the form of containing the shape information organized by, e.g., the pixel count in length and the pixel count in width. The print resolution is determined corresponding to the type of the medium on which the post-correcting material image is printed.

The input information acquiring unit 432 stores, in the mosaic image information DB 438, the material image count, the print size and the shape of the post-correcting material image, the pixel count (including the shape information) of the post-correcting material image and the print resolution of the post-correcting material image.

The target image processing unit 441 acquires the target image from the target image file 428 and segments this target image into the predetermined number of areas (blocks) (S4004). The segment count (block count) of the target image is set in the material image count extracted from the mosaic image information DB 438.

The target image processing unit 441 executes the filtering process of the target image file 428 on the segmented-block basis (S4005). To be specific, at first, the target image processing unit 441 calculates the average value (the average R-value, the average G-value, the average B-value) of the density values (gradation values) per RGB with respect to each block image. The target image processing unit 441 sets the RGB values of the whole pixels forming the block image to the average RGB value calculated with respect to this block image. With this setting, the colors of each block image are uniformed to the average RGB value of each block image.

Subsequently, the target image converting unit 442 compresses (reduces) the unit width of the RGB value of the target image processed by the target image processing unit 441 so as not to use the ambient densities (the color (gray) close to white and black) of the allowable maximum density value (the density value "225") and the allowable minimum density value (the density value "0") while keeping the fixed tone (S4006). The best mode, for instance, is that the target image converting unit 442 compresses the unit width of the density value so that the allowable minimum density value "0" reaches the density value "32" and the allowable maximum density value "255" becomes the density value "223" in the state of fixing the central density value (127.5).

The target image is thus converted, thereby preventing, if the average density value of the material image gets approximate to the target density value of the target image, the material image from being hard to see due to excessive approximation to white or black.

The block image processing unit 443 acquires, based on the target image processed by the target image converting unit 442, the respective RGB density values (the gradation values) of each block image as the target density values (the R target value, G target value, the B target value) (S4007). These acquired target density values of the respective block images are transmitted to the material image correcting unit 448.

The process shown in FIG. 41 is executed at the timing when the material image is read from the medium prepared by the user.

The scanner 405 and the FAX device 406 capture the material images into the mosaic image providing system 1 from the medium prepared by the user (S4101). In the case of using the scanner 405, the scanner 405 reads the material image from the medium prepared by the user and generates the material image file 421 as the digital data containing this material image. In the case of using the FAX device 406, the FAX device 406 receives the data faxed from another FAX device and saves the data containing this material image as the material image file 421. The material image files 421 retained by the scanner 405 and the FAX device 406 are transmitted to the server 400.

In the server 400, the material image accepting unit 433 acquires the material image file 421 via the communication unit 431. At this time, the input information acquiring unit 432 acquires the positional information of the position where the acquired material image is to be placed (S4102). This positional information may be inputted to the server 400 through the keyboard etc, may be extracted from the material image file 421 and may also be automatically determined from within the block in which the material image is not yet placed. The positional information is stored in the mosaic image information DB 438.

In the mosaic image generating unit 434 of the server 400, the material image acquiring unit 446 extracts the material image from the material image file 421 and acquires, based on the image ID, the block ID defined as the positional information of the material image and the pixel count (including the shape) of the post-correcting material image from the mosaic image information DB 438.

The material image preprocessing unit 444, when acquiring the material image and the pixel count of the post-correcting material image from the material image acquiring unit 446, converts the material image so as to have this pixel count (S4103). With this conversion, the material image preprocessing unit 444 normalizes the material image, which is not uniformed in terms of the pixel count and the shape, with the acquired pixel count and shape.

The material image preprocessing unit 444, on the occasion of uniforming the shape, trims the material image by use of the technique (the first technique) of cutting out the material image on the short-side basis or the technique (the second technique) of adding the margin on the long-side basis. This shape matching technique may be configured in the way of being selection-enabled by the user. The material image preprocessing unit 444 resizes the material image given the uniform shape by such a technique, thereby normalizing the material image.

The material image converting unit 445 converts the material image processed by the material image preprocessing unit 444 into the grayscale image (S4104). Owing to this conversion, a process of dealing with the density value of any one of the basic colors will hereinafter get sufficient for the case of manipulating the respective RGB values of the material image. Further, the dispersion in the RGB values of the material image can be eliminated, and hence, if the material image correcting unit 448 makes the color correction with respect to the material image, the visual recognizability of the material image can be improved such as preventing occurrence of a color that does not exist so far in the material image.

The material image calculating unit 447 calculates, with respect to a grayscale material image 82 converted by the material image converting unit 445, the statistic value about any one of the basic colors of RGB contained in this material image. Specifically, to begin with, the material image calculating unit 447 extracts the minimum density value in the density values of the basic colors held by the whole pixels contained in the material image, and subtracts this minimum density value from the respective density values of the whole pixels of the material image. The material image calculating unit 447 calculates, with respect to the thus-converted single basic color, the minimum density value (which is the same as the allowable minimum density value), the maximum density value, the average density value and a ratio (the dark density value, the bright density value) of the density values ranging from the minimum density value up to the average density value to the density values ranging from the average density value up to the maximum density value, respectively (S4105).

The material image correcting unit 448 acquires the respective statistic values related to the material image, which are calculated by the material image calculating unit 447, and further acquires respectively the R target value, the G target value and the B target value of the block image of the block in which the material image is placed on the basis of the identifying information indicating the block image where this material image is placed. The material image correcting unit 448 corrects the respective RGB values of the material image so that the average density value calculated by the material image calculating unit 447 becomes the R target value, the G target value and the B target value of the target block image (S4106).

When shifting the average density value of the original material image to the target density value, there are a case in which the maximum density value of the original material image exceeds the allowable maximum density value and a not-exceeding case. The material image correcting unit 448, when determining that the maximum density value exceeds the allowable maximum density value, reduces (compresses) the distribution width of the original material image so that the maximum density value becomes the allowable maximum density value in a status of fixing the average density value to the target density value.

While on the other hand, the material image correcting unit 448, when determining that the maximum density value does not exceed the allowable maximum density value, expands the distribution width of the original material image so that the average density value becomes the target density value in a status of fixing the minimum density value to the allowable minimum density value. Thus, the material image correcting unit 448 executes the process so as to retain the tone of the original material image to the greatest possible degree for increasing the visual recognizability of the material image while making the original material image close to the tone of the block image in which to dispose this material image in order to enhance the visual recognizability of the whole mosaic image.

The material image correcting unit 448 saves the thus-corrected material image (post-correcting material image) in the post-correcting material image file 425, and stores this post-correcting material image file 425 in the image data storage unit 435.

The print processing unit 436 acquires the post-correcting material image file 425 from the image data storage unit 435. Further, the print processing unit 436 acquires, based on the image ID specifying the post-correcting material image of which the mosaic image generating unit 434 notifies, the block ID from the mosaic image information DB 438. The print processing unit 436 extracts the post-correcting material image from the post-correcting material image file 425, and performs the conversion into the positional information which makes the user easy to understand the block ID.

The print processing unit 436 generates the print image data containing the post-correcting material image and the positional information. The print processing unit 436 extracts the print size and the print resolution of the post-correcting material image from the mosaic image information DB 438, and sends the generated print image data together with the print size and the print resolution to the printer 407.

The printer 407 receives these items of data, and prints the post-correcting material image and the positional information thereof on the predetermined medium according to the designated print size and print resolution (S4107). Basically, the post-correcting material image is printed on the surface of the medium, while the positional information is printed on the undersurface of the medium. As a matter of course, both of the post-correcting material image and the positional information may be printed on the same surface.

On the other hand, if a simulator function (a pre-check function) is requested, the mosaic image generating unit 449 replaces the material image undergoing the color-correction in the material image correcting unit 448 with the block image of the block in which the material image in the target images should be placed. The block image of the block in which the material image is to be placed is detected from the block ID. Through this process, the generated mosaic image file 423 is stored in the image data storage unit 435 and is read from the display processing unit 437 for displaying this file 423 on the display etc as the necessity arises. The display processing unit 437 displays, on the display etc, the post-correcting material image within the post-correcting material image file 425 stored in the image data storage unit 435 according to the necessity.

<Operation and Effect in Fourth Working Example>

An operation and an effect of the mosaic image providing system 1 in the fourth working example discussed above will hereinafter be stated.

In the fourth working example, when the target image becoming the basis of the mosaic image is determined, the design information on the mosaic image and the target image file 428 are inputted to the server 400. The server 400 processes the target image within the target image file 428 in the same way as in the first working example.

Moreover, the server 400 determines, based on the design information on the mosaic image, the print size and the shape of the post-correcting material image, and further determines, based on these items of information, the pixel count (including the shape information) and the print resolution of the post-correcting material image.

Thereafter, in the fourth working example, the scanner 405 or the FAX device 406 reads the material image from the medium prepared by the user. The thus-read material image is saved in the material image file 421 and then transmitted to the server 400. On the other hand, the positional information indicating which position in the complete version of mosaic image the thus-read material image is placed, is inputted to the server 400.

In the server 400, the material image within the material image file 421 is trimmed and resized to have the pixel count and the shape, which are determined as described above.

This contrivance enables, even when the respective material images read from the medium prepared by the user take the forms different from each other, the respective material images to be processed in the normalized status by the server 400. Namely, in the case of providing the service by use of the mosaic image providing system 1 in the fourth working example, a degree of freedom of the medium prepared by the user can be increased.

The thus-normalized material image is tone-corrected by the same technique as in the first working example so as to match with the tone of the image in the block specified by the positional information within the target image. Namely, according to the fourth working example, the disposition of the material image can be arbitrarily designated without being restricted by the tone of the target image. According to the mosaic image providing system in the fourth working example, even when the user is made to arbitrarily designate the position of the material image by eliminating the restrictions to the material image corresponding to the target image, the high visual recognizability of the material image and the mosaic image can be maintained.

Thus, the post-correcting material image, which is tone-corrected corresponding to the positional information inputted to the server 400, is printed together with the positional information on the predetermined medium by the printer 407 according to the print size and the print resolution that are determined as described above. This post-printing medium is, e.g., stuck to the position on the sticker board 409 illustrated in FIG. 36, which is specified by the positional information printed on the medium, whereby the mosaic image can be finally formed on the sticker board 409 in combination with other mediums.

The user, who utilizes the mosaic image providing system 1 in the fourth working example, prepares the medium on which the material image is printed, and may simply get this medium read by the present system. With this scheme, the printing medium output from the system 1 is simply placed in the position specified by the positional information printed on this medium, thereby enabling the user to participate in forming the mosaic image.

Namely, the fourth working example enables the user to easily participate in forming the mosaic image on the basis of the predetermined medium. Furthermore, according to the fourth working example, even when the position of the material image is freely designated, the mosaic image and the material image each exhibiting the high visual recognizability can be output.

Fifth Working Example

The process of the mosaic image generating unit 34 in the second working example may be applied to the process of the mosaic image generating unit 434 of the server 400 in the fourth working example discussed above (a fifth working example). Specifically, the mosaic image generating unit 434 in the fourth working example discussed above, after converting the material image into the grayscale image, calculates the statistic value of the grayscale image, however, the mosaic image generating unit 434 in the fifth working example executes the process related to the material image without converting the material image into the grayscale image.

Figure 42:
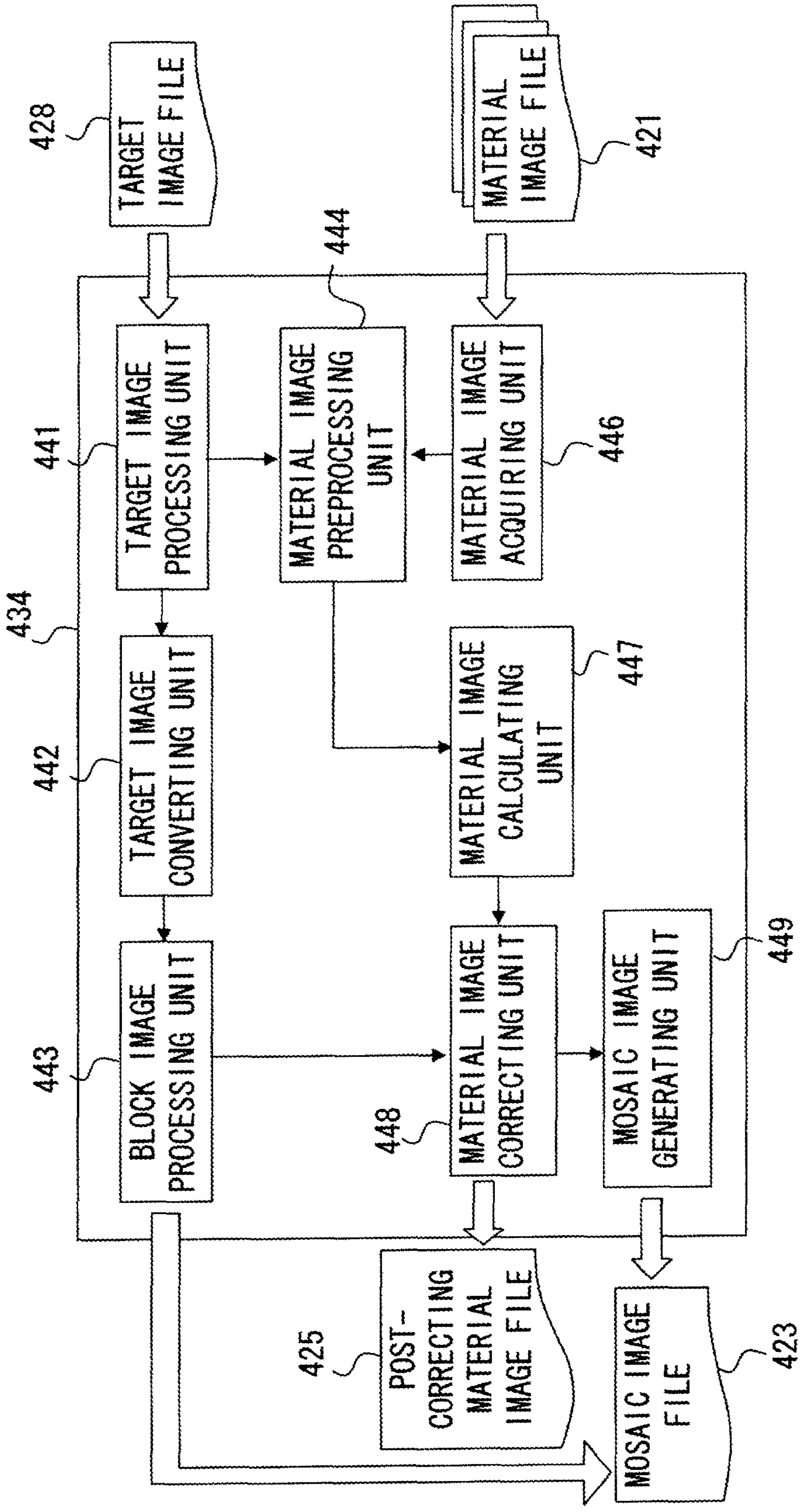
FIG. 42 is a block diagram representing a conceptual configuration of a function of the mosaic image generating unit in a fifth working example.

FIG. 42 is a function block diagram representing a conceptual configuration of the function of the mosaic image generating unit 434 in the fifth working example. The functional configuration of the fifth working example has nothing different from the fourth working example except the omission of the material image converting unit 445 which converts the material image into the grayscale image. Further, the processes and the operations of the respective processing units are the same as in the second working example, and hence their explanations are herein omitted.

<Operation and Effect in Fifth Working Example>

In the fifth working example, the respective statistic values about RGB of the original material image are calculated without converting the material image into the grayscale image. Then, the original material image is tone-corrected to match with the tone of the target block image by using the respective statistic values calculated with respect to RGB.

Thus, in the fifth working example, unlike the fourth working example, the material image is tone-corrected based on the statistic values calculated by using the original RGB values without converting the material image into the grayscale image.

Hence, according to the fifth working example, the dispersion in the respective RGB values of the material image is left, and it is therefore feasible to express a feeling of roughness on the completed mosaic image as compared with the fourth working example and to allow, with respect to each material image, a latitude of appearance in each material image such as providing the material image much closer to the tone of the original image and providing the material image which exhibits a little bit extravagant color.

<Note>

The modes of the following paragraphs given below can be combined to the greatest possible degree as the necessity arises. Further, the modes of the respective paragraphs are described about only a mosaic image generating apparatus but may be, in other aspects, realized by a method and a program each using a computer and by a storage medium recorded with such a program in a readable-by-computer manner.

(Note 1) A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by the segmenting unit;

a determining unit which determines a placement block in which the material image is to be placed from within the plurality of blocks without being restricted by an image of the block;

a calculating unit which calculates the average density value of each of the basic colors within the material image; and a color correcting unit which makes a color-correction of the material image so that the average density value of each of the basic colors within the material image becomes the target density value of each of the basic colors within the placement block while keeping a density value distribution ratio of each of the basic colors of the material image.

(Note 2) A mosaic image generating apparatus according to Note 1, further comprising a target image correcting unit which compresses, in a sate of uniforming each of the basic colors of the images of the respective blocks with a color set to the target density value of each of the basic colors that is calculated by the target image processing unit, the density value distribution ratio of each of the basic colors within the target image so as not to use a predetermined range extending from an allowable minimum density value and a predetermined range extending from an allowable maximum density value, and newly calculates, as the target density value, the average density value of each of the basic colors corresponding to the compressed density value distribution ratio, wherein the color correcting unit color-corrects the material image by using the target density value that is newly calculated by the target image correcting unit.

(Note 3) A mosaic image generating apparatus according to Note 1 or 2, wherein the calculating unit further calculates a maximum density value of each of the basic colors within the material image, and the color correcting unit includes a first density converting unit which compresses, if the material image is color-corrected so that the average density value of each of the basic colors within the material image becomes the target density value of each of the basic colors within the placement block and when determining that the post-correcting maximum density value of at least one basic color exceeds the allowable maximum density value, the density value distribution ratio of the at least one basic color so that the post-correcting maximum density value becomes the allowable maximum density value and the average density value becomes the target density value.

(Note 4) A mosaic image generating apparatus according to any one of Notes 1 through 3, wherein the calculating unit further calculates a maximum density value and a minimum density value of each of the basic colors within the material image, and the color correcting unit includes a second density converting unit which expands or compresses, if the material image is color-corrected so that the average density value of each of the basic colors within the material image becomes the target density value of each of the basic colors within the placement block and when determining that the post-correcting maximum density value of at least one basic color does not exceed the allowable maximum density value, the density value distribution ratio of the at least one basic color so that the post-correcting minimum density value becomes the allowable minimum density value and the average density value becomes the target density value.

(Note 5) A mosaic image generating apparatus according to any one of Notes 1 through 4, further comprising a material image converting unit which converts the material image into a grayscale image, wherein the calculating unit calculates the average density value of any one of the basic colors from the grayscale image converted by the material image converting unit, and the color correcting unit color-corrects the material image by use of the density value distribution ratio of the grayscale image and the average density value of any one of the basic colors that is calculated by the calculating unit.

(Note 6) A mosaic image generating apparatus according to any one of Notes 1 through 5, further comprising:

a generating unit which generates the mosaic image by placing the material image that is color-corrected by the color correcting unit in the placement block;

a display image generating unit which generates, based on the mosaic image generated by the generating unit, a plurality of display images corresponding to respective zoom stages of stepwise zoom display between zoom-out display in which the whole mosaic image is visually recognized on a screen of a mobile terminal and zoom-in display in which a plurality of blocks within a partial area of the mosaic image is visually recognized on the screen of the mobile terminal; and a display control unit which displays, on the screen of the mobile terminal, each of the plurality of display images generated by the display image generating unit in a state where each display image is segmented into a plurality of cells selectable by an operation on the mobile terminal so that each cell is arranged corresponding to each block visually recognized in the zoom-in display.

(Note 7) A mosaic image generating apparatus according to Note 6, wherein the display image generating unit reduces the mosaic image generated by the generating unit at a reduction ratio corresponding to each zoom stage, segments the reduced mosaic image so that each display image has a size enabling the display image to be visually recognizable on the screen of the mobile terminal and generates the plurality of display images.

(Note 8) A mosaic image generating apparatus according to Note 6 or 7, wherein the display control unit, when receiving a zoom display request from the mobile terminal, extracts, from the plurality of display images, the display image corresponding to an area displayed within the cell selected on the mobile terminal or the display image having, in a partial area, the display image displayed on the mobile terminal, and displays the extracted display image on the screen of the mobile terminal.

(Note 9) A mosaic image generating apparatus according to any one of Notes 6 through 8, wherein the display control unit downloads, into the mobile terminal, when displaying in the zoom-in mode on the mobile terminal, identifying information specifying intra-mosaic-image positions related to the individual blocks displayed in the plurality of cells together with the display image corresponding to the zoom-in display, and the generating unit, when receiving from the mobile terminal a new material image together with the identifying information of the block selected by use of any one of the plurality of cells in the case of being displayed in the zoom-in mode, gets the new material image processed by the determining unit, the calculating unit and the color-correcting unit, and generates the mosaic image in which the newly-processed material image is placed in the block specified by the identifying information.

(Note 10) A mosaic image generating apparatus according to any one of Notes 6 through 9, wherein the generating unit, when receiving from the mobile terminal a delete request containing the identifying information of the block selected by using any one of the plurality of cells in the case of being displayed in the zoom-in mode on the mobile terminal, generates the mosaic image in which the block image of the block specified by the identifying information is replaced with an empty block image indicating a status in which the material image is not placed, and, when receiving from the mobile terminal a movement request containing the identifying information of a moving source block and the identifying information of a moving destination block that are selected by using any two of the plurality of cells in the case of being displayed in the zoom-in mode on the mobile terminal, generates the mosaic image in which the block image of the block specified by the identifying information of the moving source block is replaced with the block image of the block specified by the identifying information of the moving destination block.

(Note 11) A mosaic image generating apparatus according to any one of Notes 6 through 10, further comprising a comment information table stored with comment information contributed to each of the material images, wherein the display control unit displays each of the plurality of display images generated by the display image generating unit on the screen of the mobile terminal in a state of expressing a relation between the comment extracted from the comment information table and the comment contribution target material image.

(Note 12) A mosaic image generating apparatus according to Note 11, wherein the display control unit, when displaying the display image and the comment information on the screen of the mobile terminal, determines a combination of the comments to be simultaneously displayed in the comments contributed to the plurality of material images within the display image, and switches over the display and the non-display of the combination at a predetermined cycle.

(Note 13) A mosaic image generating apparatus according to Note 11 or 12, further comprising a user identifying unit which identifies the user of the mobile terminal, wherein the comment information table contains the comments and comment open range information as the comment information, and the display control unit, when displaying the comment information on the screen of the mobile terminal, performs the control so as to inhibit the comment from being displayed if the user of the mobile terminal is not included in the comment open range based on an identifying result of the user identifying unit.

(Note 14) A mosaic image generating apparatus according to any one of Notes 11 through 13, wherein the display control unit, when receiving from the mobile terminal the comment information contributed to the material image together with the identifying information of the material image displayed within at least one selected block in the plurality of visually recognized blocks in the case of being displayed in the zoom-in mode on the screen of the mobile terminal, stores this comment information in the comment information table.

(Note 15) A mosaic image generating apparatus according to any one of Notes 11 through 14, wherein the display control unit displays a list of the comments about the material images and names of contributors of the comments on the screen of the mobile terminal, and displays on the screen of the mobile terminal the display image in which the material image contributed by a user specified by the contributor name in the case of selecting the contributor name is placed in any one of the plurality of visually recognized blocks when displayed in the zoom-in mode.

(Note 16) A mosaic image generating apparatus according to any one of Notes 1 through 5, further comprising: a receiving unit which receives the material image read by an image reading device and gets the received material image processed by the determining unit, the calculating unit and the color correcting unit; and a print instructing unit which instructs a printing device to print the material image that is color-corrected by the color correcting unit and the positional information of the placement block.

(Note 17) A mosaic image generating apparatus according to Note 16, further comprising; a whole information acquiring unit which acquires input information on a size and a block count of the target image;

a print information determining unit which determines a print size and a print resolution of the material image on the basis of the size and the block count of the target image that are acquired by the whole information acquiring unit;

a setting information determining unit which determines a pixel count and a shape of the material image on the basis of the print size and the print resolution that are determined by the print information determining unit; and a converting unit which converts the material image received by the receiving means into the pixel count and the shape that are determined by the setting information determining unit, wherein the print instructing unit instructs the printing device to print the material image that is color-corrected by the color correcting unit on the basis of the print size and the print resolution that are determined by the print information determining unit.

(Note 18) A mosaic image generating apparatus according to Note 16 or 17, wherein the determining unit includes an acquiring unit which receives an input of designation information of a position of the placement block, and determines the block, as the placement block, in the position specified by the designation information acquired by the acquiring unit.

(Note 19) A mosaic image generating apparatus comprising:

a mosaic image generating unit which generates a mosaic image in which a material image is placed in at least one block within a target image segmented into a plurality of blocks;

a display image generating unit which generates, based on the mosaic image generated by the mosaic image generating unit, a plurality of display images corresponding to zoom stages of stepwise zoom display between zoom-out display in which the whole mosaic image is visually recognized on a screen of a mobile terminal and zoom-in display in which the plurality of blocks in a partial area of the mosaic image is visually recognized on the screen of the mobile terminal; and a display control unit which displays each of the plurality of display images generated by the display image generating unit on the screen of the mobile terminal in a state of being segmented into a plurality of cells which are selectable by an operation on the mobile terminal and each of which is placed corresponding to the each of the blocks that are visually recognized in the zoom-in display.

(Note 20) A mosaic image generating apparatus comprising:

a mosaic image generating unit which generates a mosaic image in which a material image is placed in at least one block within a target image segmented into a plurality of blocks;

a comment information table stored with comment information of comments contributed to the respective material images;

a display image generating unit which generates, based on the mosaic image generated by the mosaic image generating unit, a plurality of display images corresponding to zoom stages of stepwise zoom display between zoom-out display in which the whole mosaic image is visually recognized on a screen of a mobile terminal and zoom-in display in which the plurality of blocks in a partial area of the mosaic image is visually recognized on the screen of the mobile terminal; and a display control unit which displays each of the plurality of display images generated by the display image generating unit on the screen of the mobile terminal in a state of expressing a relation between the comment extracted from the comment information table and a comment contribution target material image.

What is claimed is:

1. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image;

a color correcting unit which makes a color-correction of the material image so that the average density value of each of the basic colors within the material image becomes the target density value of each of the basic colors within the placement block while keeping a density value distribution ratio of each of the basic colors of the material image; and a target image correcting unit which compresses, in a state of uniforming each of the basic colors of the images of the respective blocks with a color set to the target density value of each of the basic colors that is calculated by said target image processing unit, the density value distribution ratio of each of the basic colors within the target image so as not to use a predetermined range extending from an allowable minimum density value and a predetermined range extending from an allowable maximum density value, and newly calculates, as the target density value, the average density value of each of the basic colors corresponding to the compressed density value distribution ratio, wherein said color correcting unit color-corrects the material image by using the target density value that is newly calculated by said target image correcting unit.

2. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image; and a color correcting unit which makes a color-correction of the material image so that the average density value of each of the basic colors within the material image becomes the target density value of each of the basic colors within the placement block while keeping a density value distribution ratio of each of the basic colors of the material image, wherein said calculating unit further calculates a maximum density value of each of the basic colors within the material image, and said color correcting unit includes a first density converting unit which compresses, if the material image is color-corrected so that the average density value of each of the basic colors within the material image becomes the target density value of each of the basic colors within the placement block and when determining that the post-correcting maximum density value of at least one basic color exceeds the allowable maximum density value, the density value distribution ratio of the at least one basic color so that the post-correcting maximum density value becomes the allowable maximum density value and the average density value becomes the target density value.

3. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image;

a color correcting unit which makes a color-correction of the material image so that the average density value of each of the basic colors within the material image becomes the target density value of each of the basic colors within the placement block while keeping a density value distribution ratio of each of the basic colors of the material image, wherein said calculating unit further calculates the maximum density value and a minimum density value of each of the basic colors within the material image, and said color correcting unit includes a second density converting unit which expands or compresses, if the material image is color-corrected so that the average density value of each of the basic colors within the material image becomes the target density value of each of the basic colors within the placement block and when determining that the post-correcting maximum density value of at least one basic color does not exceed the allowable maximum density value, the density value distribution ratio of the at least one basic color so that the post-correcting minimum density value becomes the allowable minimum density value and the average density value becomes the target density value.

4. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image;

a color correcting unit which makes a color-correction of the material image so that the average density value of each of the basic colors within the material image becomes the target density value of each of the basic colors within the placement block while keeping a density value distribution ratio of each of the basic colors of the material image, and a material image converting unit which converts the material image into a grayscale image, wherein said calculating unit calculates the average density value of any one of the basic colors from the grayscale image converted by said material image converting unit, and said color correcting unit color-corrects the material image by use of the density value distribution ratio of the grayscale image and the average density value of any one of the basic colors that is calculated by said calculating unit.

5. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image;

a color correcting unit which makes a color-correction of the material image so that the average density value of each of the basic colors within the material image becomes the target density value of each of the basic colors within the placement block while keeping a density value distribution ratio of each of the basic colors of the material image;

a generating unit which generates the mosaic image by placing the material image that is color-corrected by said color correcting unit in the placement block;

a display image generating unit which generates, based on the mosaic image generated by said generating unit, a plurality of display images corresponding to respective zoom stages of stepwise zoom display between zoom-out display in which the whole mosaic image is visually recognized on a screen of a mobile terminal and zoom-in display in which a plurality of blocks within a partial area of the mosaic image is visually recognized on the screen of the mobile terminal; and a display control unit which displays, on the screen of the mobile terminal, each of the plurality of display images generated by said display image generating unit in a state where each display image is segmented into a plurality of cells selectable by an operation on the mobile terminal so that each cell is arranged corresponding to each block visually recognized in the zoom-in display, wherein said display control unit downloads, into the mobile terminal, when displaying the display image in the zoom-in mode on the mobile terminal, identifying information specifying intra-mosaic-image positions related to the individual blocks displayed in the plurality of cells together with the display image corresponding to the zoom-in display, and said generating unit, when receiving from the mobile terminal a new material image together with the identifying information of the block selected by use of any one of the plurality of cells in the case of being displayed in the zoom-in mode, gets the new material image processed by said determining unit, said calculating unit and said color-correcting unit, and generates the mosaic image in which the newly-processed material image is placed in the block specified by the identifying information.

6. A mosaic image generating apparatus which generates a mosaic image by use of material images, comprising:

a segmenting unit which segments a target image becoming a basis of the mosaic image into a plurality of blocks;

a target image processing unit which calculates an average density value, as a target density value, of each of basic colors within each of the blocks into which the target image is segmented by said segmenting unit;

a determining unit which determines a placement block in which the material image is to be placed from within the plurality of blocks without being restricted by an image of the block;

a calculating unit which calculates the average density value of each of the basic colors within the material image;

a color correcting unit which makes a color-correction of the material image so that the average density value of each of the basic colors within the material image becomes the target density value of each of the basic colors within the placement block while keeping a density value distribution ratio of each of the basic colors of the material image;

a generating unit which generates the mosaic image by placing the material image that is color-corrected by said color correcting unit in the placement block;

a display image generating unit which generates, based on the mosaic image generated by said generating unit, a plurality of display images corresponding to respective zoom stages of stepwise zoom display between zoom-out display in which the whole mosaic image is visually recognized on a screen of a mobile terminal and zoom-in display in which a plurality of blocks within a partial area of the mosaic image is visually recognized on the screen of the mobile terminal;

a display control unit which displays, on the screen of the mobile terminal, each of the plurality of display images generated by said display image generating unit in a state where each display image is segmented into a plurality of cells selectable by an operation on the mobile terminal so that each cell is arranged corresponding to each block visually recognized in the zoom-in display, and a comment information table stored with comment information contributed to each of the material images, wherein said display control unit displays each of the plurality of display images generated by said display image generating unit on the screen of the mobile terminal in a state of expressing a relation between the comment extracted from the comment information table and the comment contribution target material image.

* * * * *

UNITED STATES PATENT AND TRADEMARK OFFICE

CERTIFICATE OF CORRECTION

PATENT NO. : 8,456,721 B2
APPLICATION NO. : 12/837016
DATED : June 4, 2013
INVENTOR(S) : Hiroshi Arimura et al.

It is certified that error appears in the above-identified patent and that said Letters Patent is hereby corrected as shown below:

On the Title page, Item (73);
Change

"(73) Assignee: Pitmedia Marketing Incorporated,
Tokyo (JP)"

To be

--(73) Assignee: Pitmedia Marketings Incorporated,
Tokyo (JP)--

Signed and Sealed this
Twelfth Day of November, 2013

Teresa Stanek Rea
*Deputy Director of the United States Patent and Trademark Office*